United States Patent [19]

Matsuura et al.

[11] Patent Number: 5,627,928
[45] Date of Patent: May 6, 1997

[54] OPTICAL BRANCHING DEVICE

[75] Inventors: Yuji Matsuura; Eisuke Sasaoka; Hiroo Kanamori, all of Yokohama, Japan

[73] Assignee: Sumitomo Electric Industries, Ltd., Osaka, Japan

[21] Appl. No.: 333,308

[22] Filed: Nov. 1, 1994

[30] Foreign Application Priority Data

Nov. 1, 1993 [JP] Japan .................................. 5-273288
Nov. 16, 1993 [JP] Japan .................................. 5-286831

[51] Int. Cl.$^6$ .................................................. G02B 6/26
[52] U.S. Cl. .............................. 385/45; 385/14; 385/43; 385/132
[58] Field of Search ...................... 385/46, 14, 45, 385/43, 49, 22, 15, 48, 50, 132

[56] References Cited

U.S. PATENT DOCUMENTS

| | | | |
|---|---|---|---|
| 4,991,926 | 2/1991 | Paviath | 350/96.15 |
| 5,461,684 | 10/1995 | Vinchant et al. | 385/22 |

FOREIGN PATENT DOCUMENTS

| | | | |
|---|---|---|---|
| 2-234108 | 9/1990 | Japan | 385/14 |
| 4-70605 | 3/1992 | Japan | 385/14 |
| 4-264506 | 9/1992 | Japan | 385/14 |
| 511130 | 1/1993 | Japan | |
| 5-107420 | 4/1993 | Japan | 385/14 |
| 618730 | 1/1994 | Japan | |

OTHER PUBLICATIONS

Patent Abstracts of Japan, vol. 4, No. 163 (P-36) (645) Sep. 13, 1980 & JP-A-55 110 205 (Ricoh).

Patent Abstracts of Japan, vol. 6, No. 262 (P-164) Sep. 28, 1982 & JP-A-57 207 (KDD).

Zirngibl et al, "Efficient 1×16 Optical Power Splitter Based on InP", Electronics Letters, vol. 28, No. 13, Jun. 18, 1992, pp. 1212–1213.

Rolland et al, "Optimization of Strongly Guiding Semiconductor Rib Waveguide Y-Junctions", IEEE Photonics Technology Letters, vol. 2, No. 6, Jun. 1990, New York, US, pp. 404–406.

Veerman et al, "An Optical Passive 3–dB TMI–Coupler with Reduces Fabrication Tolerance Sensitivity", Journal of Lightwave Technology, vol. 10, No. 3, Mar. 1992, New York, US, pp. 306–311.

*Primary Examiner*—John Ngo
*Attorney, Agent, or Firm*—Cushman, Darby & Cushman, IP Group of Pillsbury Madison & Sutro, LLP

[57] ABSTRACT

An optical branching device according to present invention comprises a cladding member, a first core member, a second core member, and a third core member. These core members are isolated each other, and the with of a edge face of the first core member is greater than total length of the widths of second and third core members terminals facing to the first core member and a gap between the second and third core members.

17 Claims, 41 Drawing Sheets

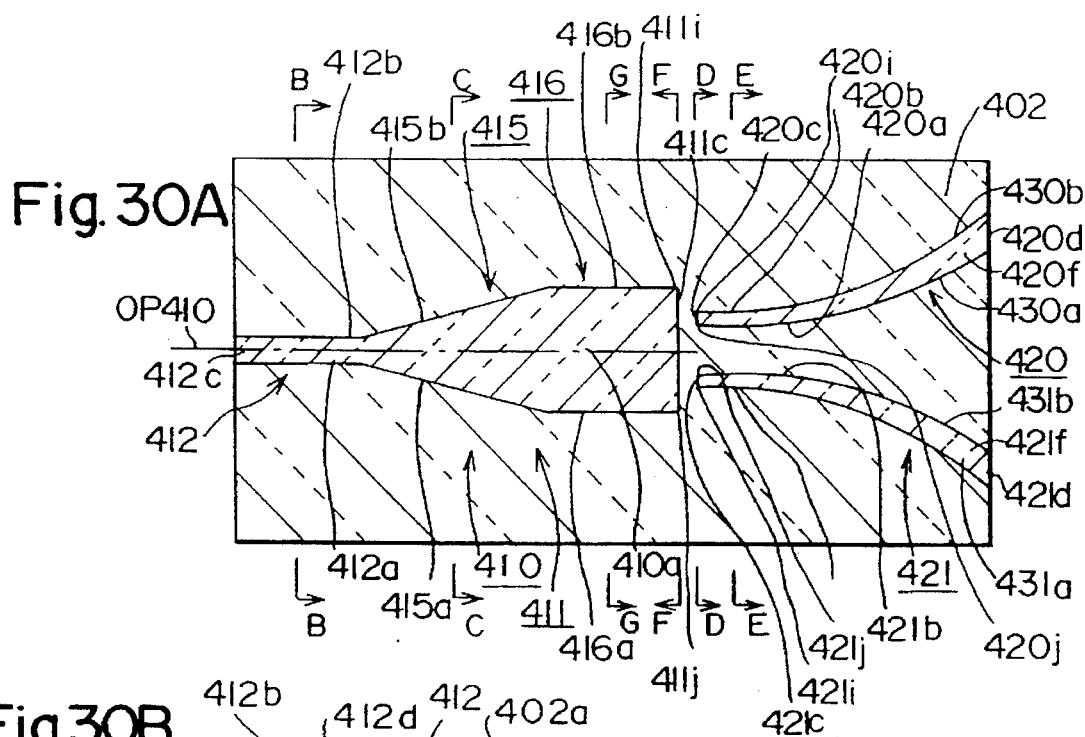
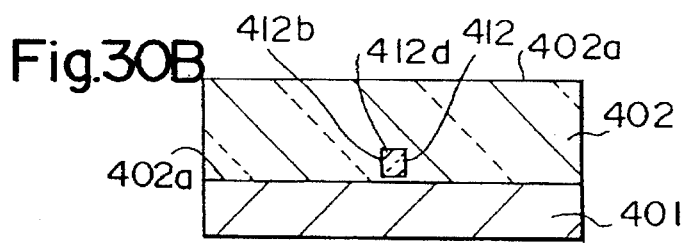
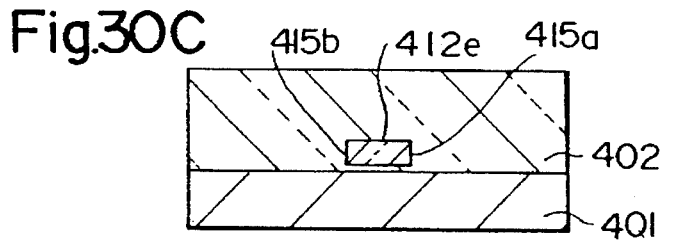
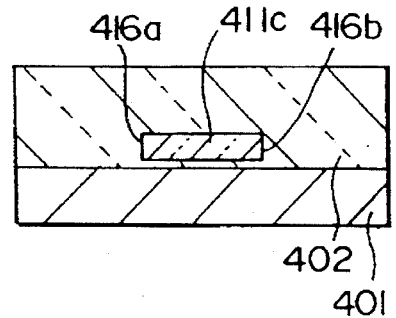
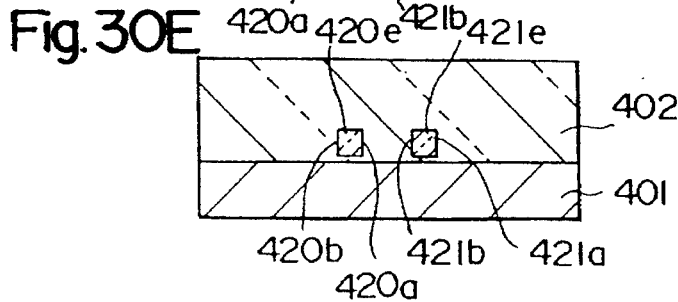

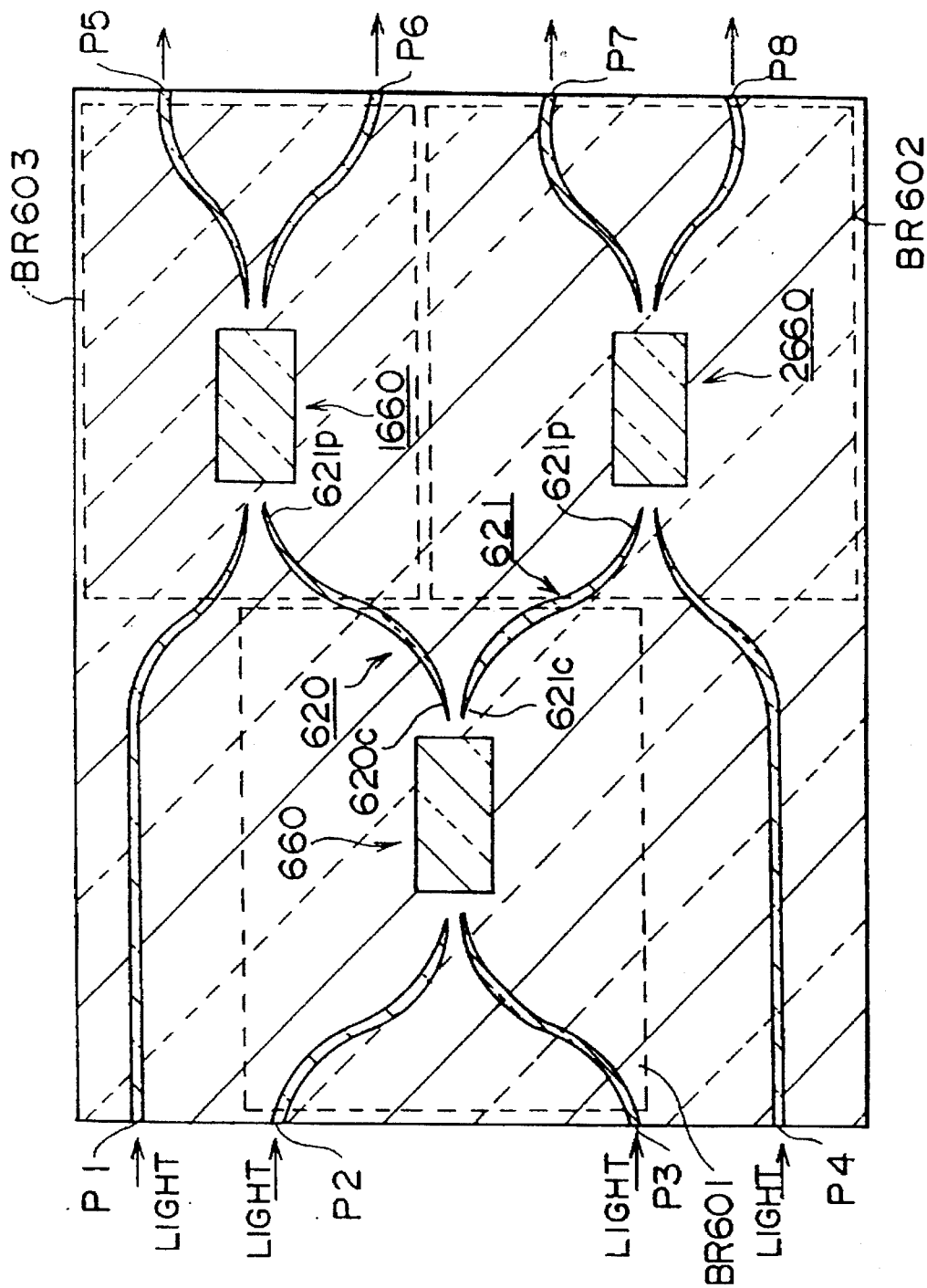

OPTICAL BRANCHING DEVICE

BACKGROUND OF THE INVENTION

1. Field of the Invention

The present invention relates to an optical branching device available for use in the field of optical communication, processing of optical signals and the like, and particularly to a waveguide type optical branching device. The optical branching device includes the optical directional coupler and branching waveguide.

2. Related Background Art

There have been known optical branching devices which branch light having been transmitted along one path into eight paths. Waveguide type optical branching devices with this 1×8 structure are often used in the field of optical communication, processing of optical signals and the like; an example thereof is described in Japanese Patent Application Laid-open No. 5-11130 (11130/1993).

SUMMARY OF THE INVENTION

The essential component of waveguide type optical branching devices is a Y-shaped branching device. In FIG. 9 is shown an Y-shaped branching device created by the present inventors. For use in the field of optical communication, Y-shaped branching devices are required to have an increased optical coupling efficiency or an increased ratio of the output light to the input light.

In consideration of such a problem as noted above, it is an object of the present invention to increase the optical coupling efficiency of a waveguide type optical branching device.

The optical branching device, more particularly the waveguide type optical branching device according to the present invention is a device with an improved optical coupling efficiency as compared with conventional devices.

The optical branching device according to the present invention is provided with a cladding member as well as first, second, and third core members.

The first core member is embedded in the cladding member. The second core member is also imbedded in the cladding member and is provided with a second edge face opposite to a first edge face of the first core member at a first given space. The third core member is also imbedded in the cladding member and is provided with a third edge face opposite to a first edge face of the first core member at a second space.

The cladding member has a first surface. The first core member comprises a first perpendicular section which is defined by intersection with a first plane perpendicular to the first surface; a second perpendicular section which is defined by intersection with a second plane vertical to the first surface and located between the first edge face and first plane; and a first horizontal section which is defined by intersection with a third plane parallel to the first surface. The second core member comprises a third perpendicular section which is defined by intersection with a fourth plane perpendicular to the first surface; and a second horizontal section which is defined by intersection with the third plane.

The third core member comprises a fourth perpendicular section which is defined by intersection with the fourth plane; and a third horizontal section which is defined by intersection with the third plane. The first core member is placed so that the light input into the first core member is propagated across the first perpendicular section and second vertical section, in the direction along the first horizontal section, and output from the first edge face. The second core member is placed so that the light output from the first edge face is input into the second core member via the second edge face, propagated across the third perpendicular section along the direction of the second horizontal section, and then output from the second core member. The third core member is placed so that the light output from the first edge face is input into the third core member via the third edge face, propagated across the fourth perpendicular section along the direction of the third horizontal section, and then output from the third core member.

Incidentally, the area of the first edge face is larger than that of the first perpendicular section. This is because the first core member has a tapered section which diverges toward the second and third core members. With this configuration, the energy of the light input into the first core member at the side of the first perpendicular section lowers when it exits the first edge face. For a further improvement in the optical coupling efficiency of the optical branching device, the area of the second perpendicular section is set to be identical to that of the first edge face.

In other words, the light input into the first core member gradually loses its optical power density (energy density) as it travels from the first perpendicular section to the first edge face, while the wave front of the light fans out in the first horizontal section. In the case where the area of the second perpendicular section is equal to the area of the first edge face, the wave front becomes parallel to the first edge face during its propagation from the second perpendicular section to the first edge face. As a result, the directivity of the light output from the first edge face is increased, which results in an increased coupling efficiency of the light entering the second core member and third core member.

with the optical branching device according to the present invention, the second edge face and third edge face are parallel to the wave front leaving the first edge face, which arrangement contributes to an increased optical coupling efficiency.

In summary, in the optical branching device according to the present invention, the first core member has the first edge face which aids in lowering the energy density of the input light, and is in the form which makes the wave front of the light parallel to the first edge face for its exit through the first edge face, the second core member has the second edge face facing the first edge face at a given space, and the third core member has a third edge face facing the first edge face at a given space.

The light travels through the light transmission path (core) of a given width (core size). The light transmission path is a part of the first core member which is contiguous with the first perpendicular section, and has the same sectional area as the area of the first perpendicular section.

To increase the optical coupling efficiency discussed above, for the optical branching device according to the present invention, the length L1 of the intersection between the first horizontal section and first edge face is made longer than the total of the length L2 of the intersection between the second horizontal section and second edge face, the length L3 of the intersection between the third horizontal section and third edge face, and the distance L4 between the second edge face and third edge face. In short, L1 is longer than L2+L3+L4.

The first core member has a fourth edge face The optical branching device comprises a fourth core member embedded in the cladding member, and provided with a fifth edge face facing the fourth edge face of the first core member at a given space, and a fifth core member embedded in the cladding member, and provided with a sixth edge face facing the fourth edge face of the first core member at a given space. As a result, the light input into the first core member (optical mixer) via the fourth core member and fifth core member is output to the second core member and third core member. The fourth core member and fifth core member may receive incident optical signals at different wavelengths, respectively, wherein the optical branching device being considered may function as an optical multiplexer (or demultiplexer). Of course, the fourth core member and fifth core member may receive incident optical signals at the same wavelength, in which case the optical branching device may function as an optical coupler (including an optical divider).

If the second core member and third core member are located close to each other, beams of light propagating through the respective members interfere with each other. Therefore, for the prevention of this interference, desirably the second core member and third core member are located apart to such an extent that they are free from evanescent field coupling. However, in cases where the second core member and third core member are located too far from each other, then the foregoing coupling efficiency drops, for which reason the second core member of the optical device according to the present invention tapers toward the first core member.

The third core member is designed to taper toward the first core member. With this tapering, an increased coupling efficiency is accomplished as compared with the use of a non-tapered core member. Namely, the area of the second edge face is smaller than the area of the third perpendicular second, while the area of the third edge face is smaller than the area of the fourth perpendicular section Since the second core member and third core member are spaced at a given distance from each other, the incident light from the first core member to the second and third core members leaks out into the space. As the leakage light may affect the other optical components, the optical branching device according to the present invention is provided with a light-shielding member between the second core member and third core member. This arrangement prevents the leakage light from influencing the other devices. Preferably, the second core member and third core member are spaced from each other to such an extent that the light propagated in the second and third core members do not interfere with each other (to an extent enough to prevent evanescent field coupling). With this arrangement, the coupling efficiency may be improved.

As mentioned above, the optical branching device (optical component) according to the present invention mixes the input light for output. The ratio of the output light to the input light with the present device is greater as compared with the value accomplished with the Y-shaped branching device shown in FIG. 10B.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 30A is a section view of the device shown in FIG. 29, taken along the plane indicated by the arrows H—H in the drawing;

FIG. 30B is a section view of the device shown in FIG. 30A, taken along the plane indicated by the arrows B—B in the drawing;

FIG. 30C is a section view of the device shown in FIG. 30A, taken along the plane indicated by the arrows C—C in the drawing;

FIG. 30D is a section view of the device shown in FIG. 30A, taken along the plane indicated by the arrows D—D in the drawing;

FIG. 30E is a section view of the device shown in FIG. 30A, taken along the plane indicated by the arrows E—E in the drawing;

FIG. 30F is a section view of the device shown in FIG. 30A, taken along the plane indicated by the arrows F—F in the drawing;

FIG. 30G is a section view of the device shown in FIG. 30A, taken along the plane indicated by the arrows G—G in the drawing;

FIG. 41 is a section view of an optical component consisting of 3 connected optical branching devices of the type shown in FIG. 39.

DESCRIPTION OF THE PREFERRED EMBODIMENTS

Figure 1:
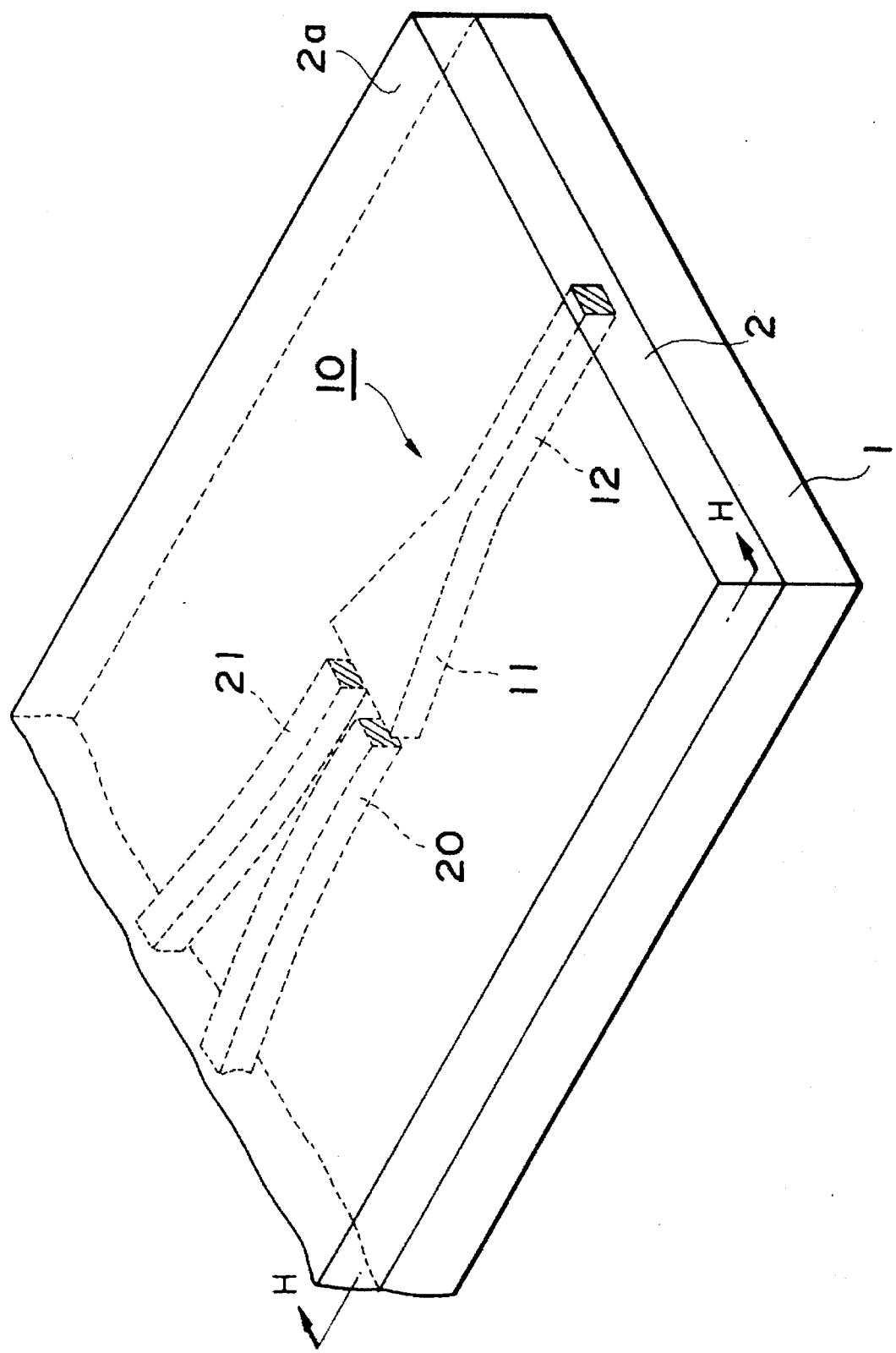
FIG. 1 is a perspective view of an optical branching device according to an embodiment of the present invention.

The embodiments of the present invention will now be explained in detail with reference to the accompanying drawings. Incidentally, like elements in the drawings will be indicated by like identical reference characters, avoiding repeated explanation.

First, an explanation will be made of an optical branching device fabricated by the present inventors, while referring to FIG. 9.

Figure 9:
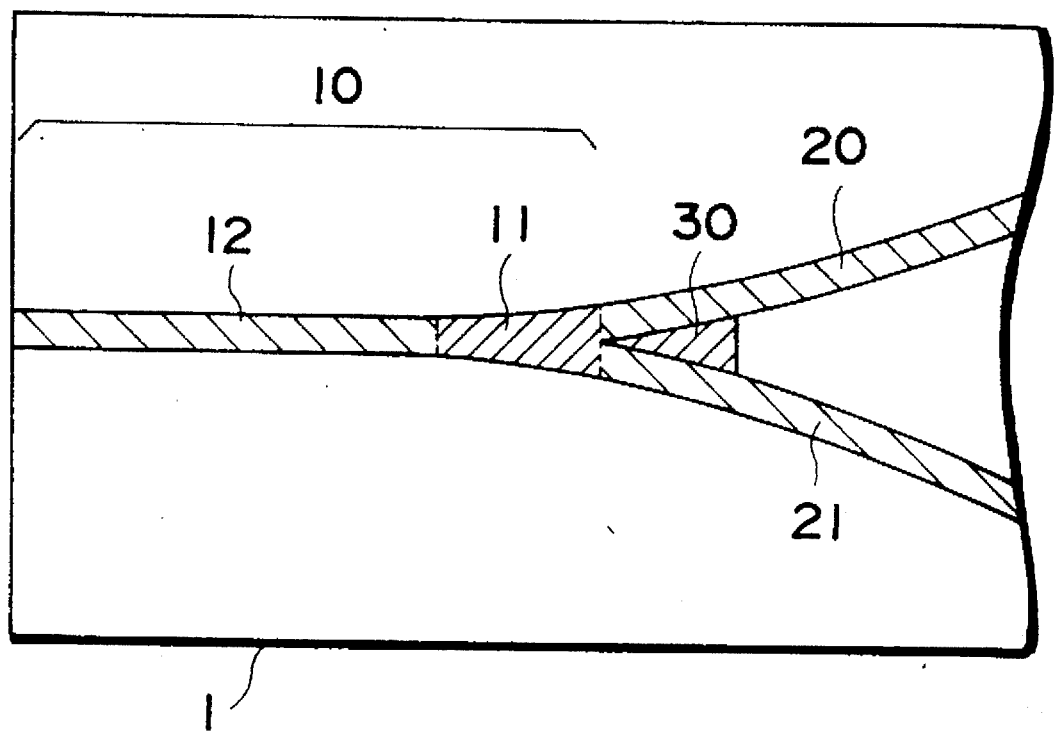
FIG. 9 is a section view of an optical branching device in the form wherein a single non-branch waveguide 10 comprises a straight waveguide 12 with a tapered waveguide 11 added thereto, from which branch waveguides 20, 21 extend contiguously.

FIG. 9 is a section view of an optical branching device in the form wherein a single non-branch waveguide 10 comprises a straight waveguide 12 with a tapered waveguide 11 added thereto, from which branch waveguides 20, 21 extend contiguously.

For the formation of waveguides, this waveguide type optical branching device inevitably has a bulbous tip of a sharp wedge at the branching section, resulting in increased optical loss of the optical branching device as a whole. Improved yields reflecting satisfactory minimization of the loss are a requisite for the mass production of optical branching devices.

Figure 11:
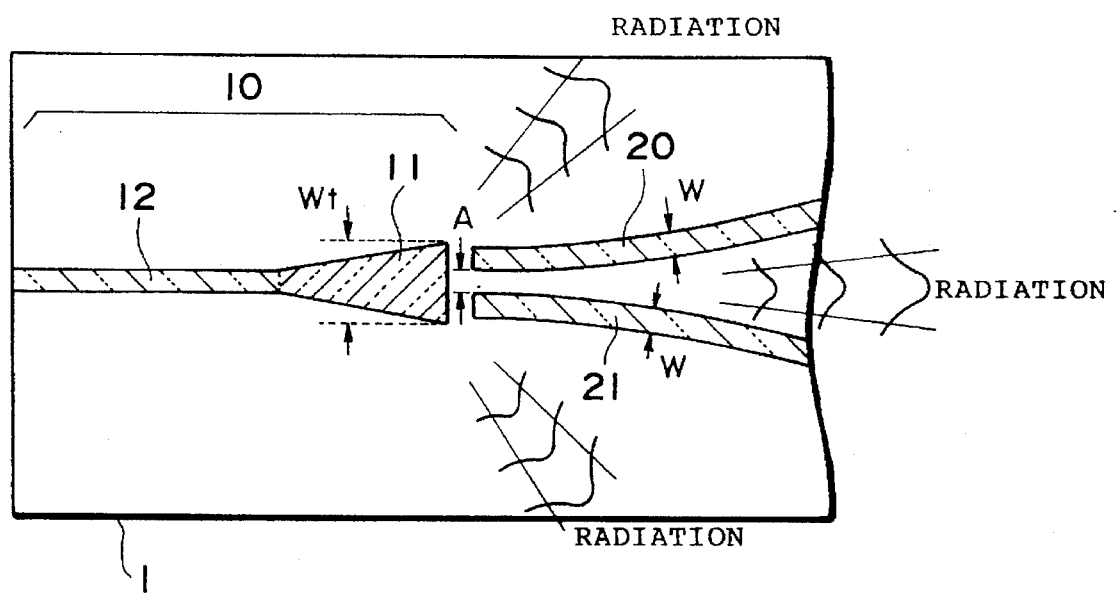
FIG. 11 is a section view of a comparison optical branching device.

As an above-noted problem-solving waveguide type optical branching device, there may be presented an optical branching device shown in FIG. 11 which comprises a branching section with a structure wherein the non-branch waveguide 10 is separated from branch waveguides 20, 21. Here, the terminal width (Wt) of the tapered waveguide 11 added to the straight waveguide 12 is equal to the total (2W +A) of the subtotal (2W) of the widths of the branch waveguides 20, 21 (each being W in the embodiment of FIG. 11), and the space (A) between the branching waveguides 20, 21 at the branching section.

The waveguide type optical branching device shown in FIG. 11 has no such section susceptible to eventual rounding for its fabrication as the wedge section 30 of the waveguide type optical branching device shown in FIG. 9. Accordingly, the branching section of the waveguide type optical branching device of FIG. 11 is easy to process relatively. As a result, the device of FIG. 11 may be fabricated with more excellent workability and repeatability than that shown in FIG. 9. In conclusion, the former waveguide type optical branching device may be fabricated on a larger scale and in a higher yield, as compared with the device of FIG. 9.

The waveguide type optical branching device shown in FIG. 11 as a comparison, however, suffers from a drastically increased loss due to optical branching in case of enlarging the space between the branch waveguides 20, 21 for an improved processing stability since much guided light radiates out between the branch waveguides 20, 21, as shown in FIG. 11, which radiation leads to a drastically increased optical branch loss.

Conversely, with a reduced space between the branch waveguides 20, 21 for the suppression of the radiation caused by optical branching, the processing stability lowers, and an increased yield cannot be expected, meaning that such reduction becomes a bar to the mass production. For the foregoing reasons, for establishing a satisfactory processing stability, many improvements should be made to the waveguide type optical branching device of FIG. 11 from the point of view of lowering the loss.

FIG. 1 is a perspective view of an optical branching device according to an embodiment of the present invention.

Figure 2A:
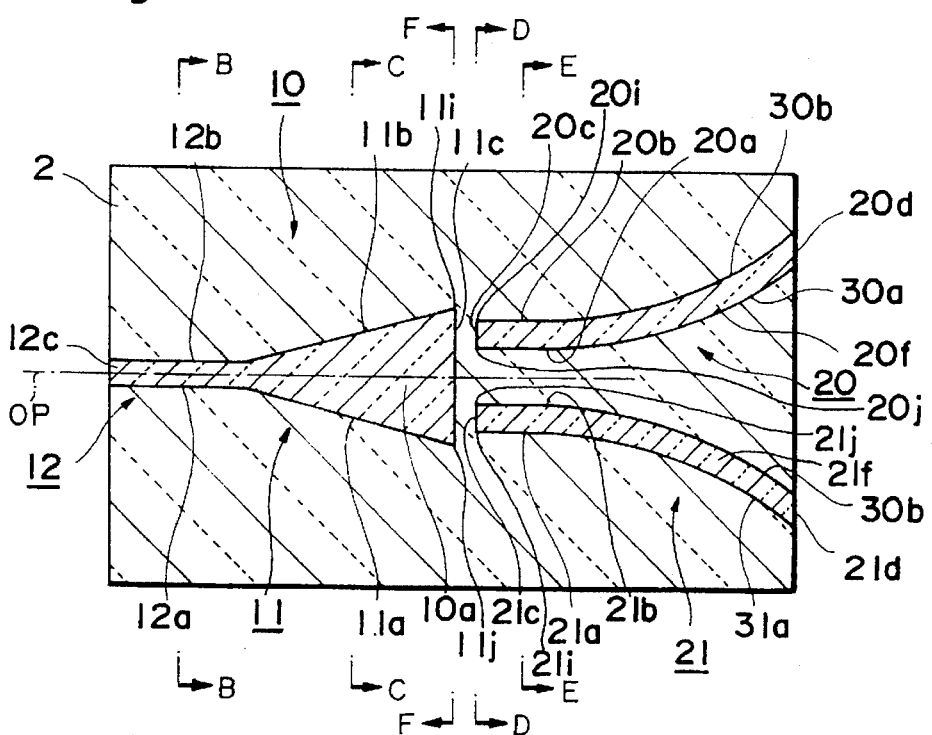
FIG. 2A is a section view of the device shown in FIG. 1, taken along the plane indicated by the arrows H—H in FIG. 1.

FIG. 2A is a section view of the device shown in FIG. 1, taken along the plane indicated by the arrows H—H in the drawing.

Figure 2B:
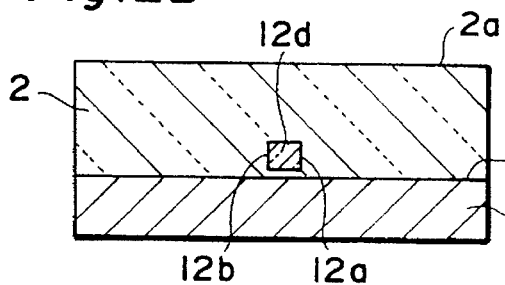
FIG. 2B is a section view of the device shown in FIG. 2A, taken along the plane indicated by the arrows B—B in the drawing.

FIG. 2B is a section view of the device shown in FIG. 2A, taken along the plane indicated by the arrows B—B in the drawing.

Figure 2E:
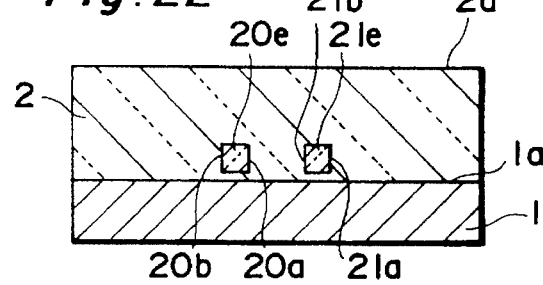
FIG. 2E is a section view of the device shown in FIG. 2A, taken along the plane indicated by the arrows E—E in the drawing.
Figure 2C:
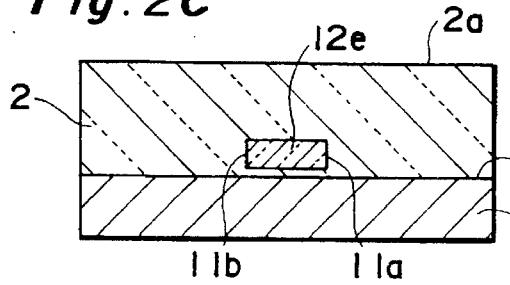
FIG. 2C is a section view of the device shown in FIG. 2A, taken along the plane indicated by the arrows C—C in the drawing.

FIG. 2C is a section view of the device shown in FIG. 2A, taken along the plane indicated by the arrows C—C in the drawing.

Figure 2F:
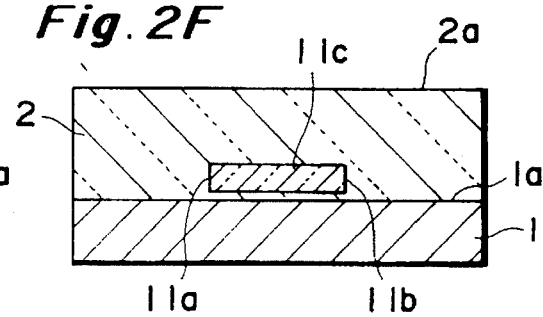
FIG. 2F is a section view of the device shown in FIG. 2A, taken along the plane indicated by the arrows F—F in the drawing.
Figure 2D:
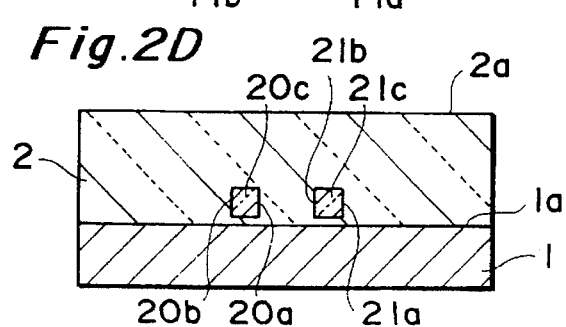
FIG. 2D is a section view of the device shown in FIG. 2A, taken along the plane indicated by the arrows D—D in the drawing.

FIG. 2D is a section view of the device shown in FIG. 2A, taken along the plane indicated by the arrows D—D in the drawing.

FIG. 2E is a section view of the device shown in FIG. 2A, taken along the plane indicated by the arrows E—E in the drawing.

FIG. 2F is a section view of the device shown in FIG. 2A, taken along the plane indicated by the arrows F—F in the drawing.

Figure 3:
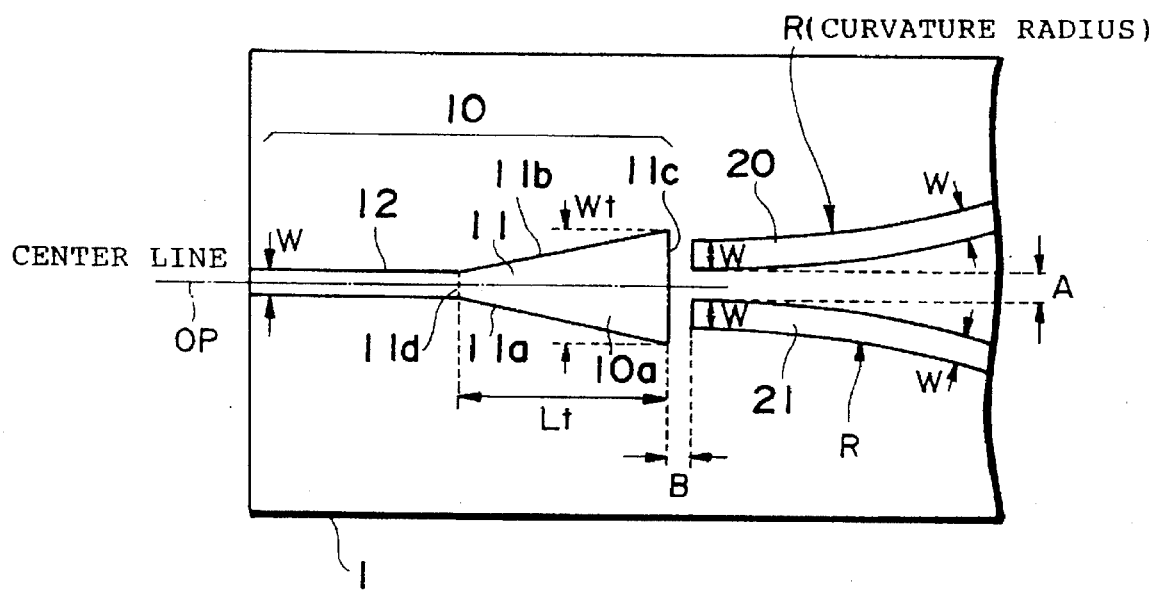
FIG. 3 is a section view of the device shown in FIG. 2A.

FIG. 3 is a section view of the device shown in FIG. 2A.

This optical branching device is a further improvement of the device shown in FIG. 11. To improve the properties of the optical branching device, this waveguide type optical branching device is provided with a non-branch waveguide (first tapered waveguide) 10 comprising a tapered waveguide 11 at the end 11, and two separate branch waveguides 20, 21 facing the edge face 11c of the tapered waveguide 11 at a given space.

The width (Wt) of the terminal (first edge face) 11c of the tapered waveguide 11 is greater than the total (2W+A) of the subtotal (2W) of the respective widths (Ws) of the terminals 20c, 21c of the two branch waveguides 20, 21, and the space (A) between the two branching waveguides 20, 21 at the branching section.

Incidentally, as described later, the tapered waveguide comprises a tapered section 115, and a straight section 116 added to the tip of the tapered section 115 and of almost the same width as of the terminal of the tapered section 115, wherein the terminal width of the straight section 116 of the tapered waveguide is greater than the total of the subtotal of the respective widths of the terminals 120c, 121c of the two branch waveguides 120, 121 facing the branching section, and the space between the two branch waveguides 120, 121 at the branching section.

In the above-noted waveguide type optical branching device shown in FIG. 1–3, the terminal width (Wt) of the tapered waveguide is about 10 μm or less greater than the total of the subtotal (2W) of the respective widths (Ws) of the terminals of the two branch waveguides 20, 21 facing the branching section, and the space (A) between the two branching waveguides 20, 21 facing the branching section. Also, the straight section of the tapered waveguide discussed later may be about 300 μm or less in length. In addition, as described later, the waveguide type optical branching device according to the present invention may comprise a plurality of waveguide type optical branching devices of the above-noted type wherein two or more waveguide type optical branching devices of the above type may be added to one terminal of a waveguide type optical branching device of the same type which functions as the non-branch waveguide therefor.

In the waveguide type optical branching device according to the present embodiment, the non-branch waveguide 10 is separated from the branch waveguides 20, 21, and thus the guided light input into the first core member 10 from the edge face 12c may be branched without provision of the hard-to-process wedge section (30 in FIG. 9).

Furthermore, since the width (Wt) of the terminal 11c of the tapered waveguide 11 located at the end 11 of the non-branch waveguide 10 is greater than the total (2W+A) of the subtotal (2W) of the respective widths (Ws) of the terminals 20c, 21c of the two branch waveguides 20, 21 at the side near the branching section, and the space (A) between the two branching waveguides 20, 21 at the branching section, the electric field distribution of the above-noted guided light spreads in the direction of the width at the terminal 11c of the tapered waveguide 11, enabling branching of the guided light with an increased overlapping of the electric field distributions before and after optical branching. With this effect, the coupling efficiency of the electric field distributions before and after optical branching is improved, leading to a drastic reduction of radiation of guided light (radiation loss) between the two branch waveguides 20, 21, and successful branching of guided light with a minimized loss during optical branching.

Additionally, as referred to later, the waveguide type optical branching device with a tapered waveguide comprising a tapered section 115 and a straight section which is added to the tip of the tapered section 116 and has almost the same width (Wt) as of the terminal of the tapered section has, in addition to the above-noted function, the function of introducing guided light into branch waveguides after restoration of the wage front widen radially in the tapered section 115 to a plane. This restoration enables suppressed radiation of guided light at the edge face 111c of a tapered waveguide 111 which has a width greater than the total of the respective widths of the terminals of the two branch waveguides at the sides near the branching section 120, 121, and the space between the two branch waveguides at the branching section, and branching of the guided light with a further reduced optical branch loss.

Incidentally, as described hereunder, with a waveguide type optical branching device assembly comprising a plurality of waveguide type optical branching devices of the above-noted type the above function is repeated several times, thereby allowing the output of the branched guide light with an exceptionally reduced optical branch loss.

The waveguide type optical branching device of FIG. 1 comprises a substrate 1 made of a material comprising silicon, for example, and overlying transparent material layers (cladding member 2, and core members 10, 20 and 21) composed of, e.g. $SiO_2$ (glass, silica glass). That is, these transparent material layers comprise the cores 10, 20 and 21 with higher refractive indexes than the cladding 2. The transparent material layers comprise a non-branch waveguide 10, two separate branch waveguides 20, 21, and a cladding 2 with a lower refractive index than the core 10 embedded therein. The waveguides 10, 20 and 21 all are arranged in the direction of propagation of light.

The non-branch waveguide 10 discussed here has a tapered waveguide 11 at the end of a straight waveguide 12. Both the branch waveguides 20, 21 are bent waveguides of given widths and curvature radii, facing the edge face 11c of the tapered waveguide 11 at a given space.

For a more detailed explanation of the structure shown in FIG. 1, as shown in FIG. 2A and FIG. 3, the branch waveguides 20, 21 are bent waveguides of given widths (Ws) and curvature radii (Rs), located close to each other at a space (A). They are located facing the edge face of the tapered waveguide 11 at a given space; they are positioned symmetrically with respect to the center line of the non-branch waveguide 10 (an alternating long and short dash line in FIG. 3) and so that the space therebetween increases gradually in the direction of propagation of light.

A characteristic aspect of the waveguide type optical branching device shown in FIGS. 1–3 resides in that the terminal width (Wt) of the tapered waveguide 11 is larger than the total (2W+A) of the subtotal (2W) of the terminal widths of the branch waveguides 20, 21 near the branching section, and the space (A) between the branch waveguides 20, 21 at the branching section. In short, Wt>2W+A. In this aspect, this waveguide type optical branching device is different from the waveguide type optical branching device shown in FIG. 11.

Since the waveguide type optical branching device of FIG. 2A comprises the branching section with a structure wherein the non-branch waveguide 10 is separated from the branch waveguides 20, 21, there is no need for the provision of a sharp "wedge section" as shown in FIG. 9, allowing easier processing of the branching section and more excellent processing stability. In addition to this advantage, as the terminal width of the tapered waveguide 11 is made broader as mentioned above, the electric field distribution of guided light may be spread in the direction of width of the tapered waveguide 11-that is, in the direction perpendicular to that of the light propagation for closer overlapping of the electric field distributions before and after optical branching.

For a more detailed explanation, in the waveguide type optical branching devices comprising the non-branch waveguide 10 and branch waveguides 20, 21 separated therefrom, the greater the coupling efficiency of the electromagnetic field of the guided light at the terminal of the non-branch waveguide 10 near the branching section, and the electromagnetic field of the guided light at the terminals of the branch waveguides 20, 21 near the branching section, the less the optical branch loss.

As described above, the waveguide type optical branching device according to the embodiment under discussion provide the branching section with a structure wherein the separate waveguides are located facing to each other, and the terminal width of the tapered waveguide 11 is enlarged, which structure allows the spreading of the electric field distribution at the terminal of the tapered waveguide 11 in the direction of the width of the tapered waveguide 11. As a result, the area of the overlapped portions of the electric fields before and after optical branching, which contributes to an improved coupling efficiency as compared with the device shown in FIG. 1.

The above-noted device will be explained hereunder in further detail.

The waveguide type optical branching device according to the present embodiment comprises a silicon substrate 1, a cladding member 2 formed on the supporting substrate 1, a first core member (first tapered waveguide) 10, a second core member (second waveguide) 20, and a third core member (third waveguide) 21.

The first core member 10 is embedded in the cladding member 2. The second core member 20 is embedded in the cladding member 2 as well. Also, the second core member 20 has a second edge face 20c facing the edge face 11c of the first core member 10 at a first space B. The third core member 21 is also embedded in the cladding member 2. The third core member 21 has a third edge face 21c facing the edge face 11c of the first core member 10 at a second space B. Here, the first space B and the second space B are designed to be identical. The space B(1) between the edge faces 11c and 20c, and the space B(2) between the edge faces 11c and 21c have a following equation.

$$B(2)-\lambda \leq B(1) \leq B(2)+\lambda,$$

where λ is wavelength of the guided light traveling through the core member 10. Then the space B(1) is substantially equal to B(2). The wavelength λ of the guided light using in present embodiment is 1.55 μm. In other words, the first space B(1) is not greater than the total of the space of said second space B(2) and the wavelength (λ) of the light propagated in said second core member 20, and not smaller than the difference between said second space B(2) and the wavelength (λ) of the light propagated in said second core member 20.

The cladding member 2 (cladding 2, cladding layer 2) has a first surface 2a. The first surface 2a is parallel to the main surface 1a (interface 1a between the substrate 1 and cladding 2) of the substrate 1. "Direction of the width" is defined to be the direction perpendicular to both the direction perpendicular to the first surface 2a, and to the direction of light propagation. "Direction of the thickness" is defined to be the direction perpendicular to the first surface 2a. The first core member 10 has a light transmission path 12 of given width and thickness, and a core section 11, which is contiguous with the light transmission path 12, of a tapered type whose width increases as the distance from the light transmission path 12 does. The width 12 of the light transmission path 12 is defined by the distance between the side 12a and side 12b in FIG. 2A. These side faces 12a and 12b are parallel to each other.

The first core member 10 has a first perpendicular section 12d which is defined by intersection with a first plane (plane indicated by the arrows B—B in FIG. 2A) which is perpendicular to the first surface 2a and to an optical axis OP of the first cladding member 10. The planes defined by the arrows B—B through F—F are parallel to each other. The first core member 10 has a second perpendicular section 12e which is defined by intersection with a second plane (plane indicated by the arrows C—C in FIG. 2A) perpendicular to the first surface 2a and located between the fist edge face 11c and first plane (B—B plane). The first core member 10 has a first horizontal section (10a in FIG. 2A) which is defined by intersection with a third plane (plane indicated the arrows H—H in FIG. 1) parallel to the first surface 2a.

The second core member 20 has a third perpendicular section 20e which is defined by intersection with a fourth plane (plane indicated by the arrows E—E in FIG. 2A) which is perpendicular to the first surface 2a. The second core member 20 has a second horizontal section (20f in FIG. 2A) which is defined by intersection with the third plane (H—H plane). The third core member 21 has a fourth perpendicular section 21e which is defined by intersection with the fourth plane (E—E plane). The third core member 21 has a third horizontal section 21f which is defined by intersection with the third plane (H—H plane).

In other words, the branch waveguide assembly shown in FIGS. 1–3 comprises a substrate 1, a first tapered waveguide 10, a second waveguide 20, and a third waveguide 21.

The substrate 1 has a substrate surface 1a.

The first tapered waveguide 10 is formed on the substrate surface 1a, and has a first edge face 11c.

The second waveguide 20 is formed on the substrate surface 1a. The second waveguide 20 has a second edge face 20c facing the first edge face 11c at a given space B, a first side 20a including a plane 20a crossing the substrate surface 1a, and a second side 20b facing the first side 20a, and the first side face 20a and the second side face 20b are parallel to each other.

The third waveguide 21 is formed on the substrate surface 1a. The third waveguide 21 has a third edge face 21c facing the first edge face 11c at a given space B, a third side 21a including the place 21a crossing the substrate surface 1a, and a fourth side 21b facing the third side 21a. The third side face 21a and the fourth side face 21b are parallel to each other. The fourth side 21b is located between the first side 20a and the third side 21a. The first side 20a is located between the second side 20b and the fourth side 21b. The side 20a and the side 21b are parallel to each other.

The width of the first edge face 1a is identical to the length of the first edge face 1a along the direction (direction of the width) perpendicular to both the direction of the normal to the substrate surface 1a (direction of the thickness), and the direction of the normal to the first edge face 11c (direction of the optical axis). The width (Wt) of the first edge face 11c is greater than the distance between the second side 20c and the third side 21c.

In other words, an intersection (cross line) 20i is an intersection of the second edge face 20c and second side face 20b. An intersection (cross line) 21i is an intersection of the third edge face 21c and third side face 21a.

An intersection (cross line) 20j is an intersection of the second edge face 20c and first side face 20a. An intersection (cross line) 21j is an intersection of the third edge face 21c and fourth side face 21b. An intersection (cross line) 11i is an intersection of the first edge face 11c and the side face 11b. An intersection (cross line) 11j is an intersection of the first edge face 11c and the side face 11a. The distance between the line 11i and 11j is Wt (μm), the distance between the line 20i and 21j is (2W+A) (μm), distance Wt is greater than (2W+A).

The first core member 10 is located so that the light input into the first core member 10 through the edge face 12c is propagated in the direction along the first horizontal section 10a across the first perpendicular section 12d and second perpendicular section 12e, and output from the first edge face 11c.

The second core member is located so that the output light from the first edge face 11c is input into the second core member 20 through the second edge face 20c, and is propagated in the direction along the second horizontal section 20f across the third perpendicular section 20e, and output at the second edge face 20d of the second core member 20. The third core member 21 is located so that the output light from the first edge face is input into the third core member 20 through the third edge face, and is propagated in the direction along the third horizontal section across the fourth perpendicular section, and output from the third core member.

In this connection, the area of the first edge face 11c is larger than the area of the first perpendicular section 12d. This is because the first core member 10 has a tapered section 11 which diverges toward the direction of the second and third core members. The tapered section 11 has sides 11a, 11b which forms given angles with the optical axis OP (center line) of the first core member 10. In other words, the tapered section 11 forms given angles with the two surfaces perpendicular to the first surface 2a of the section 11, while the lines 11a, 11b crossing the third plane (H—H plane) form given angles with the optical axis OP (center line) of the first core member 10. As the first core member 10 comprises the tapered section 11, the density of the energy (power) of the optical signal input into the first core member 10 at the edge face 12c decreases gradually as the light travels passing through the first perpendicular section 12d toward the first edge face 11c.

The output light from the edge face 11c of the first core member 10 is input into the second core member 20 at the second edge face 20c, and into the third core member 21 at the third edge face 21c. The present inventors have found, based on their previous research, that for the improvement in coupling efficiency of light propagated between two optical components it is effective to make the opposing edge faces of the respective optical components perpendicular to the direction of light propagation. The first edge face 11c according to the present embodiment is perpendicular to the direction of movement of the light passing through the first edge face. Also, the second edge face 20c is perpendicular to the direction of movement of the incident light to the second edge face 20c. The third edge face 21c is perpendicular to the direction of movement of the incident light to the third edge face 21c. As a result, the first edge face 11c is opposite to the second edge face 20c, whereas the first edge face 11c is parallel to the second edge face 20c. The first edge face 11c is opposite to the third edge face 21c, whereas the first edge face 11c is parallel to the third edge face 21c.

The second core member 20 has sides 20a, 20b perpendicular to the first surface 2a. The side 20a and side 20b are parallel to the direction of movement of the light propagated in the second core member 20. In this connection, the side 20a and side 20b faces each other, while the side 20a and side 20b runs in parallel with each other. Accordingly, the sides 20a and side 20b are perpendicular to both the first surface 20a and the second edge face 20b.

Similarly, the third core member 21 has sides 21a, 21b which are perpendicular to the first surface 2a. The side 21a and side 21b are parallel to the direction of movement of the light propagated in the third core member 21. In turn, the side 21a and side 21b are opposite to each other, whereas the side 21a and side 21b are parallel to each other. Thus, the side 21a and side 21b are perpendicular to both the first surface 2a and third edge face 21c.

The distance between the second core member 20 and the third core member 21 increases as their distance from the first core member 10 does. This is because the second core member 20 comprises bent sides 30a, 30b bending apart from the third core member 21. The bent side 30a is adjacent to the plane 20a, whereas the bent side 30b to the plane 20b. The curvature radius of the bent side 30a is R, and also the curvature radius of the bent side 30b is almost R. The third core member 21 has bent sides 31a, 31b bending apart from the second core member 20. The bent side 31a is adjacent to the plane 21a, whereas the bent side 31b to the plane 21b. The curvature radius of the bent side 31a is R, and also the curvature radius of the bent side 31b is almost R. The second core member 20 and the third core member 21 are S-shaped waveguides.

The light output from the second edge face 20c and input into the second core member 20 is then output through the edge face 20d of the second core member 20. The light output from the third edge face 21c and input into the third core member 21 is then output through the edge face 21d of the third core member 21. In this connection, the optical distance from the input edge face 20c to the output edge face 20d of the second core member 20 is equal to the optical distance between the input edge face 21c and the output edge face 21d of the third core member 21. As a result, in cases where beams of the light input from the first core member 10 into the core members 20, 21 are output from the core members 20, 21, the beams of the light branched by the core members 20, 21 are in the same phase upon output from the edge faces 20d, 21d. Since the beams of the output light from the edge faces 20d, 21d are in one phase, the phase matching of the respective beams are easy to perform for coupling of the output light, etc.

Figure 4:
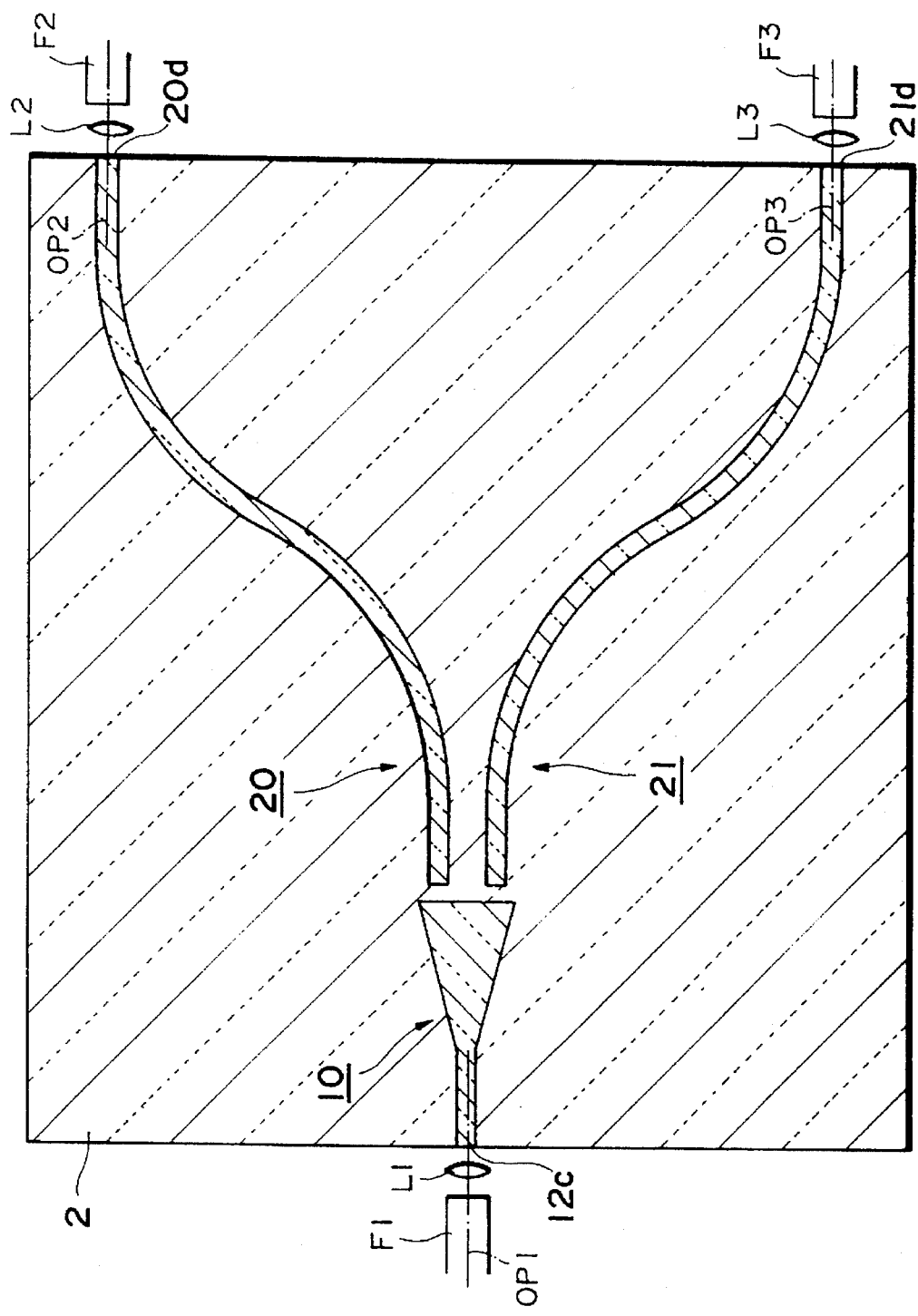
FIG. 4 is a section view of a modification of the optical branching device shown in FIG. 2 with improvements made on the edges 20d, 21d of the second core member 20 and third core member 21.

FIG. 4 shows a modification of the optical branching device shown in FIG. 2A with improvements made on the edge faces 20d, 21d of the second core member 20 and third core member 21. The edge faces 20d, 21d of the optical branching device shown in FIG. 2A is exposed. The direction of the normal to the exposed edge face 20d forms a given angle with the direction of movement of the light (direction of the optical axis) propagated in the third core member 21. Also, the direction of the normal to the exposed edge face 21d forms a given angle with the direction of movement of the light propagated in the third core member 21. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis). For this finding, as shown in FIG. 4, the optical branching device according to the present embodiment is positioned so that the output edge face 20d of the second core member 20 is perpendicular to the optical axis OP2 (indicated by an alternating long and short dash line) of the second core member 20. Optical fiber F2 is located opposite to the edge face 20d of the second core member 20 via a lens L2. The optical axis OP2 of the waveguide 20 corresponds to the optical axis OP2 of the fiber F2. Additionally, the third core member 21 is located so that the output edge face 21d of the third core member 21 is perpendicular to the optical axis OP3 (indicated by an alternating long and short dash line) of the third core member 21. Optical fiber F3 is located opposite to the edge face 21d of the third core member 21 via a lens L3. The optical axis OP3 of the waveguide 21 corresponds to the optical axis OP3 of the fiber F3. Additionally, the first core member 10 is located so that the input edge face 12c of the first core member 10 is perpendicular to the optical axis OP1 (indicated by an alternating long and short dash line) of the first core member 21. Optical fiber F1 is located opposite to the edge face 12c of the first core member 10 via a lens L1. The optical axis OP1 of the waveguide 10 corresponds to the optical axis OP1 of the fiber F3.

Figure 5:
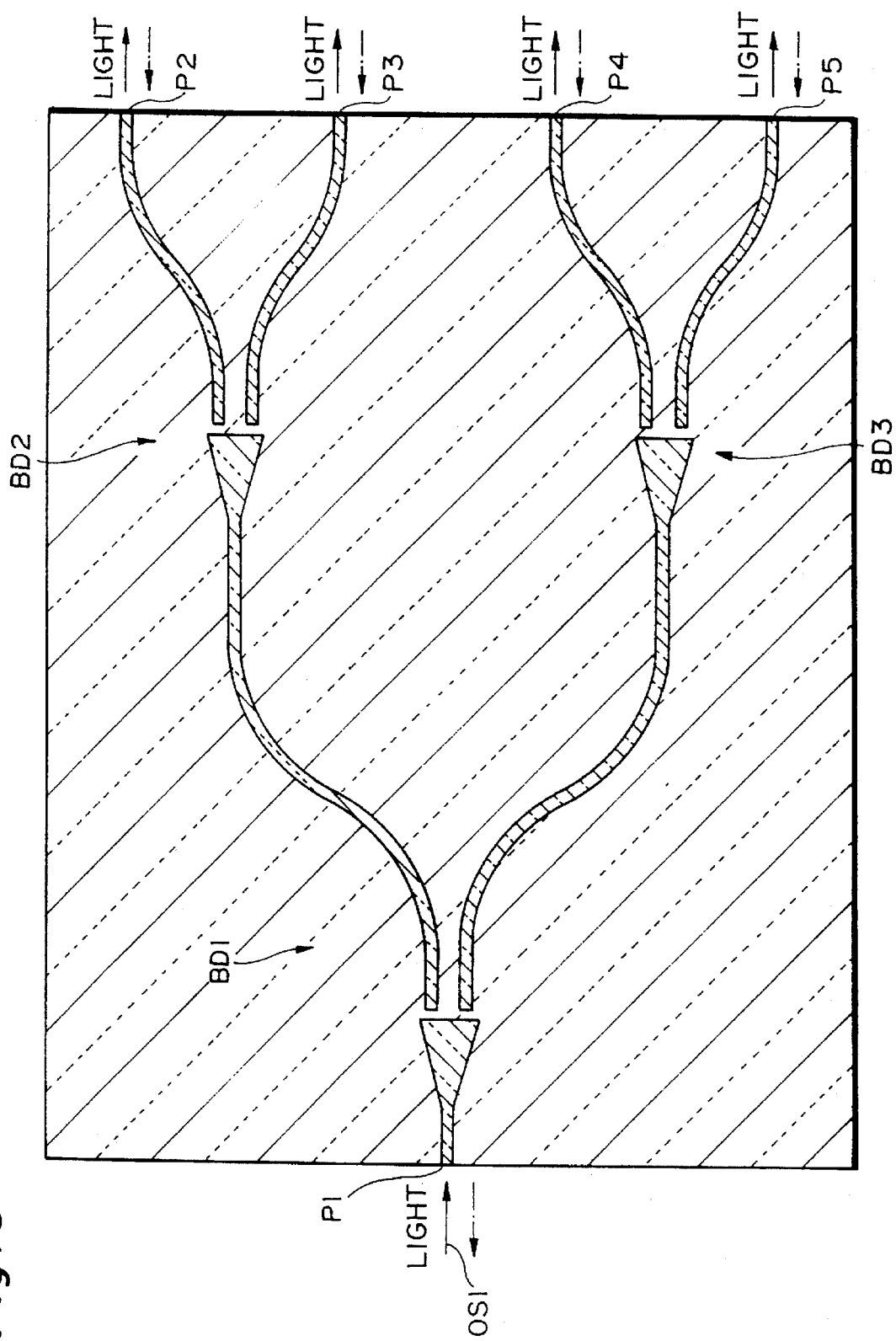
FIG. 5 is an optical branching device assembly with a 1×4 structure which consists of 3 connected optical branching devices BR1, BR2 and BR3 of the type shown in FIG. 4.

FIG. 5 is an optical branching device assembly with a 1×4 structure which consists of 3 connected optical branching devices BR1, BR2 and BR3 of the type shown in FIG. 4. This optical branching device assembly comprises the first optical branching device BR1, the second optical branching device BR2 whose input edge face 12c is connected to the output edge face 20d of the first optical branching device BR1, and the third optical branching device BR3 whose input edge face 12c is connected to the output edge face 21d of the first optical branching device BR1.

The optical signal OS1 (indicated by a solid arrow in the drawing) input into the first optical branching device BR1 through the edge face P1 is divided with this optical branching device, and output through the edge faces P2, P3 of the second optical branching device BR2, and through the edge faces P4, P5 of the third optical branching device BR3. Conversely, the respective optical signals (indicated by alternating long and short dash arrows) input at the edge faces P2–P5 are coupled with the optical branching device, and output from the edge face P1.

Figure 6:
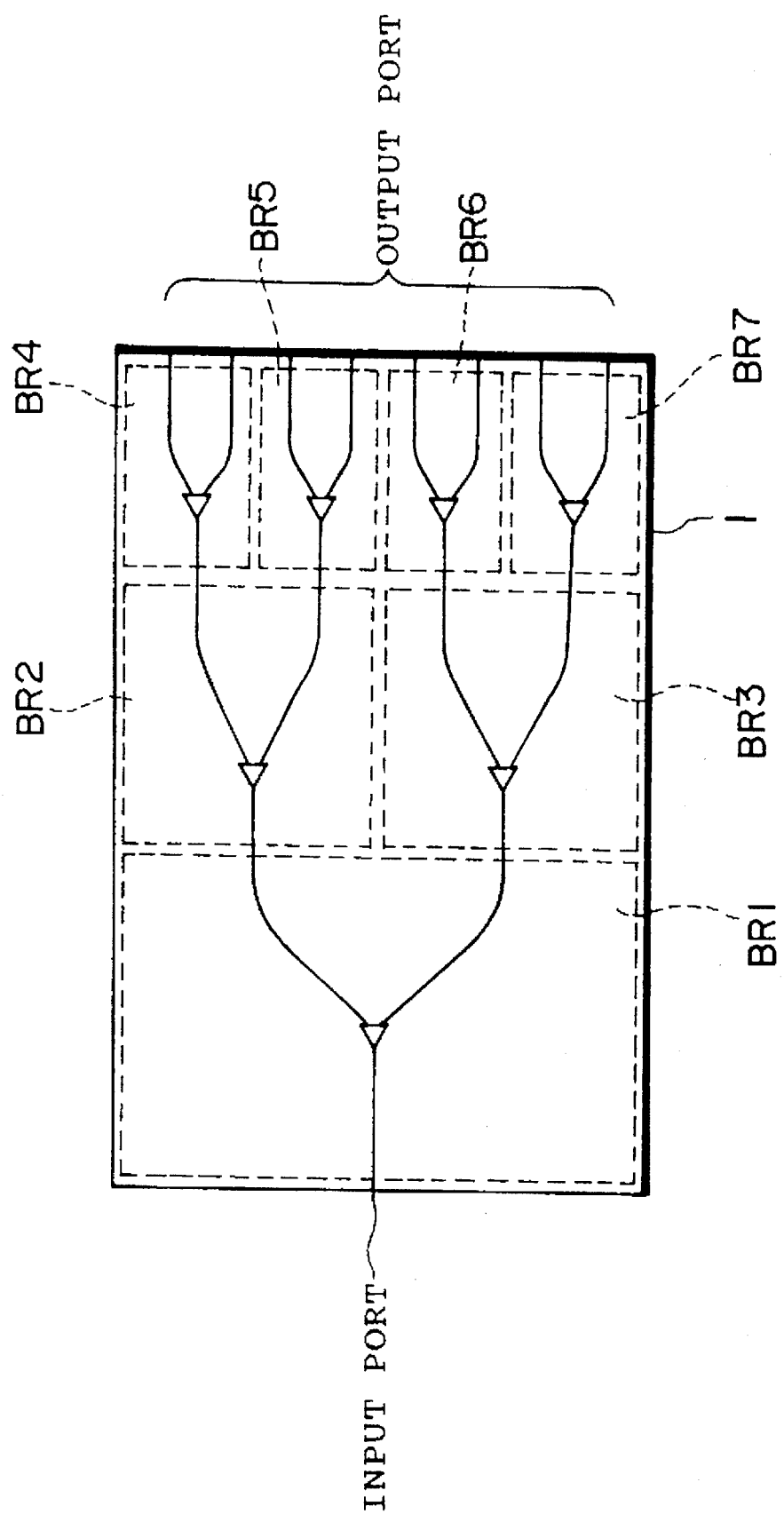
FIG. 6 is an optical branching assembly with a 1×8 structure which consists of 7 connected optical branching devices BR1, BR2, BR3, BR4, BR5, BR6 and BR7 of the type shown in FIG. 4.

FIG. 6 is an optical branching device assembly with a 1×8 structure which consists of 7 connected optical branching devices BR1, BR2, BR3, BR4, BR5, BR6 and BR7 of the type shown in FIG. 4. This optical branching device assembly comprises the first optical branching device BR1 with an input edge face (input port), the second optical branching device BR2 whose input edge face 12c is connected to the output edge face 20d of the first optical branching device BR1, and the third optical branching device BR3 whose input edge face 12c is connected to the output edge face 21d of the first optical branching device BR1.

In addition, this optical branching device assembly comprises the fourth optical branching device BR4 whose input edge face 12c is connected to the output edge face 20d of the second optical branching device BR2, the fifth optical branching device BR5 whose input edge face 12c is connected to the output edge face 21d of the second optical branching device BR1, the sixth optical branching device BR6 whose input edge face 12c is connected to the output edge face 20d of the third optical branching device BR3, and the seventh optical branching device BR7 whose input edge face 12c is connected to the output edge face 21d of the third optical branching device BR3.

Accordingly, this optical branching device assembly may branch single light beam input into the assembly, into eight beams, and reversely may couple eight beams input into this assembly into single beam. In this connection, all the optical branching devices BR1, BR2, BR3, BR4, BR5, BR6, and BR7 are formed on the same substrate 1.

Next, an explanation will be made regarding optimization of the shape of the optical branching device described with reference to FIGS. 1–3.

Figure 7A:
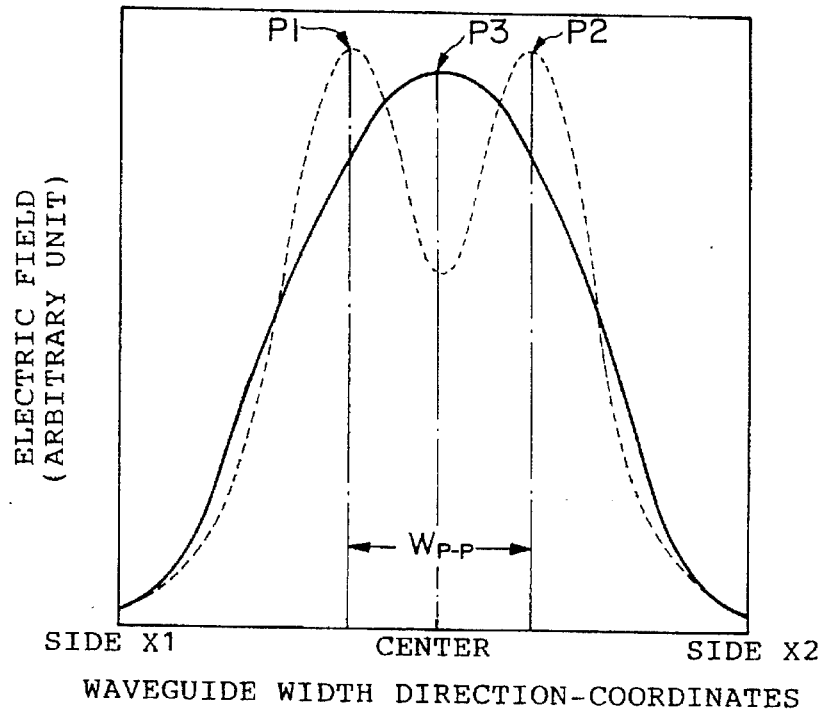
FIG. 7A is a graph showing the electric field distribution of guided light at the terminal of the first core member 10 or at the coordinate Y1, and the electric field distribution of guided light at the terminals of the second and third core members 20, 21 or at the coordinate Y2, shown in FIG. 7B, wherein, in FIG. 7A, the electric field distribution of guided light at the coordinate Y1 is shown by a solid line, whereas the electric field distribution of guided light at the coordinate Y2, by a dotted line, with the coordinates X1 and X2 shown in FIG. 7A corresponding to the position coordinates X1 and X2 of FIG. 7B.
Figure 7B:
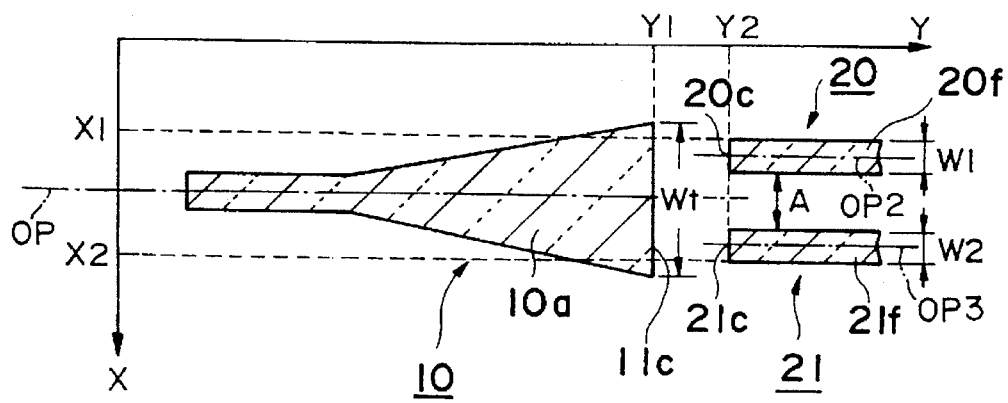
FIG. 7B is an illustration extractive of FIGS. 1-3, with a coordinate system, which shows only the first core member 10, second core member 20 and third core member 21 of the optical branching device shown in FIGS. 1-3.

FIG. 7B is an illustration extractive of FIGS. 1–3, which shows only the first core member 10, second core member 20 and third core member 21 of the optical branching device assembly shown in FIGS. 1–3. FIG. 7B includes coordinate axes. FIG. 7A is a graph showing the electric field distribution of guided light at the terminal of the first core member 10 or at the coordinate Y1, and the electric field distribution of guided light at the terminals of the second and third core members 20, 21 or at the coordinate Y2, shown in FIG. 7B. In FIG. 7A, the electric field distribution of guided light at the coordinate Y1 is shown by a solid line, whereas the electric field distribution of guided light at the coordinate Y2, by a dotted line. The coordinates X1 and X2 shown in FIG. 7A correspond to the position coordinates X1 and X2 of FIG. 7B. Here "guided light" means light propagated through the core members 10, 20 and 21 of the optical branching device in question. Each distribution shown in FIG. 7A is normalized so that the optical power carried in each waveguide mode is set at 1. Here, it is assumed that excitation is effected only in the lowest mode in either of the non-branch waveguide 10 and branch waveguides 20, 21.

In the optical branching device assembly according to the present embodiment, the length (Wt) of the intersection of the first horizontal section 10a and first edge face 11c is greater than the total of the length (W1) of the intersection of the second horizontal section 20f and second edge face 20c, the length (W2) of the third horizontal section 21f and third edge face 21c, and the distance (A) between the second edge face (20c) and third edge face (21c). More precisely, the distance between the side face 20a and side face 21b is A. In other words, the distance between the line 21j and 20j is A.

That is, Wt is larger than W1+W2+A. In short, Wt>W1+W2+A. Incidentally, in the present embodiment, W1=W2=W.

FIG. 10 shows the electric field distribution of the comparison optical branching device assembly shown in FIG. 11. In the optical branching device assembly shown in FIG. 11, the terminal width (Wt) of the tapered waveguide added to the straight waveguide 12 is equal to the total (2W+A) of the subtotal (2W) of the widths of the branch waveguides 20, 21 (each W in the case of FIG. 11), and the direction (A) between the branch waveguides 20, 21 at the branching section.

Figure 10A:
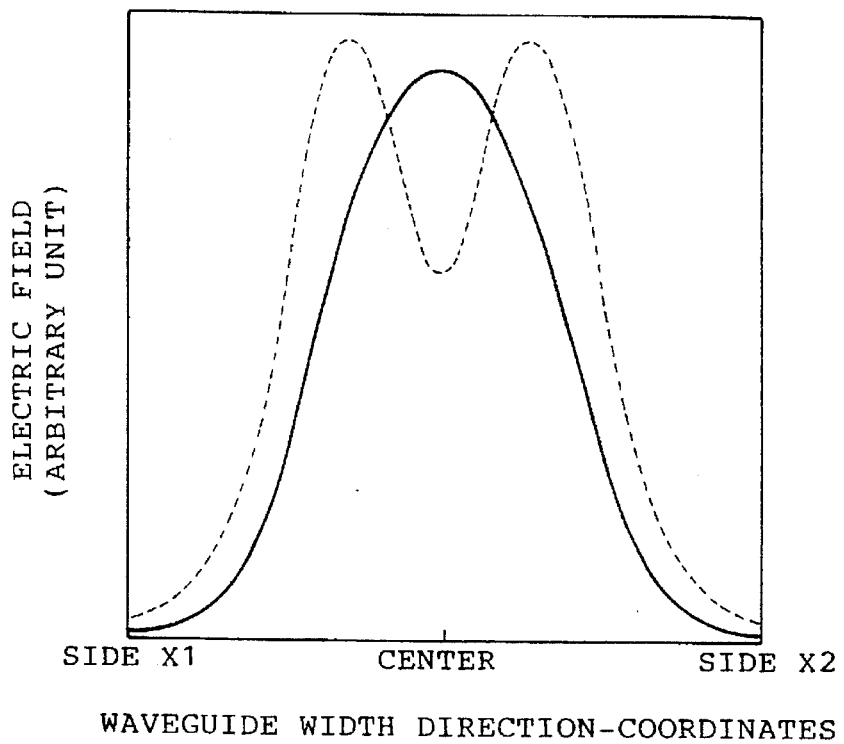
FIG. 10A is a graph showing the electric field distribution of guided light at the end of the first core member 10 or at the coordinate Y1 and the electric field distribution of guided light at the ends of the second and third core members 20, 21 or at the coordinate Y2, shown in FIG. 10B, wherein, in FIG. 10A, the electric field distribution of guided light at the coordinate Y1 is shown by a solid line, whereas the electric field distribution of the guided light at the coordinate Y2, by a dotted line, with the coordinates X1 and X2 shown in FIG. 10A corresponding to the position coordinates X1 and X2 of FIG. 10B.
Figure 10B:
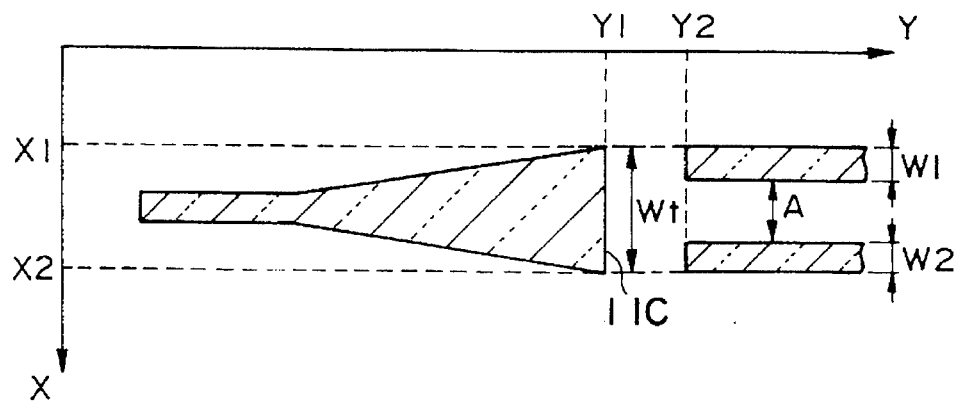
FIG. 10B is an illustration extractive of FIG. 10, with coordinate axes, which shows only the first core member 10, second core member 20, and third core member 21 of the optical branching device shown in FIG. 11.

FIG. 10B is an illustration extractive of FIG. 10, which shows only the first core member 10, second core member 20 and third core member 21 of the optical branching device assembly shown in FIG. 11. FIG. 10B includes coordinate axes.

FIG. 10A is a graph showing the electric field distribution of guided light at the terminal of the first core member 10 or at the coordinate Y1, and the electric field distribution of guided light at the terminals of the second and third core members 20, 21 or at the coordinate Y2, shown in FIG. 10B. In FIG. 10A, the electric field distribution of the guided light at the coordinate Y1 is shown by a solid line, whereas the electric field distribution of the guided light at the coordinate Y2, by a dotted line. The coordinates X1 and X2 shown in FIG. 10A correspond to the position coordinates X1 and X2 of FIG. 10B, respectively. Here "guided light" means light propagated through the core members 10, 20 and 21 of the optical branching device in question. Each distribution shown in FIG. 7A is shown normalized so that the optical power is set at 1. Here, it is assumed that excitation is effected only in the lowest mode in either of the non-branch waveguide 10 and branch waveguides 20, 21.

As mentioned above, the optical branching device shown in FIG. 7A and FIG. 7B has a larger width (Wt) of the first edge face 11c of the tapered section 11 than the optical branching device shown in FIG. 10A and FIG. 10B, related to the dividing waveguide 20, 21.

As FIG. 7A shows, with the increased terminal width (Wt) of the tapered waveguide 11, the electric field distribution at the terminal of the tapered waveguide 11 spreads in the direction of the width of the tapered waveguide 11, providing a larger area of the overlapped portions of the electric fields before and after optical branching. As a result, there is an improvement in the coupling efficiency resulting from the overlap integral of the electric field distributions before and after optical branching. With this improvement, the radiation of guided light between the branch waveguides 20, 21 is suppressed, leading to a reduced optical branch loss as compared with the comparison waveguide type optical branching device.

As explained above, it has been revealed that the optical branching device shown in FIGS. 7A and 7B which satisfies the relationship: WT>W1+W2+A provides a higher optical coupling efficiency than the optical branching device shown in FIGS. 10A and 10B which satisfies the relationship: Wt=W1+W2+A.

The position of the peak P1 of the electric field at end face 20c corresponds to the optical axis OP2 of the second waveguide 20, and the position of the peak P1 of the electric field at end face corresponds to the optical axis OP3 of the third waveguide 21. The distance Wp-p between the peaks P1 and P2 is greater than 2 ($\mu$m) and smaller than Wt ($\mu$m), where Wt is the width of the first edge face.

Next, in order to further increase the optical coupling efficiency, the optical branching device stands in need for further improvement.

Figure 8:
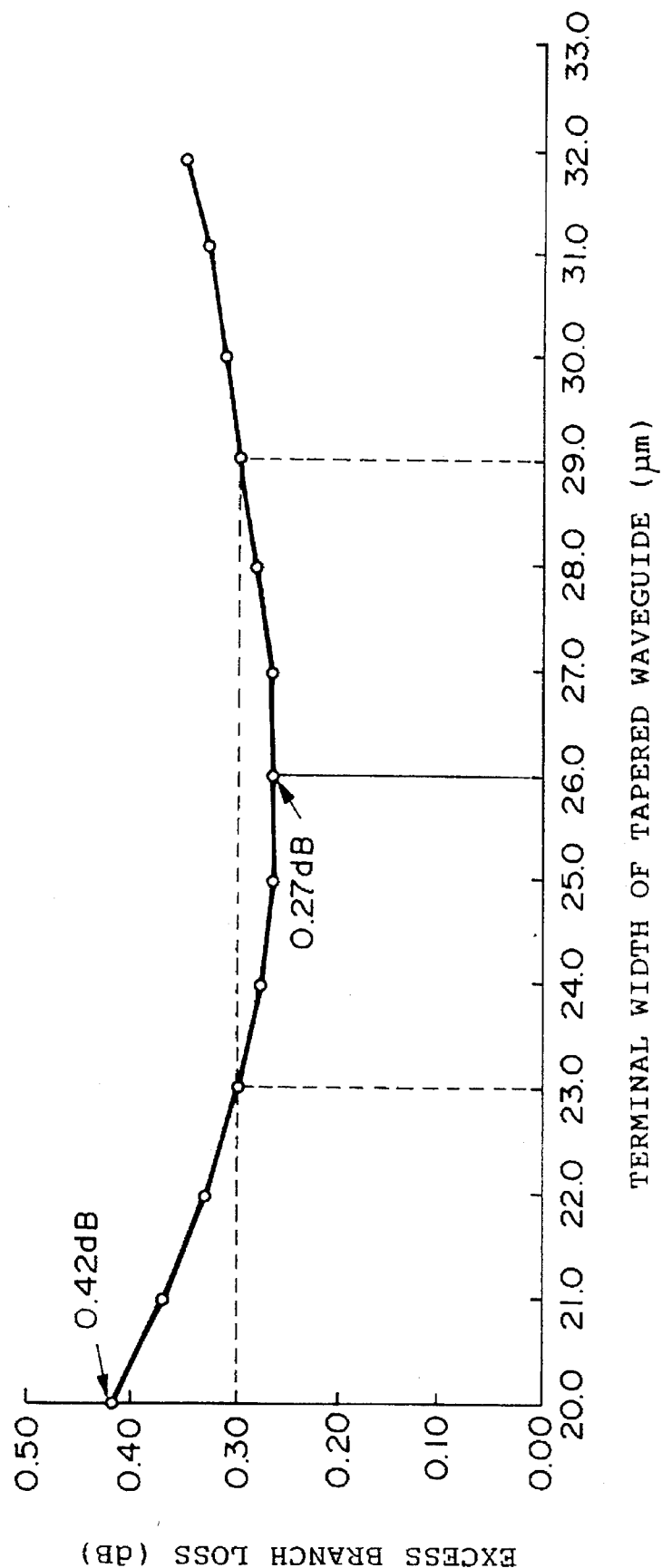
FIG. 8 is a graph showing the relationship between the width (Wt) of the terminal 11c of a tapered waveguide 11 and the excess branch loss (dB) of the optical branching device shown in FIGS. 1-3, wherein the wave length of guided light is 1.55 μm.

FIG. 8 is a graph showing the relationship between the width (Wt) at the terminal of the tapered waveguide 11 and the excess branch loss (dB) of the optical branching device shown in FIGS. 1–3. Particularly, FIG. 8 shows a graph representing the results of calculation of the excess branch loss at a wavelength of guided light of 1.55 $\mu$m while changing the width (Wt) at the terminal 11c of the tapered waveguide 11. Here, the excess branch loss was calculated by the beam propagation method. For this calculation, the dimensions of the respective parts of the waveguide type optical branching device shown in FIG. 2A and FIG. 3 were set as A=4 $\mu$m, B=4 $\mu$m, W=8 $\mu$m, Lt=1200 $\mu$m, and R=50 mm, and the specific refractive index difference between the core and cladding at 0.3%. B stands for the distance between the second edge face 20c of the second core member 20 and the first edge face 11c of the first core member 10. It is noted that B is substantially equal to the distance between the third edge face 21c of the third core member 21, and the first edge face 11c of the first core member 10. Lt stands for the distance between the edge face 11c of the tapered section 11, and the interface 11d between the tapered section 11 and the straight section 12, shown in FIG. 3.

To suppress the loss to a satisfactory degree while maintaining favorable processing stability, preferably the distance (A) between the branch waveguides 20, 21 at the branching section is about 2–4 $\mu$m, and the distance (B) between the non-branch waveguide 10 and the branch waveguides 20, 21 facing it is desired to be about 2–8 $\mu$m.

According to the graph shown in FIG. 8, a minimum loss of 0.27 dB is accomplished in the case where the width (Wt) of the terminal 11c of the tapered waveguide 11 is 6 $\mu$m greater than 20 $\mu$m which is the total (2W+A) of the subtotal (W+W) of the widths (Ws) of the terminals 20c, 21c of the branch waveguides 20, 21, and the distance (A) between the branch waveguides 20, 21-that is, in the case of Wt=26 $\mu$m. The excess branch loss of the optical branching device scaled to Wt=20 $\mu$m is 0.42 dB, whereas the excess branch loss of the optical branching device scaled to Wt=26 $\mu$m is 0.27 dB. Accordingly, the optical branching device shown in FIGS. 7A and 7B provides a considerable reduction in the loss as compared with the optical branching device with the non-increased width of the terminal 11c which is shown in FIG. 10A and FIG. 10B, and suffers from an increased loss of 0.42 dB.

If the width (Wt) of the terminal 11c of the tapered waveguide 11 is enlarged excessively, the radiation of guided light through the enlarged terminal section 11 (described later) increases with a greater loss of the light. In summary, as the graph shown in FIG. 7 suggests, the enlarged width (Wt) of the terminal 11c of the tapered waveguide 11 is desired to be about 10 $\mu$m or less. For long-distance optical communication, the excess branch loss is desired to be 0.3 dB or less. In conclusion, desirably the width (Wt) of the terminal 11c is greater than 23 micrometers, but smaller than 29 micrometers. Particularly, in the case where the terminal width (Wt) of the tapered waveguide 11 is about 25–27 $\mu$m (the increased terminal width is about 5–7 $\mu$m), the excess branch loss converges on a constant value of 0.27 dB. Therefore, for a maximum loss reduction, desirably the width (Wt) of the terminal 11c is larger than 25 micrometers, but smaller than 27 micrometers.

Hereunder, an optical branching device according to another embodiment of the present invention will be explained.

Figure 12:
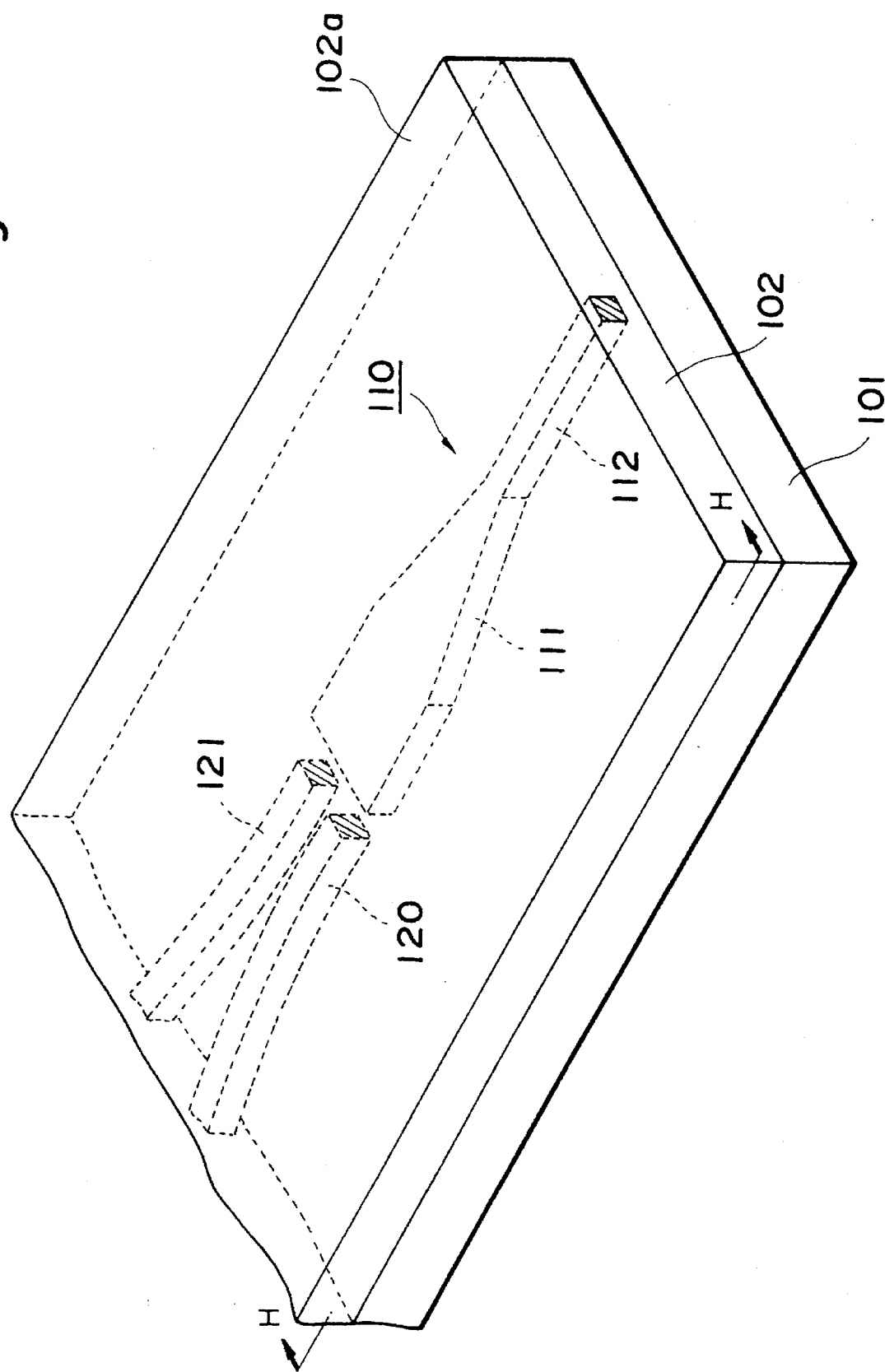
FIG. 12 is a perspective view of an optical branching device according to another embodiment of the present invention.

FIG. 12 is a perspective view of an optical branching device according to another embodiment of the present invention.

Figure 13A:
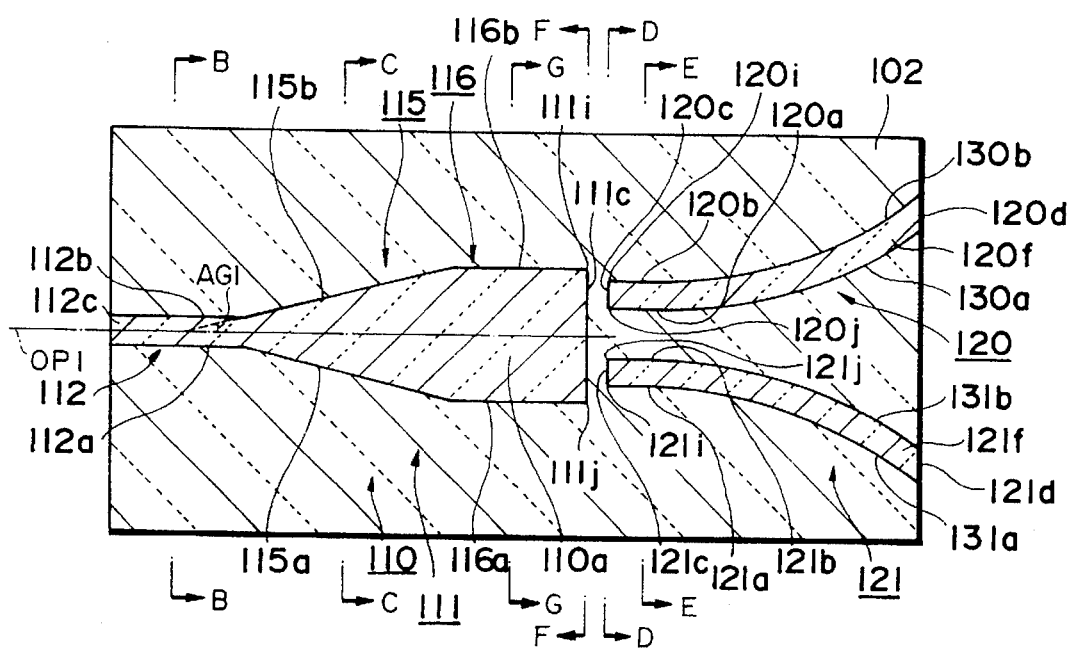
FIG. 13A is a section view of the device shown in FIG. 12, taken along the plane indicated by the arrows H—H in FIG. 12.

FIG. 13A is a section view of this device, taken along the plane indicated by the arrows H—H in FIG. 12.

Figure 13B:
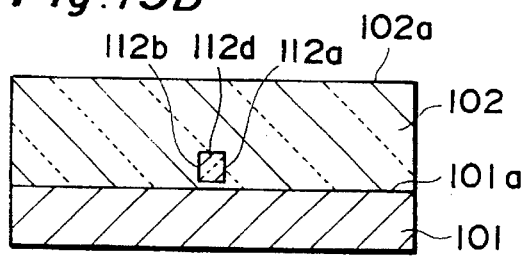
FIG. 13B is a section view of the device shown in FIG. 13A, taken along the plane indicated by the arrows B—B in the drawing.

FIG. 13B is a section view of the device shown in FIG. 13A, taken along the plane indicated by the arrows B—B in the drawing.

Figure 13C:
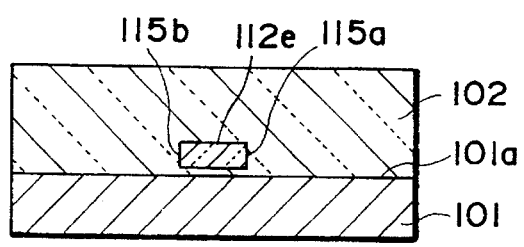
FIG. 13C is a section view of the device shown in FIG. 13A, taken along the plane indicated by the arrows C—C in the drawing.

FIG. 13C is a section view of the device shown in FIG. 13A, taken along the plane indicated by the arrows C—C in the drawing.

Figure 13D:
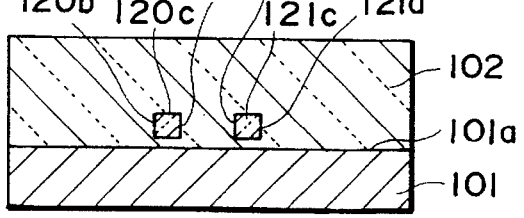
FIG. 13D is a section view of the device shown in FIG. 13A, taken along the plane indicated by the arrows D—D in the drawing.

FIG. 13D is a section view of the device shown in FIG. 13A, taken along the plane indicated by the arrows D—D in the drawing.

Figure 13E:
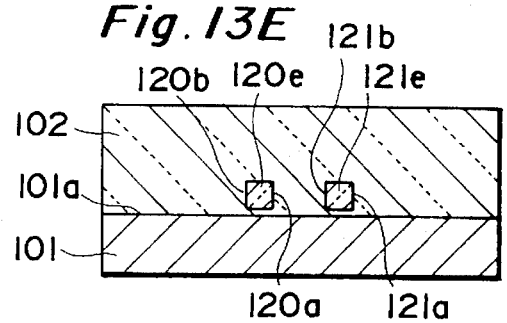
FIG. 13E is a section view of the device shown in FIG. 13A, taken along the plane indicated by the arrows E—E in the drawing.

FIG. 13E is a section view of the device shown in FIG. 13A, taken along the plane indicated by the arrows E—E in the drawing.

Figure 13F:
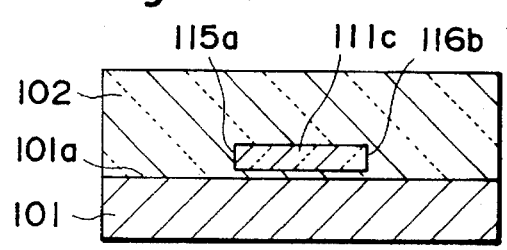
FIG. 13F is a section view of the device shown in FIG. 13A, taken along the plane indicated by the arrows F—F in the drawing.

FIG. 13F is a section view of the device shown in FIG. 13A, taken along the plane indicated by the arrows F—F in the drawing.

Figure 13G:
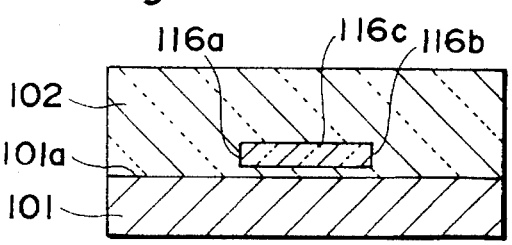
FIG. 13G is a section view of the device shown in FIG. 13A, taken along the plane indicated by the arrows G—G in the drawing.

FIG. 13G is a section view of the device shown in FIG. 13A, taken along the plane indicated by the arrows G—G in the drawing.

Figure 14:
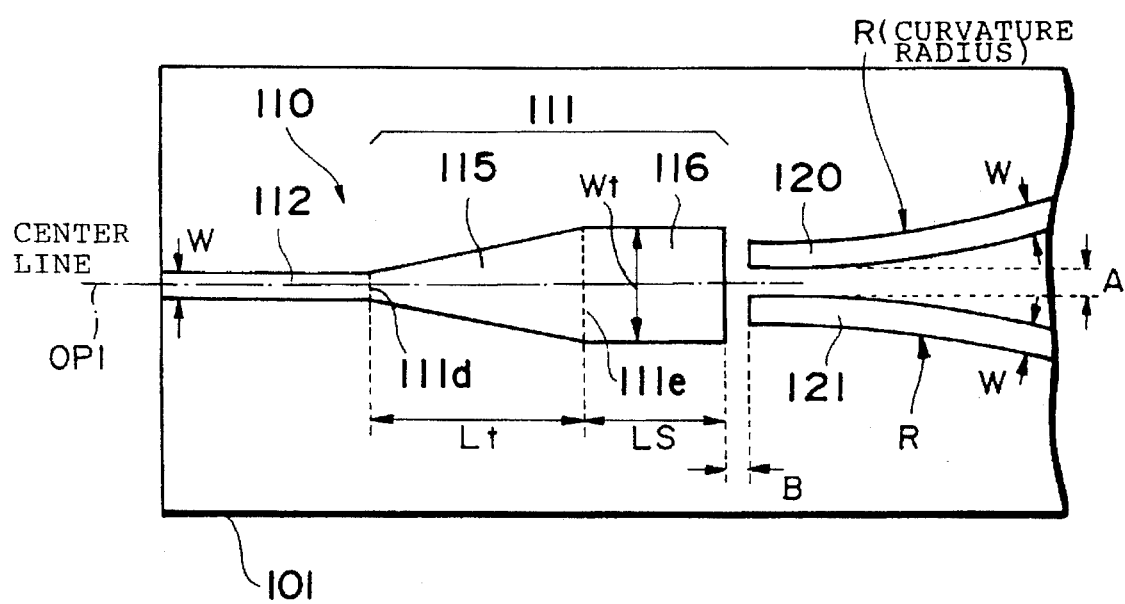
FIG. 14 is a section view of the device shown in FIG. 13A.

FIG. 14 is a section view of the device shown in FIG. 13A.

This waveguide type optical branching device comprises, at the terminal 11c of the tapered waveguide 11 of the waveguide type optical branching device shown in FIG. 1, a tapered waveguide 115 with a structure constructed by addition to the terminal 11c of the tapered section 11 of a straight section 116 of almost the same width.

With this structure, the guided light whose wave front has spread radially in the tapered section 115 may be input into branch waveguides 120, 121 after being restored to a plane.

Figure 15:
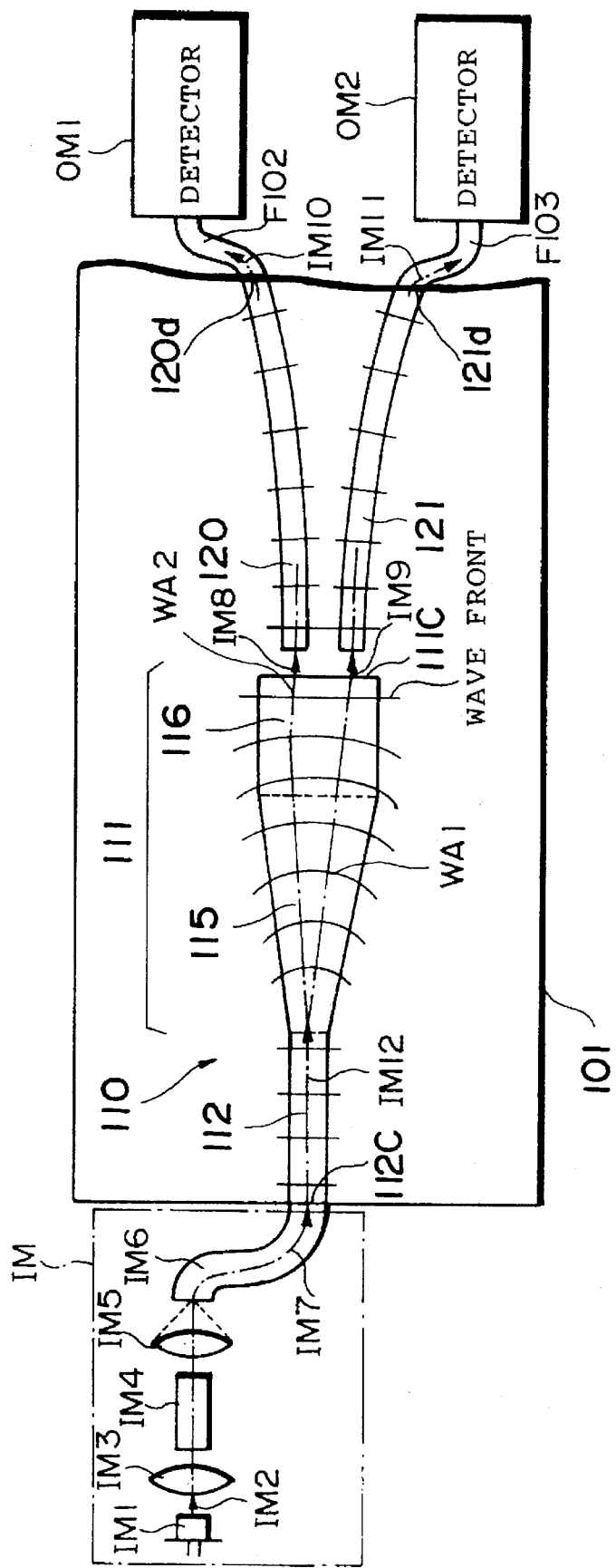
FIG. 15 is a view illustrating a manner of propagation of a wave front of light in the device shown in FIG. 14, wherein the light input into the first core member 110 loses the optical power density (energy density) as it travels in the direction from the first vertical section 112e to the first edge face 111c, while the wave front WA1 of the light fans out in the first horizontal section 110a, and wherein the wave front WA2 of the light becomes parallel to the first edge face 111c during the propagation of the light from the second perpendicular section 116c to the first edge face 111c because the area of the second perpendicular section 116c is equal to the area of the first edge face 111c.

FIG. 15 illustrates the manner of travelling of the wave front. The above-noted restoration contributes to the suppressed radiation (reflection, diffraction) of guided light at the section of the edge face of the tapered waveguide 111 near the branching section which is provided for increasing the terminal width (the section having a width larger than the total of the terminal widths of the branch waveguides 120, 121, and the distance between the branch waveguides 120, 121), thereby enabling a further reduction in the radiation loss at the branching section.

A more detailed explanation will be made regarding the optical branching device according to the present embodiment.

As FIG. 12 shows, the waveguide type optical branching device according to the present embodiment comprises a silicon substrate 101, a cladding member 102 formed on the supporting substrate 101, a first core member (first tapered waveguide) 110, a second core member (second waveguide) 120, and a third core member (third waveguide) 121.

The first core member 110 is embedded in the cladding member 102. The second core member 120 is embedded in the cladding member 102 as well. Also, the second core member 120 has a second edge face 120c facing the edge face 111c of the first core member 110 at a first space B. The third core member 121 is also embedded in the cladding member 102. The third core member 121 has a third edge face 121c facing the edge face 111c of the first core member 110 at a second space B. Here, the first space B and the second space B are designed to be identical. The space B(1) between the edge faces 111c and 120c, and the space B(2) between the edge faces 111c and 121c have a following equation.

$$B(2)-\lambda \leq B(1) \leq B(2)+\lambda,$$

where $\lambda$ is wavelength of the guided light traveling through the core member 110. Then the space B(1) is substantially equal to B(2). The wavelength $\lambda$ of the guided light using in present embodiment is 1.55 μm. In other words, the first space B(1) is not greater than the total of the space of said second space B(2) and the wavelength ($\lambda$) of the light propagated in said second core member 120, and not smaller than the difference between said second space B(2) and the wavelength ($\lambda$) of the light propagated in said second core member 120.

The cladding member 102 (cladding 102, cladding layer 102) has a first surface 102a. The first surface 102a is parallel to the main surface 101a of the substrate 101. The main surface 101a is defined by the interface between the cladding member 102 and substrate 101. "Direction of the width" is defined to be the direction perpendicular to both the direction perpendicular to the first surface 102a, and to the direction of light propagation. "Direction of the thickness" is defined to be the direction perpendicular to the first surface 102a. The first core member 110 has a light transmission path 112 of given width and thickness, a core section 115, which is contiguous with the light transmission path 112, of a tapered type whose width increases as the distance from the light transmission path 112 does, and a second core section 116 adjacent to the core section 115.

The width 112 of the light transmission path 112 is defined by the distance between the side 112a and side 112b in FIG. 13A.

The first core member 110 has a fifth perpendicular section 112d which is defined by intersection with a plane (plane indicated by the arrows B—B in FIG. 13A) which is perpendicular to the first surface 102a.

The first core member 110 has a first perpendicular section 112e which is defined by intersection with a first plane (plane indicated by the arrows C—C in FIG. 13A) perpendicular to the first surface 102a.

The first core member 110 has a second perpendicular section 116c which is defined by intersection with a second plane (plane indicated by the arrows G—G in FIG. 13A) perpendicular to the first surface 102a and located between the first edge face 111c and first plane (B—B plane).

The first core member 110 has a first horizontal section (110a in FIG. 13A) which is defined by intersection with a third plane (plane indicated the arrows H—H in FIG. 1) parallel to the first surface 102a.

The second core member 120 has a third perpendicular section 120e which is defined by intersection with a fourth plane (plane indicated by the arrows E—E in FIG. 13A) which is perpendicular to the first surface 102a. The second core member 120 has a second horizontal section (120f in FIG. 13A) which is defined by intersection with the third plane (H—H plane). The third core member 121 has a fourth perpendicular section 121e which is defined by intersection with the fourth plane (E—E plane). The third core member 121 has a third horizontal section 121f which is defined by intersection with the third plane (H—H plane).

The first core member 110 is located so that the light input into the first core member 110 through the edge face 112c is propagated in the direction along the first horizontal section 110a across the first perpendicular section 112e and second perpendicular section 116c, and output from the first edge face 111c.

Here, it is assumed that the sections are parallel to the first edge face 111c, and perpendicular to the direction of movement of guided light.

The second core member 120 is located so that the output light from the first edge face 111c is input into the second core member 120 through the second edge face 120c, and is propagated in the direction along the second horizontal section 120f across the third perpendicular section 120e, and output at the second edge face 120d of the second core member 120. The third core member 121 is located so that the output light from the first edge face is input into the third core member 121 through the third edge face 121c, and is propagated in the direction along the third horizontal section 121f across the fourth perpendicular section 121e, and output from the third core member 121.

In this connection, the area of the first edge face 111c is larger than the area of the first perpendicular section 112e. This is because the first core member 110 has a tapered section 115 which diverges toward the direction of the second and third core members 120, 121. The tapered section 115 has sides 115a, 115b which form given angles with the optical axis OP1 (center line) of the first core member 110. In other words, the intersections 115a, 115b between the two surfaces 115a, 115b perpendicular to the first surface 102a of the section 115, and the lines 115a, 115b crossing the third plane (H—H plane) form given angles AG1 with the optical axis OP1 (center line) of the first core member 110 in the third surface (H—H plane).

In other words, this branch waveguide comprises a substrate 101 with a substrate surface 101a, a first tapered waveguide 110, a second waveguide 120 and a third waveguide 121.

The first tapered waveguide 110 comprises a fourth waveguide 116, and a second tapered waveguide 115 which is adjacent thereto. The first tapered waveguide 110 is formed on the substrate surface 1a.

The fourth waveguide 116 has a first edge face 111c including a plane which crosses the substrate surface 1a, a fifth side 116a including a plane which crosses the substrate surface 1a, and a sixth side 111c parallel to the fifth side 116a.

The second tapered waveguide 115 is contiguous with the fourth waveguide (straight waveguide) 116. The second tapered waveguide 115 diverges toward the fourth waveguide 116. The second waveguide 120 is formed on the substrate surface 1a. The second waveguide 120 has a second edge face 120c facing the first edge face 111c at a given space.

The third waveguide 121 is formed on the substrate surface 101a. The third waveguide 121 has a third edge face 121c facing the first edge face 111c at a given space. As the first core member 110 comprises the tapered section 115, the density of the energy (power) of the optical signal input into the first core member 110 at the edge face 112c decreases gradually as the light travels passing through the first perpendicular section 112d toward the first edge face 111c.

The output light from the edge face 111c of the first core member 110 is input into the second core member 120 through the second edge face 120c, and into the third core member 121 through the third edge face 121c. The present inventors have found, based on their previous research, that for the improvement in coupling efficiency of light propagated between two optical components it is effective to make the opposing edge faces of the respective optical components perpendicular to the direction of light propagation. The first edge face 111c of the optical branching device according to the present embodiment is perpendicular to the direction of movement of the light passing through the first edge face 111c. Also, the second edge face 120c is perpendicular to the direction of movement of the incident light to the second edge face 120c. The third edge face 121c is perpendicular to the direction of movement of the incident light to the third edge face 121c.

As a result, the first edge face 111c is opposite to the second edge face 120c, whereas the first edge face 111c is parallel to the second edge face 120c. The first edge face 111c is opposite to the third edge face 121c, whereas the first edge face 111c is parallel to the third edge face 121c.

For a further improvement in the optical coupling efficiency of the optical branching device, the area of the second perpendicular section 116c is made identical to the area of the first edge face 111c for the optical branching device according to the present embodiment. In other words, the width of the second perpendicular section 116c is identical to the width (Wt) of the first section 111c.

More particularly, as shown in FIG. 15, the light input into the first core member 110 gradually loses its optical power density (energy density) as it travels from the first perpendicular section 112e to the first edge face 111c, while the wave front of the light fans out in the first horizontal section 110a. In the case where the area of this second perpendicular section 116c is equal to the area of the first edge face 111c, the wave front becomes parallel to the first edge face during its propagation from the second perpendicular section 116c to the first edge face 111c.

As a result, the directivity of the light output from the first edge face 111c is increased, which results in an increased coupling efficiency of the light entering the second core member 120 and third core member 121.

In addition, as the second edge face 120c and third edge face 121c are parallel to the wave front WA2 leaving the first edge face 111c, the optical coupling efficiency is increased.

In summary, the first core member 110 has the first edge face 111c which aids in lowering the energy density of the input light, and is in the form which makes the wave front WA1 of the light parallel to the first edge face 111c for its exit through the first edge face 111c. The second core member 120 has the second edge face 120c facing the first edge face 111c at a given space, and the third core member 121c has a third edge face 121c facing the first edge face 111c at a given space (B).

The light travels through the light transmission path (core) 112 of a given width (core size). The light transmission path 112c is a part of the first core member 110 which is adjacent to the tapered waveguide 115, and has the same sectional area as the minimum sectional area of the first perpendicular section 112e.

The second core member 120 has sides 120a, 120b perpendicular to the first surface 102a and to the second edge face 120c. The side 120a and side 120b are parallel to the direction of movement of the light propagated in the second core member 120. In this connection, the side 120a and side 120b faces each other, while the side 120a and side 120b run in parallel with each other. Accordingly, the sides 120a and side 120b are perpendicular to both the first surface 102a and the second edge face 120b.

Similarly, the third core member 121 has sides 121a, 121b which are perpendicular to the first surface 102a. The side 121a and side 121b are parallel to the direction of movement of the light propagated in the third core member 121. In turn, the side 121a and side 121b are opposite to each other, whereas the side 121a and side 121b are parallel to each other. Thus, the side 121a and side 121b are perpendicular to both the first surface 102a and third edge face 121c.

The width (Wt) of the first edge face 111c is greater than the distance between the second side 120c and the third side 121c.

In other words, an intersection (cross line) 120i is an intersection of the second edge face 120c and second side face 120b. An intersection (cross line) 121i is an intersection of the third edge face 121c and third side face 121a.

An intersection (cross line) 120j is an intersection of the second edge face 120c and first side face 120a. An intersection (cross line) 121*j* is an intersection of the third edge face 121*c* and fourth side face 121*b*. An intersection (cross line) 111*i* is an intersection of the first edge face 111*c* and the side face 111*b*. An intersection (cross line) 111*j* is an intersection of the first edge face 111*c* and the side face 111*a*. The distance between the line 111*i* and 111*j* is wt (μm), the distance between the line 120*i* and 121*j* is (2W+A) (μm), distance Wt is greater than (2W +A).The distance between the side face 20*a* and side face 21*b* is A. In other words, the distance between the line 21*j* and 20*j* is A.

The space between the second core member 120 and the third core member 121 increases as their distance from the first core member 110 does. This is because the second core member 120 comprises bent sides 130*a*, 130*b* bending apart from the third core member 121. The bent side 130*a* is adjacent to the plane 120*a*, whereas the bent side 130*b* to the plane 120*b*. The curvature radius of the bent side 130*a* is R, and also the curvature radius of the bent side 130*b* is almost R. The third core member 121 has bent sides 131*a*, 131*b* bending apart from the second core member 120. The bent side 131*a* is adjacent to the plane 121*a*, whereas the bent side 131*b* to the plane 121*b*. The curvature radius of the bent side 131*a* is R, and also the curvature radius of the bent side 131*b* is almost R.

The light output from the second edge face 120*c* and input into the second core member 120 is then output through the edge face 120*d* of the second core member 120. The light output from the third edge face 121*c* and input into the third core member 121 is then output through the edge face 121*d* of the third core member 121. In this connection, the optical distance from the input edge face 120*c* to the output edge face 120*d* of the second core member 120 is equal to the optical distance between the input edge face 121*c* and the output edge face 121*d* of the third core member 121. As a result, in cases where beams of the light input from the first core member 110 into the core members 120, 121 are output from the core members 120, 121, the beams of the light branched by the core members 120, 121 are in the same phase upon output from the edge faces 120*d*, 121*d*. Since the beams of the output light from the edge faces 120*d*, 121*d* are in one phase, the phase matching of the respective beams are easy to perform for coupling of the output light, etc.

The fourth waveguide 116 has face (fifth side) 116*a* and face (sixth face) 116*b*. These faces 116*a*, 116*b* are substantially parallel to each other, and in other words, the area (S1) of first edge face 111*c* is substantially equal to the area (S2) of the second perpendicular section 116*c*. The word "substantially" means as follows. The angle between the line 116*a* and line 116*b* is less than 3 degree and more than and equal to 0 degree. The area (S1) is greater than the area (S2)×97% and less than the area (S2)×103%.

The optical component device shown in FIG. 15 comprises a light input means IM, first optical detector OM1, and second optical detector OM2. The input means IM is connected to the edge face 112*c* of the first waveguide 110. The input means IM comprises a light source IM1, a first input fiber IM4, a second input fiber IM6, a lens IM3 arranged between said light source such as laser diode IM1 and said first input fiber IM4, a lens IM5 arranged between said first input fiber IM4 and second input fiber IM6. The second input fiber IM6 is connected to the first waveguide 110 at the edge face 112*c* directly. The first output detector OM1 is connected to the edge face 120*d* of the second waveguide 120, through a output fiber F102. The output fiber is connected to the edge 120*d* of the second waveguide 120 directly. The second output detector OM2 is connected to the edge face 121*d* of the third waveguide 121, through a output fiber F102. The output fiber OM2 is connected to the edge 121*d* of the third waveguide 121 directly. The light travelling through the system is identified by signs IM2, IM7, IM12, IM8, IM9, IM10, IM11, in this figure.

Figure 16:
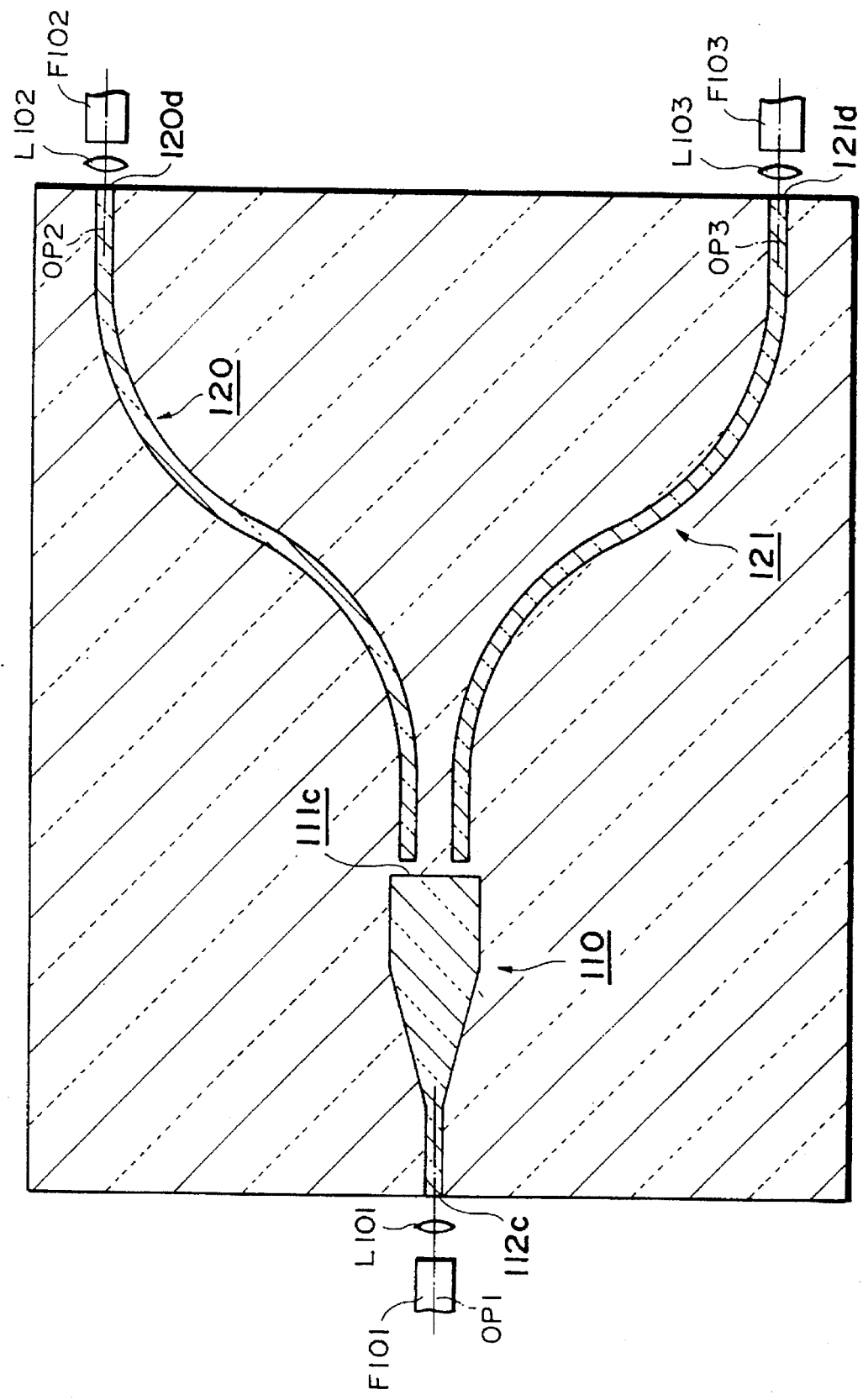
FIG. 16 is a section view of a modification of the optical branching device shown in FIG. 13A with improvements made on the edge faces 120d, 121d of the second core member 120 and third core member 121.

FIG. 16 shows a modification of the optical branching device shown in FIG. 13A with improvements made on the edge faces 120*d*, 121*d* of the second core member 120 and third core member 121. The edge faces 120*d*, 121*d* of the optical branching device shown in FIG. 13A is exposed. The direction of the normal to the exposed edge face 120*d* forms a given angle with the direction of movement of the light (direction of the optical axis) propagated in the third core member 121. Also, the direction of the normal to the exposed edge face 121*d* forms a given angle with the direction of movement of the light propagated in the third core member 121. More particularly, the second core member 120 and the third core member 121 are S-shaped waveguides. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis). For this finding, as shown in FIG. 16, the optical branching device according to the present embodiment is positioned so that the output edge face 120*d* of the second core member 120 is perpendicular to the optical axis OP2 (indicated by an alternating long and short dash line) of the second core member 120. Optical fiber F102 is located opposite to the edge face 120*d* of the second core member 120 via a lens L102. Additionally, the third core member 121 is located so that the output edge face 121*d* of the third core member 121 is perpendicular to the optical axis OP3 (indicated by an alternating long and short dash line) of the third core member 121. Optical fiber F103 is located opposite to the edge face 121*d* of the third core member 121 via a lens L103. Additionally, the first core member 110 is located so that the input edge face 112*c* of the first core member 110 is perpendicular to the optical axis OP1 (indicated by an alternating long and short dash line) of the first core member 121. Optical fiber F101 is located opposite to the edge face 112*c* of the first core member 110 via a lens L101. The optical axes OP1, OP2, OP3 of the waveguide 110, 120, 121 correspond to axes OP1, OP2, OP3 of the fiber F101, F102, F103, respectively.

Figure 17:
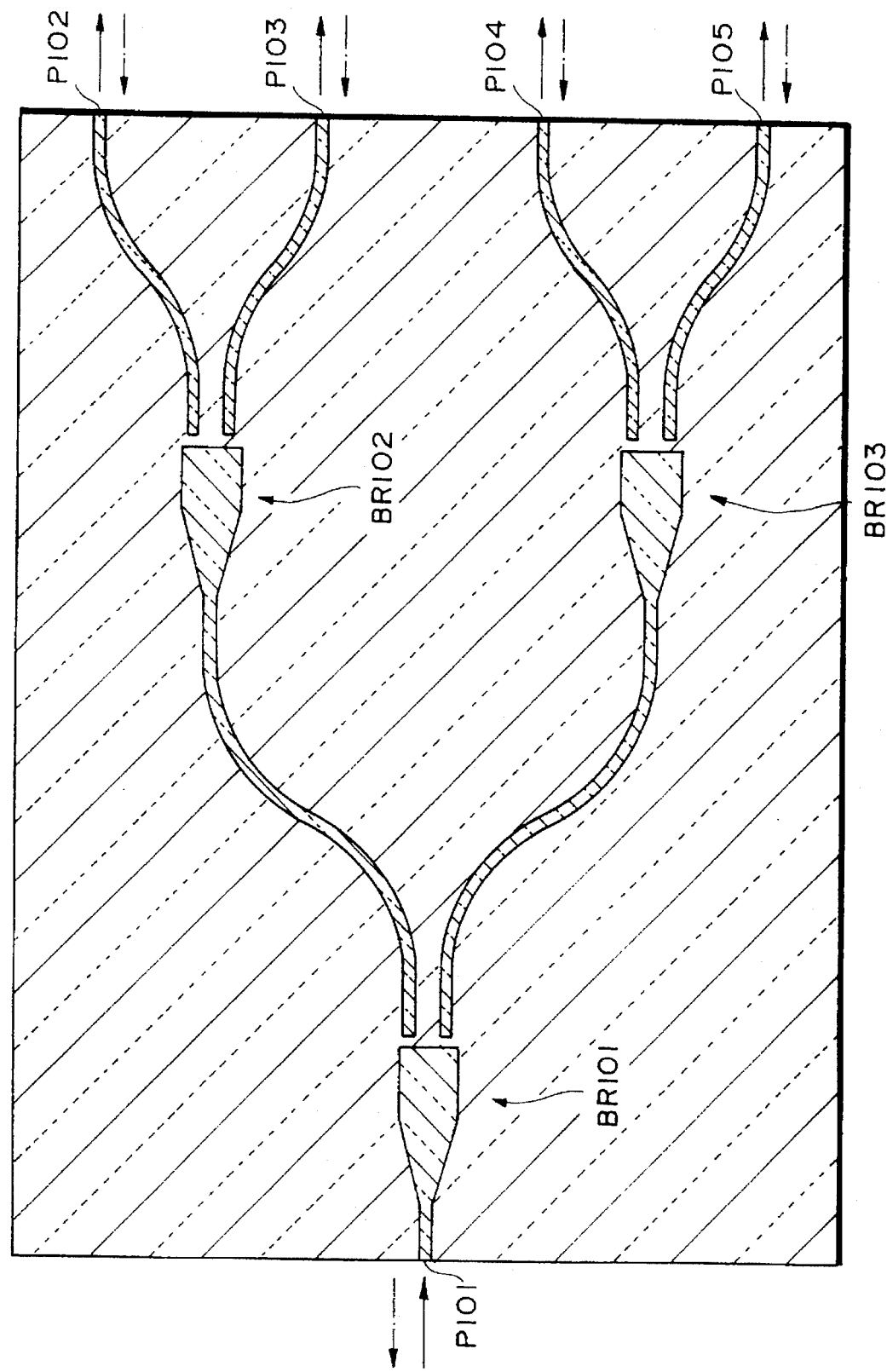
FIG. 17 is a section view of an optical branching device assembly with a 1×4 structure which consists of 3 connected optical branching devices BR101, BR102 and BR103 of the type shown in FIG. 16.

FIG. 17 is an optical branching device assembly with a 1×4 structure which consists of 3 connected optical branching devices BR101, BR102 and BR103 of the type shown in FIG. 16. This optical branching device assembly comprises the first optical branching device BR101, the second optical branching device BR102 whose input edge face 112*c* is connected to the output edge face 120*d* of the first optical branching device BR101, and the third optical branching device BR103 whose input edge face 112*c* is connected to the output edge face 121*d* of the first optical branching device BR101. The optical signal (indicated by a solid arrow in the drawing) input into the first optical branching device BR101 through the edge face P101 is divided with this optical branching device, and output through the edge faces P102, P103 of the second optical branching device BR102, and through the edge faces P104, P105 of the third optical branching device BR103. Conversely, the respective optical signals (indicated by alternating long and short dash arrows) input at the edge faces P102–P105 are coupled with the optical branching device, and output from the edge face P101.

Figure 20:
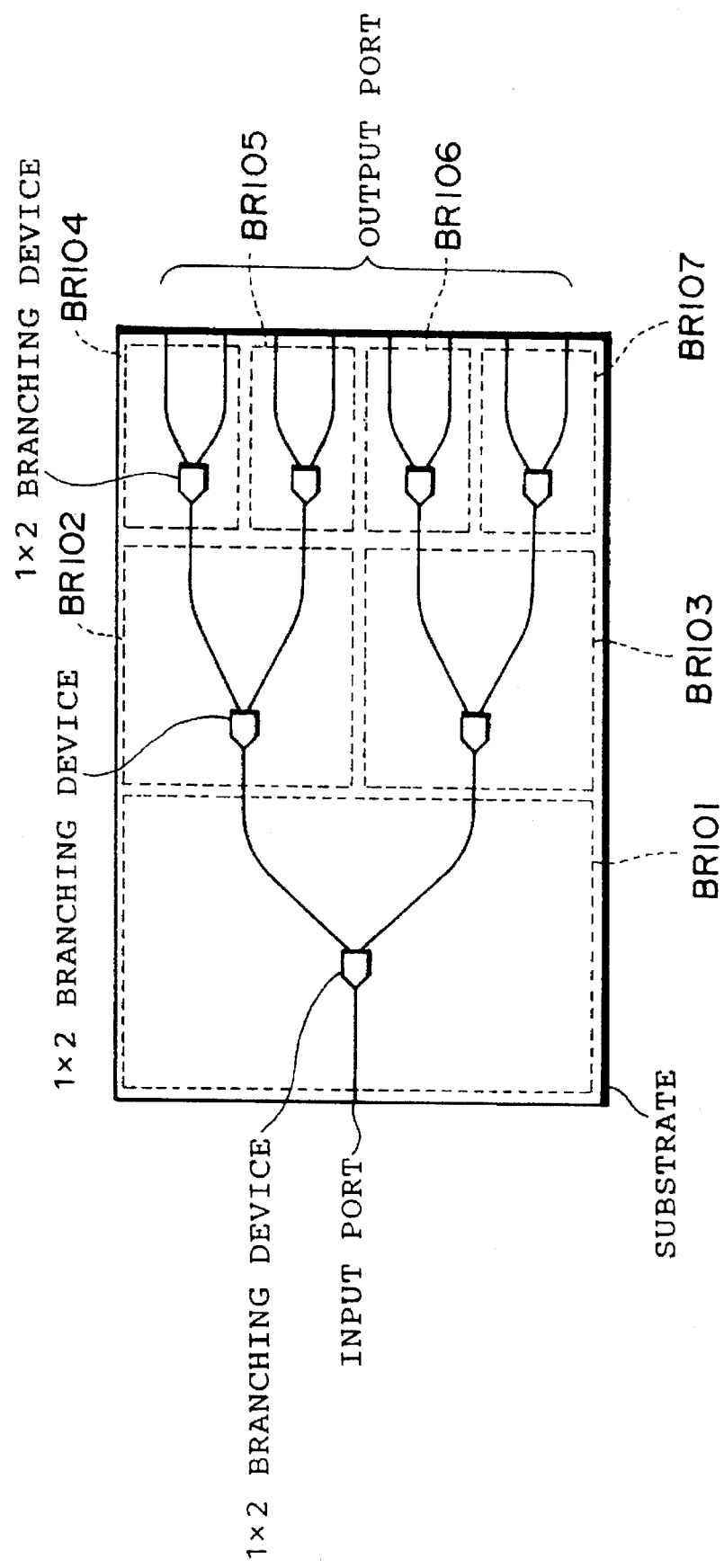
FIG. 20 is a section view of an optical branching device assembly with a 1×8 structure which consists of 7 connected optical branching devices BR101, BR102, BR103, BR104, BR105, BR106 and BR107 of the type shown in FIG. 16.

FIG. 20 is an optical branching device assembly with a 1×8 structure which consists of 7 connected optical branching devices BR101, BR102, BR103, BR104, BR105, BR106 and BR107 of the type shown in FIG. 4. This optical branching device assembly comprises the first optical branching device BR101 with an input edge face (input port), the second optical branching device BR102 whose input edge face 112c is connected to the output edge face 120d of the first optical branching device BR101, and the third optical branching device BR103 whose input edge face 112c is connected to the output edge face 121d of the first optical branching device BR101. In addition, this optical branching device assembly comprises the fourth optical branching device BR104 whose input edge face 112c is connected to the output edge face 120d of the second optical branching device BR102, the fifth optical branching device BR105 whose input edge face 112c is connected to the output edge face 121d of the second optical branching device BR101, the sixth optical branching device BR106 whose input edge face 112c is connected to the output edge face 120d of the third optical branching device BR103, and the seventh optical branching device BR107 whose input edge face 112c is connected to the output edge face 121d of the third optical branching device BR103.

Accordingly, this optical branching device assembly may branch single light beam input into the assembly, into eight beams, and reversely may couple eight beams input into this assembly into single beam. In this connection, all the optical branching devices BR101, BR102, BR103, BR104, BR105, BR106, and BR107 are formed on the same substrate 1.

Figure 18:
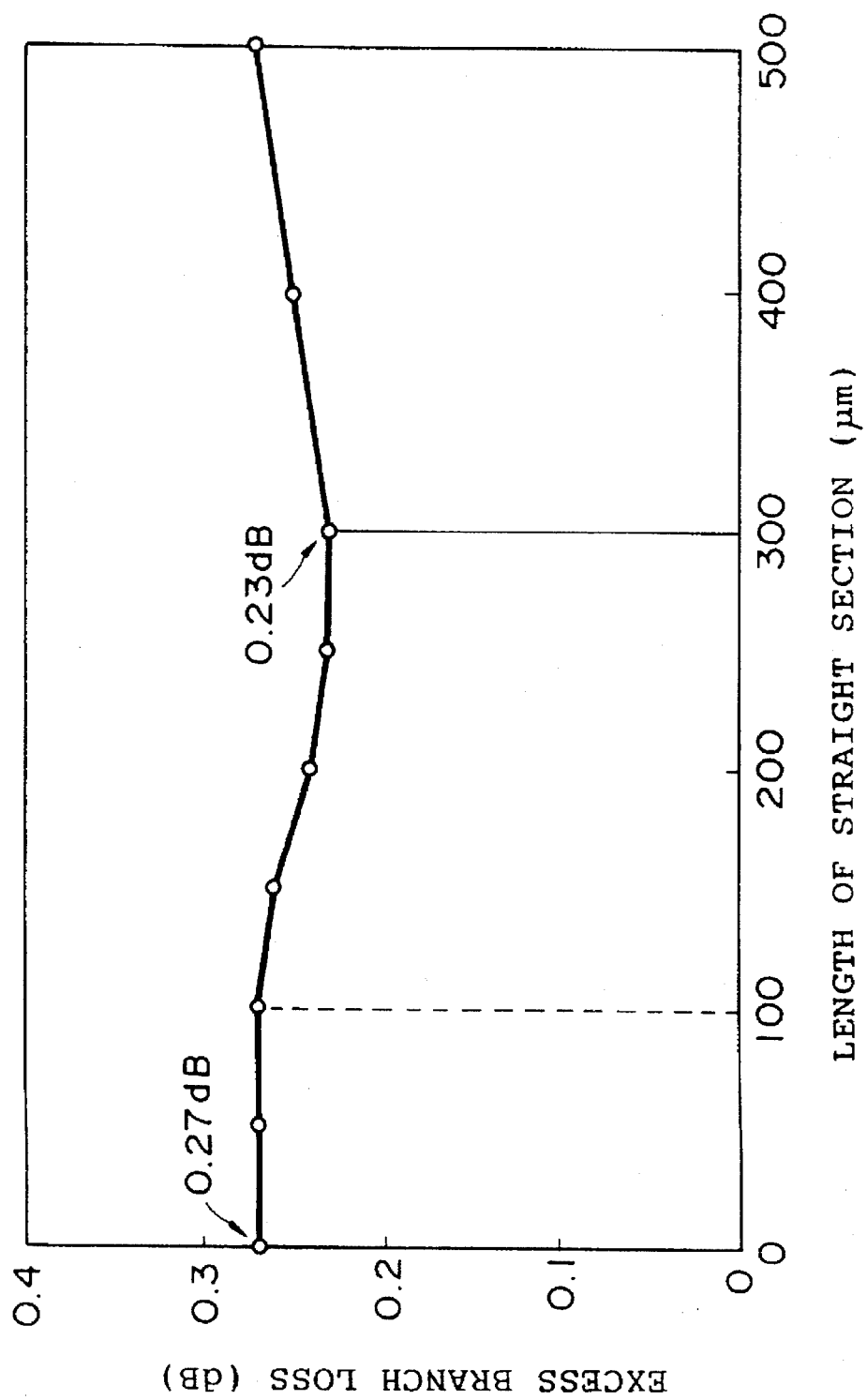
FIG. 18 is a graph illustrating the relationship between the length Ls of the straight section 116 and the excess branch loss, wherein the wave length of guided light is 1.55 μm.

FIG. 18 is a graph showing the relationship between the length Ls of the straight section 116 and the excess branch loss. More particularly, it is a graph which represents the results of calculation by the beam propagation method of the excess branch loss of the optical branching device shown in FIG. 12 for guided light at a wavelength of 1.55 µm. For calculation, the dimensions of the respective parts of the waveguide type optical branching device were set to be A=4 µm, B=4 µm, W=8 µm, Lt=1200 µm, and R=50 mm. The terminal width (Wt) of the tapered section 15 is 26 µm, the wavelength for which a maximum loss reduction was observed with the waveguide type optical branching device shown in FIG. 1. The specific refractive index difference between the core and cladding was set to be 0.3%. B is the distance between the second edge face 120c of the second core member 120 and the first edge face 111c of the first core member 110. Here, B is equal to the distance between the third edge face 121c of the third core member 121, and the first edge face 111c of the first core member 110. Ls is the distance between the edge face 111c of the fourth waveguide 116 of the tapered section 111, and the interface between the fourth waveguide 116 and the second tapered section 115, shown in FIG. 14. Lt is the distance between the interface 111e, and the interface 111d between the second tapered waveguide 115 and the optical waveguide 112, shown in FIG. 14.

As FIG. 18 shows, the minimum excess loss is 0.23 dB with the waveguide type optical branching device shown in FIG. 12. This minimum value is accomplished when the length of the straight section 116 is about 300 µm. The minimum excess loss with the waveguide type optical branching device shown in FIG. 1 is 0.27 dB. In conclusion, the optical branching device shown in FIG. 12 is more excellent than the optical branching device shown in FIG. 1. It has been confirmed that the waveguide type optical branching device shown in FIG. 12 has a greater effect on the loss reduction.

If the straight section (fourth waveguide) 116 is excessively long, then loss at sections other than the branching section increases due to the occurrence of the higher mode, etc. Therefore, the length (Ls) of the straight section 116, or the length of the sixth side 116c is preferred to be about 300 µm for which the minimum loss is observed. In this connection, the excess branch loss significantly lowers in cases where the length of the straight section 116 is shorter than 400 micrometers, but is longer than 100 µm. Accordingly, it is desired that the length of the third waveguide 116, or the length of the sixth side 116b is shorter than 400 micrometers, but is longer than 100 µm. At a length of the straight section 116, or the length of the sixth side 116c of 300 micrometers or less, but greater than 250 µm, the value of excess branch loss converges on a constant value (the minimum value: 0.27 dB).

For the confirmation of the effect of the optical branching device according to the present embodiment, the present inventors fabricated the optical branching devices shown in FIG. 1, FIG. 12, and FIG. 11. The present inventors measured the light transmission properties of the devices. The results will be given hereunder.

First Experiment

The present inventors prepared the waveguide type optical branching devices shown in FIG. 1, FIG. 12, and FIG. 11. The branch waveguide of FIG. 11 was prepared for comparison in properties with the branch waveguide of FIG. 1 and FIG. 12. 1×2 structures were fabricated with these branch waveguides.

These waveguide type optical branching devices were prepared by forming a $SiO_2$ glass layer (cladding) on a silicon substrate 1 or 101 by the FHD (flame hydrolysis deposition) method, depositing a doped $SiO_2$ glass layer with a high refractive index, forming a core by etching, and forming a upper cladding by the deposition of a $SiO_2$ glass layer.

The dimensions of the respective parts of the respective devices are represented as follows using the reference characters employed in FIG. 1, FIG. 12, FIG. 11.

A=4 µm
B=4µm
W=8 µm
Lt=1200 µm
R=50 mm (The above dimensions are common to the three types of FIGS. 1, 12, and 11.)

The terminal widths (Wts) of the first tapered waveguides and the length Ls of the straight section 16 were different as follows:

For the type shown in FIG. 1 (an embodiment of the present invention), Wt=26 µm, Ls=0 µm.

For the type shown in FIG. 12 (another embodiment of the present invention), Wt=26 µm, Ls=250 µm.

For the type shown in FIG. 11 (a comparison), Wt=20 µm, Ls=0 µm. In all the cases, the specific refractive index difference between the core and cladding was 0.3%, and the thickness of the waveguide was 8 µm.

Laser diode light with a wavelength of 1.55 µm was input into and output from each of the above-noted waveguide type optical branching devices through single mode fiber for measurement of the excess branch loss. The excess branch loss is defined to be the value calculated by subtracting the total of the essential loss with a 1×2 branching structure of 3 dB, the coupling loss with the input, output fiber, and the transmission loss of the waveguides from the entire loss with the optical branching device.

Ten samples were prepared for each type of device, and averages of the measured values were taken. As a result, the mean excess branch losses were as follows:

0.36 dB for the type of FIG. 1 (an embodiment of the present invention);

0.32 dB for the type of FIG. 12 (another embodiment of the present invention); and 0.55 dB for the type of FIG. 11 (a comparison). The measurement error was ±0.05 db. Accordingly, even if a measurement error happened, it is noted that there exists a significant difference between the devices according to the present embodiments and the comparison device. It was actually confirmed that the scaling up of the terminal width of the first tapered waveguide 11 or 111 contributed to a reduction in the optical branch loss.

Second Experiment

The present inventors manufactured waveguide type optical branching devices with a 1×8 structure shown in FIG. 6 and FIG. 20. Further, another waveguide assembly with a 1×8 structure (device as a second comparison) using waveguides shown in FIG. 11. The second comparison device was prepared for comparison in properties with the branch waveguide assemblies shown in FIG. 6 and FIG. 20. The present inventors measured the excess branch loss with each device. The 1×8 device according to each of the embodiments of the invention was constructed with a structure where the terminals of branch waveguides 20, 21 (120, 121) of the 1×2 device according to the embodiment of the invention were connected to the first tapered waveguide 11 (or 111) of another 1×2 device according to the same embodiment. The entire device comprised a combination of a plurality of the 1×2 devices of each embodiment arranged in the direction of propagation of light.

The prepared devices are a 1×8 device which is a three-stepped branching assembly of the 1×2 devices shown in FIG. 1, and another three-stepped branching 1×8 device comprising the devices shown in FIG. 12. The comparison 1×8 device was also prepared by a three-stepped combination of the devices shown in FIG. 11.

The mean excess branch loss of guided light with a wavelength of 1.55 µm was measured for the output from each of the eight output ports of each 1×8 device, and averages were taken. As a result of the measurement, the mean excess branch loss of the 1×8 device shown in FIG. 6 was 1.02 dB, whereas the mean excess branch loss of the 1×8 device shown in FIG. 20 was 0.89 dB. The 1×8 device prepared with the devices shown in FIG. 11 (the second comparison device) produced a mean excess branch loss of 1.53 dB. The mean excess branch losses of the devices shown in FIG. 6 and FIG. 20 were less than the mean excess branch loss observed with the device shown in FIG. 11. Thus, the superiority of the waveguide assembly shown in FIG. 6 over the second comparison device has been revealed experimentally. Also the experiments have revealed that the device shown in FIG. 20 is more excellent than the device shown in FIG. 6. The level of lowering of the mean excess branch loss with the improved devices is much higher than the level of the measurement error. This proves that the effect of addition of the straight section 116 are produced in a cumulative manner by the three-stepped combination of the 1×2 devices shown in FIG. 1 and FIG. 12. As proof of this, it has been confirmed that the optical branch loss is more effectively reduced with the waveguide type optical branching device of FIG. 12.

Figure 19:
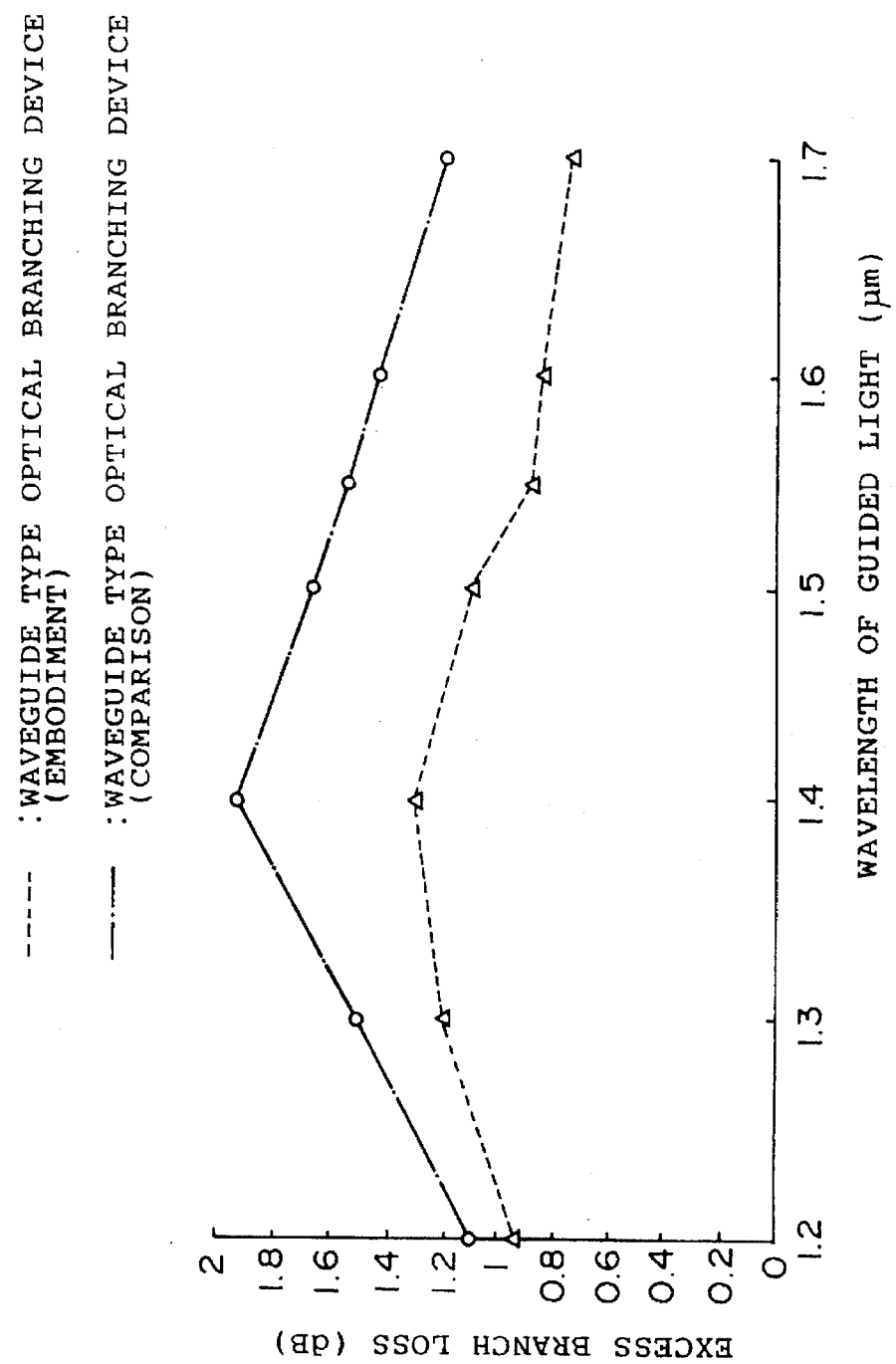
FIG. 19 a graph showing the results of measurement of wavelength-dependency of the excess branch loss with a 1×8 device of FIG. 20 and a 1×8 device as a second comparison, wherein the light emitted from a spectrometer is input into each device for measurement.

FIG. 19 is a graph showing the results of measurement of wavelength-dependency of the excess branch loss with the 1×8 device shown in FIG. 20, and the second comparison 1×8 device. During the measurement, the incident light into the respective devices was emitted from a spectroscope.

Referring to the graph shown in FIG. 19, it may be confirmed that the 1×8 device of FIG. 20 suffers from a lower loss than the second comparison device over a wide range of wavelength of guided light. In addition, the types of the embodiments of the present invention are less susceptible to variance in the loss depending on the guided light width changes, as compared with the comparison type. For this reason, the waveguide type optical branching device according to the present invention has an additional advantage in that it may be used satisfactorily even for optical measurement systems which sweep light over a wide wavelength range.

Figure 21:
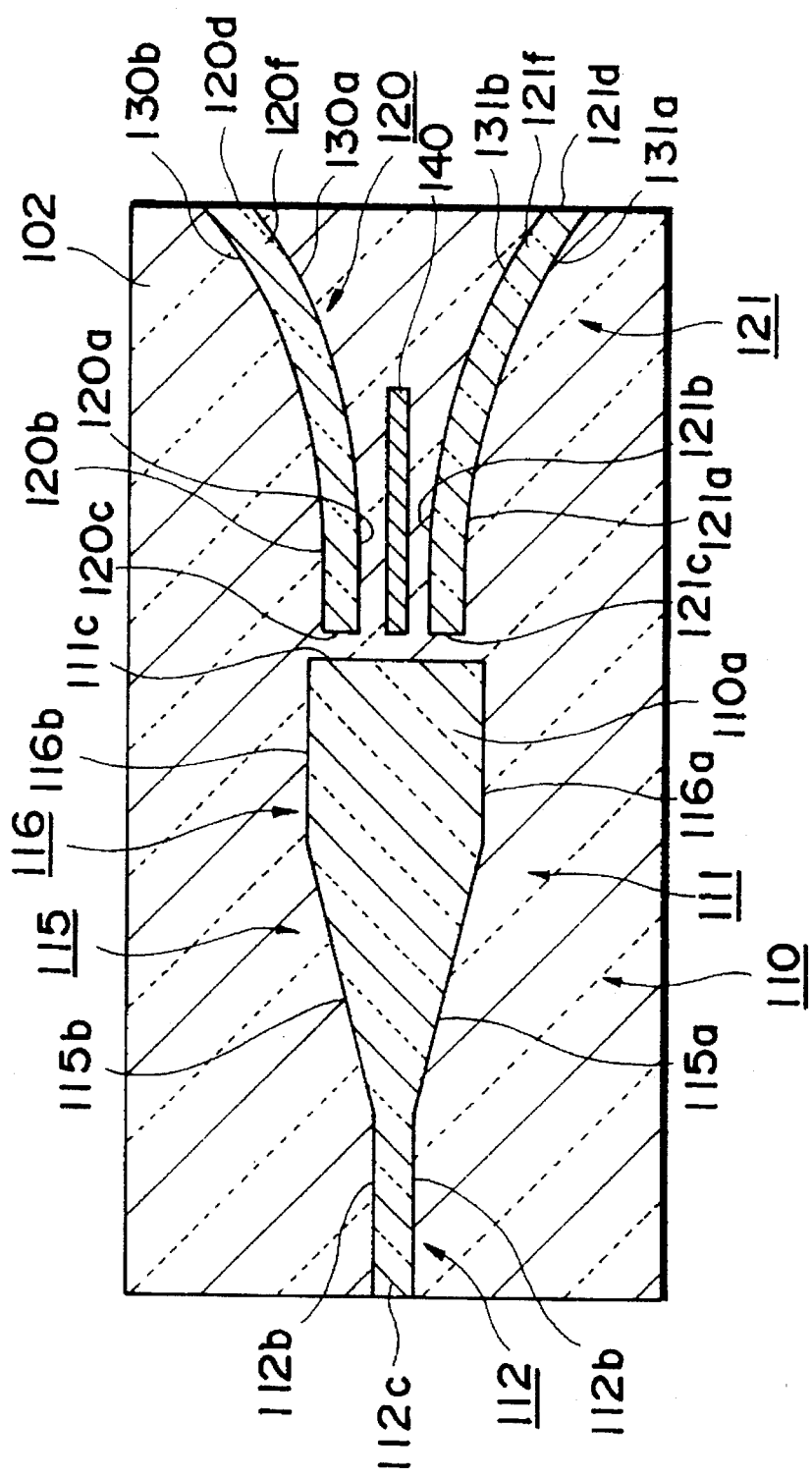
FIG. 21 is a section view of an optical branching device. The optical branching device comprises a light-shielding member 140 located between the second and third waveguides 120, 121.

FIG. 21 shows an optical branching device comprising a light-shielding member 140. The light shielding-member 140 is arranged between the second waveguide 120 and third waveguide 121. The light-shielding member is for example made of a material of which color is black. The black material is made of black rubber and carbon graphite. The light-shielding member can be made of a metal including Au, Fe, Cu, Ag, Sn, Zn or solder, rubber or resign.

Hereunder, an optical branching device according to another embodiment of the present invention will be explained.

Figure 22:
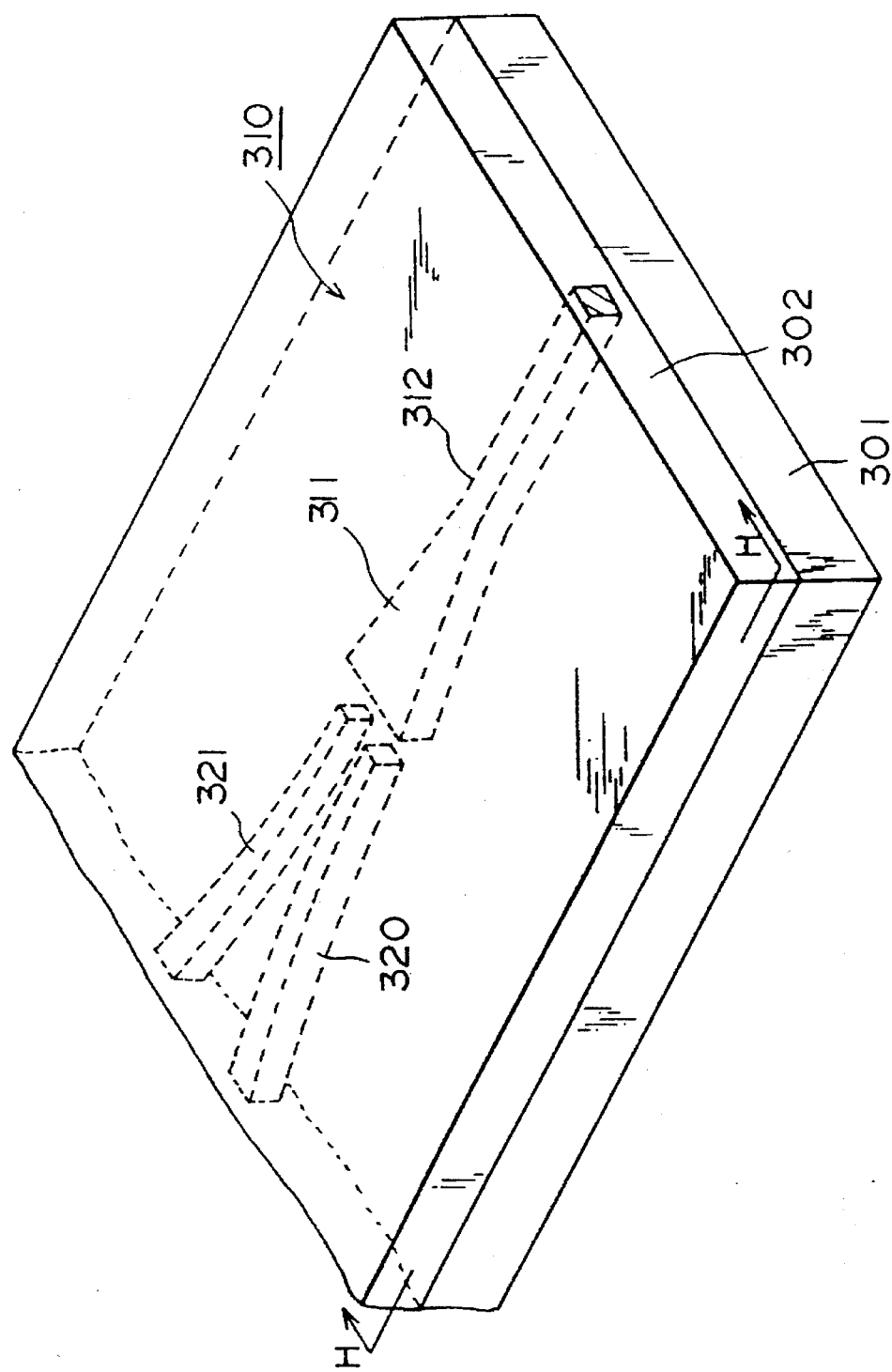
FIG. 22 is a perspective view of an optical branching device according to another embodiment of the present invention.
Figure 23A:
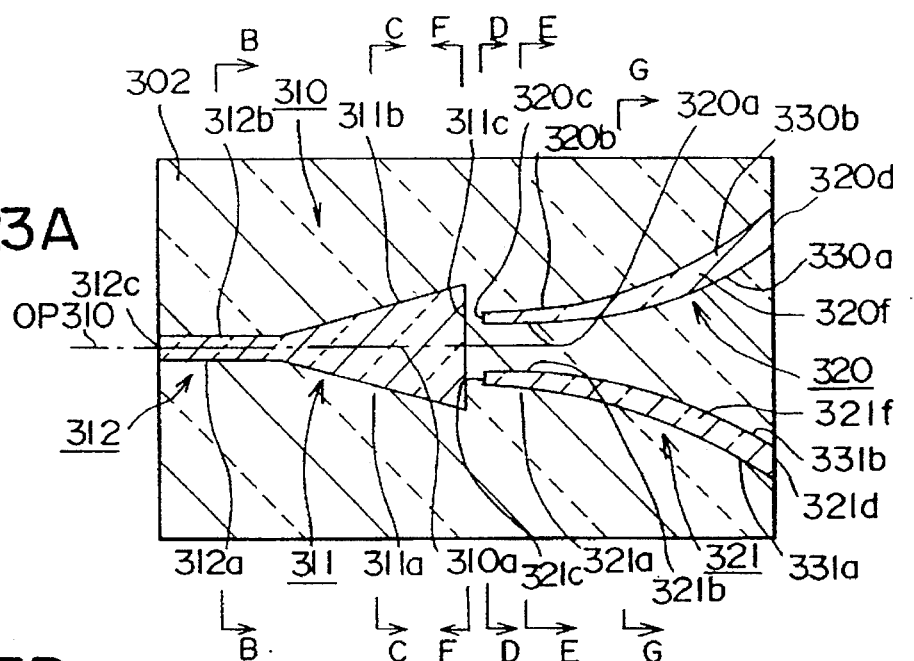
FIG. 23A is a section view of the device shown in FIG. 22, taken along the plane indicated by the arrows H—H in the drawing.
Figure 23B:
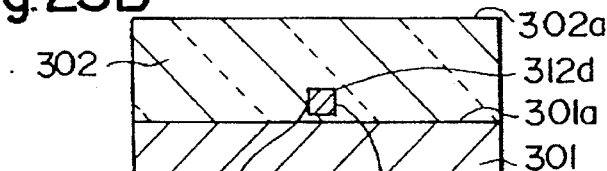
FIG. 23B is a section view of the device shown in FIG. 23A, taken along the plane indicated by the arrows B—B in the drawing.
Figure 23C:
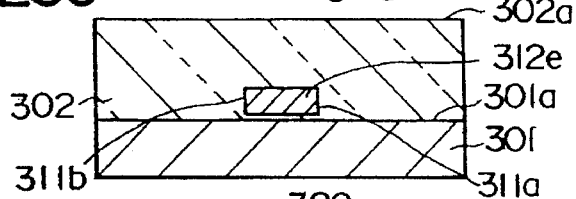
FIG. 23C is a section view of the device shown in FIG. 23A, taken along the plane indicated by the arrows C—C in the drawing.
Figure 23D:
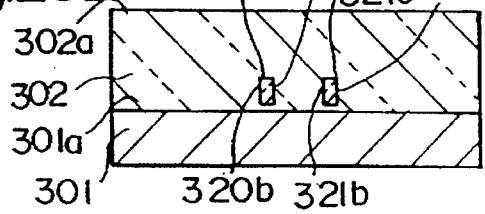
FIG. 23D is a section view of the device shown in FIG. 23A, taken along the plane indicated by the arrows D—D in the drawing.
Figure 23E:
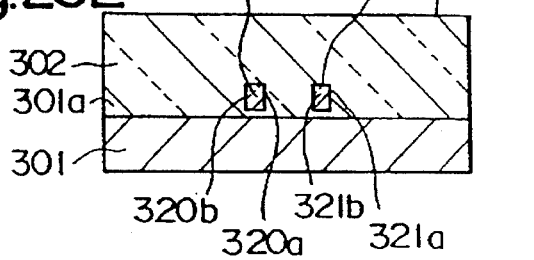
FIG. 23E is a section view of the device shown in FIG. 23A, taken along the plane indicated by the arrows E—E in the drawing.
Figure 23F:
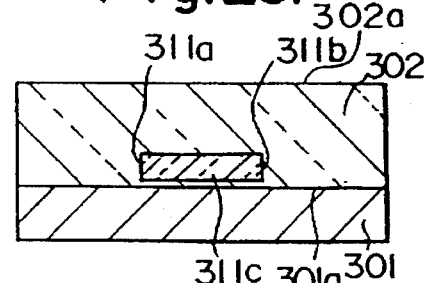
FIG. 23F is a section view of the device shown in FIG. 23A, taken along the plane indicated by the arrows F—F in the drawing.
Figure 23G:
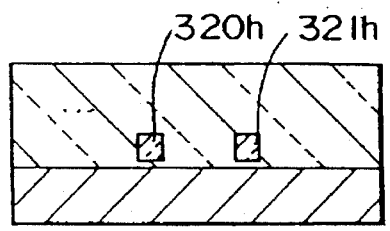
FIG. 23G is a section view of the device shown in FIG. 23A, taken along the plane indicated by the arrows G—G in the drawing.
Figure 24:
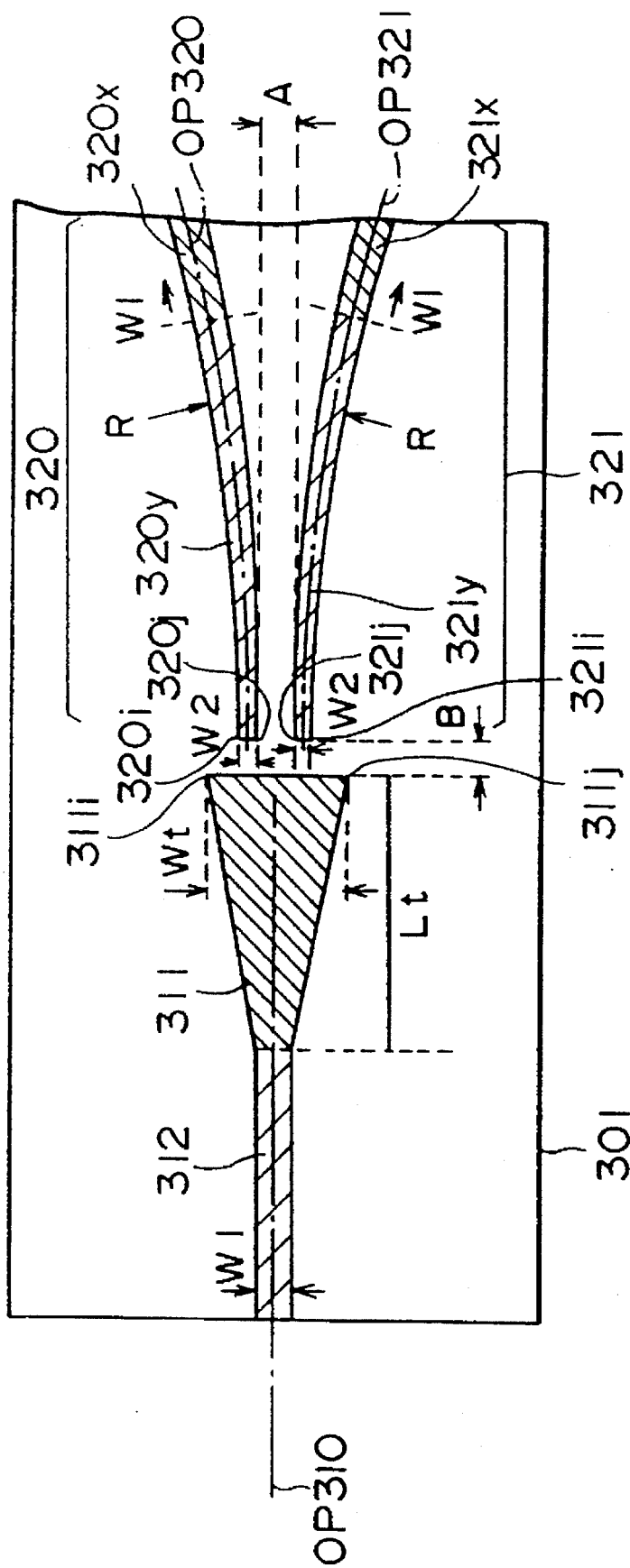
FIG. 24 is an illustration of the optical branching device shown in FIG. 23A.

An optical branching device comprise waveguide present invention is shown in FIGS. 22–24. This is a roughly Y-shaped branching and coupling device (Y-shaped device) for branching or coupling guided light transmitted along the single mode waveguide 312 or 320, 321, via the multimode tapered waveguide 311.

One type of the waveguide type optical branching devices of the present invention comprises one multimode waveguide 310, and two single mode waveguides 320, 321. The single mode waveguides 320, 321 are located close at the edge faces 320c, 321c at the side of the multimode waveguide 310. The edge faces 320c, 321c oppose either terminal 311c of the multimode waveguide 310 at a given space (B).

At least one of the two single mode waveguides 320, 321 gradually tapers in the direction from the proximal end to the multimode waveguide 311.

Here, the multimode waveguide 310 comprises a single mode waveguide of constant width 312, and a tapered waveguide 311 connected to either terminal thereof. This taper waveguide 311 may be such type as provided with a tapered section which is connected to the waveguide of constant width, and a straight section which is connected to the tapered section and is of roughly the same width as the terminal of the tapered section, as described later. Further, as mentioned below, this type waveguide may be provided with two single mode waveguides facing the other terminal of the multimode waveguide at a given space, wherein their terminals are located close to each other at the side of waveguide multimode waveguide.

The optical branching device comprises a multimode waveguide, and two single mode waveguides which are connected to either terminal of the multimode waveguide, and are located close to each other at the terminals near the multimode waveguide, and is characterized in that at least one of the two single mode waveguide tapers in the direction from the proximal end to the multimode waveguide to reduce the space between the centers of the two single mode waveguides.

This waveguide type optical branching device may be provided with two additional single mode waveguides which are connected to the other terminal of the multimode waveguide, and situated close to each other at the terminals near the multimode waveguide. The above-noted waveguide type optical branching device may be of such type where the terminal widths of the single mode waveguides near the multimode waveguide may be reduced to ½–⅘ the proximal width.

Of the optical branching devices of the present invention, the one with either terminal of the multimode waveguide being opposite to the edge faces of the two single mode waveguides has a branching structure wherein the multimode waveguide is separated from the two single mode waveguides, thereby allowing branching and coupling of guided light without provision of a hard-to-process gap section at the branching section. As a result, there is provided easier processing of the branching section, and excellent processing stability.

Furthermore, since the widths of the two single mode waveguides gradually lower in the direction from the proximal ends to the multimode waveguide, the space between the centers of the two single mode waveguides becomes smaller. With this configuration, the two peaks of the electric field distributions at the terminals of the single mode waveguides become closer, resulting in an increased coupling efficiency of the electric field distributions at the branching section. This means that with a minimum loss at the branching section the guided light may be branched, coupled, and output.

Of the above-noted types of waveguide type optical branching device, the one whose multimode waveguide is a tapered waveguide comprising a tapered section and straight section has the following functions as well as those mentioned above. Specifically, in the case of transmitting guided light from the multimode waveguide to single mode waveguide, the guided light with a wave front which has been spread radially is input into the single mode waveguide after restoration to a plane wave front at the straight section. With this restoration, it is possible to output branched guided light with a minimum level of radiation of the guided light at the edge face of the multimode waveguide to which no waveguide edge face is opposite, due to the reduction of the terminal width of the single mode waveguide.

Of the waveguide type optical branching devices according to the present invention, in the type wherein two single mode waveguides are connected to either terminal of the multimode waveguide, since the widths of the two single mode waveguides gradually lower toward the multimode waveguide, the distance between the centers of the two single mode waveguide becomes smaller. With this configuration, the two peaks of the electric field distributions of the two single mode waveguides at the terminals are located close to each other, resulting in an increased coupling efficiency of the electric field distributions at the branching section which allows output of branched or coupled guided light with a minimum loss of light at the branching section.

As is shown in FIG. 22, a transparent material layer comprising $SiO_2$, for example, is formed on the upper surface of a substrate 301 composed of, e.g. silicon. This transparent material layer is made up with a highly refractive core or single mode waveguide 312, a multimode tapered waveguide 311 and single mode waveguides as branches (hereunder, referred to as branch waveguides) 320, 321, and a low refractive cladding 302 with the core embedded therein. Incidentally, all the waveguides 311, 312, 320 and 321 are formed in the direction of transmission of light in the members.

The tapered waveguide 311 is connected to the single mode waveguide 312. The two edge faces 320c, 321c of the branch waveguides 320, 321 faces the edge face of the tapered waveguide 311 at a given space.

The two-dimensional configuration of the single mode waveguide 312 in the direction of the surface of the substrate is linear, whereas tapered waveguide 311 tapers in a two-dimensional manner, wherein the width diverges in the direction from the single mode waveguide 312 to the branching section. Also, the widths of the branch waveguides 320, 321 gradually decrease in the direction from the proximal ends 320d, 321d to the tapered waveguide 312.

Referring to FIG. 24, the structure of the optical branching device shown in FIGS. 22 and 23A–23E will be detailed. As shown in FIG. 24, the tapered waveguide 311 has a terminal width Wt, a length Lt, and is connected to the single mode waveguide 312 of a width W1. The edge faces 320c, 321c of the single mode waveguides 320, 321 near the branching section face the terminal of the tapered waveguide 311 at a given space B. In turn, the branch waveguides 320, 321 are located close, but at a space A, at the terminals near the branching section, in such a manner that the space gradually increases symmetrically with regard to the center line of the tapered waveguide 311, in the direction of transmission of light. For simultaneous accomplishment of excellent processing stability and reduced loss of light, the space B between the edge face of the tapered waveguide 311 and the edge faces of the branch waveguides 320, 321 are preferred to be approximately 2–8 μm.

The space B(1) between the edge faces 311c and 320c, and the space B(2) between the edge faces 311c and 321c have a following equation.

$$B(2)-\lambda \leq B(1) \leq B(2)+\lambda,$$

where λ is wavelength of the guided light traveling through the core member 310. Then the space B(1) is substantially equal to B(2). The wavelength λ of the guided light using in present embodiment is 1.55 μm. In other words, the first space B(1) is not greater than the total of the space of said second space B(2) and the wavelength (μ) of the light propagated in said second core member 320, and not smaller than the difference between said second space B(2) and the wavelength (λ) of the light propagated in said second core member 320.

The branch waveguides 320, 321 are constructed with proximal ends of constant width 320x, 321x to which there are connected single mode waveguide 320y, 321y having a peripheral curvature radius R and a width which gradually lowers toward the tapered waveguide 311. Here, both of the proximal ends 320x, 321x are bent single mode waveguides whose widths are W1, and curvature radii are R. In this connection, the terminal widths of the branch waveguides 320, 321 at the side of the first edge face 311c is W2. The widths of the branch waveguides 320, 321 decrement by 3 μm per mm-travelling along the center of the optical axis in the direction from the proximal ends 320x, 321x to the tapered waveguide 12.

Focusing now on the width of the single mode waveguide, for light transmission while inducing the adequate function of confining the electric field under single mode conditions, and suppressing radiation from the waveguide to an acceptable extent, the width (W) of the waveguide is desired to be set so that the normalized frequency V of the waveguide satisfies the following requisite:

$$(3/8)\pi < V < (1/2)\pi \qquad (1)$$

wherein $$V = (\pi \cdot W/\lambda) \cdot (N_1^2 - N_2^2)^{1/2}$$

where W=width of the waveguide
$\lambda$=wavelength of guided light
$N_1$=Refractive index of the core
$N_2$=Refractive index of the cladding For the device according to the present invention which is shown in FIG. 24, the widths of the proximal ends 320x, 321x and the single mode waveguide 312 are set to meet the requisite represented by the above-noted formula (1). The values of widths of the proximal ends 320x, 321x and the single mode waveguide 312 each are W1. This type device is clearly differentiated from the device of FIG. 11 in that the former has a branching structure wherein the tapered waveguide 311 is separated form the branch waveguides 320, 321, and in that the terminal widths (=W2) of the branch waveguides 320, 321 is smaller than the width (=W1) of the proximal ends 320x, 321x and the single mode waveguide 312.

The device according to the present embodiment will de detailed hereunder.

The optical branching device according to the present invention has a structure wherein the second and third core members 320, 321 are separated from the first core member 310. The second core 320 member and third core member 321 taper toward the first edge face 311c.

FIG. 22 is a perspective view of this optical branching device according to another embodiment of the present invention. FIG. 23A is a section view of this device, taken along the plane indicated by the arrows H—H in the drawing. FIG. 23B is a section view of the device shown in FIG. 23, taken along the plane indicated by the arrows B—B in the drawing. FIG. 23C is a section view of the device shown in FIG. 23A, taken along the plane indicated by the arrows C—C in the drawing. FIG. 23D is a section view of the device shown in FIG. 23A, taken along the plane indicated by the arrows D—D in the drawing. FIG. 23E is a section view of the device shown in FIG. 23A, taken along the plane indicated by the arrows E—E in the drawing. FIG. 23F is a section view of the device shown in FIG. 23A, taken along the plane indicated by the arrows F—F in the drawing. FIG. 23G is a section view of the device shown in FIG. 23A, taken along the plane indicated by the arrows G—G in the drawing. FIG. 24 is a section view of the optical branching device shown in FIG. 23A.

The waveguide type optical branching device (optical branching device) according to the present embodiment comprises a silicon substrate 301, a cladding member 302 formed on the supporting substrate 301, a first core member (first tapered waveguide) 310, a second core member (second waveguide) 320, and a third core member (third waveguide) 321.

The first core member 310 is embedded in the cladding member 302. The second core member 320 is embedded in the cladding member 302 as well. Also, the second core member 320 has a second edge face 320c facing the edge face 311c of the first core member 310 at a first space. The third core member 321 is also embedded in the cladding member 302. The third core member 321 has a third edge face 321c facing the edge face 311c of the first core member 310 at a second space.

The cladding member 302 (cladding 302, cladding layer 302) has a first surface 302a. The first surface 302a is parallel to the main surface 301a of the substrate 301. "Direction of the width" is defined to be the direction perpendicular to both the direction perpendicular to the first surface 302a, and to the direction of light propagation. "Direction of the thickness" is defined to be the direction perpendicular to the first surface 302a. The first core member 310 has a light transmission path 312 of given width and thickness, and a core section 311, which is contiguous with the light transmission path 312, of a tapered type whose width increases with distance from the light transmission path 12. The width 312 of the light transmission path 312 is defined by the distance between the side 312a and side 312b in FIG. 23A.

The first core member 310 has a first perpendicular section 312d which is defined by intersection with a first plane (plane indicated by the arrows B—B in FIG. 23A) which is perpendicular to the first surface 302a. The first core member 310 has a second perpendicular section 312e which is defined by intersection with a second plane (plane indicated by the arrows C—C in FIG. 23A) perpendicular to the first surface 302a and located between the fist edge face 311c and first plane (B—B plane). The first core member 310 has a first horizontal section (310a in FIG. 23A) which is defined by intersection with a third plane (plane indicated the arrows H—H in FIG. 22) parallel to the first surface 302a.

The second core member 320 has a third perpendicular section 320e which is defined by intersection with a fourth plane (plane indicated by the arrows E—E in FIG. 23A) which is perpendicular to the first surface 302a. The second core member 320 has a second horizontal section (320f in FIG. 3A) which is defined by intersection with the third plane (H—H plane).

The third core member 321 has a fourth perpendicular section 321e which is defined by intersection with the fourth plane (E—E plane). The third core member 321 has a third horizontal section 321f which is defined by intersection with the third plane (H—H plane).

In other words, the branch waveguide assembly shown in FIGS. 22–24 comprises a substrate 301, a first tapered waveguide 310, a second waveguide 320 and a third waveguide 321.

The second core member 320 tapers toward the first core member 310. The third core member 321 tapers toward the first core member 310 as well. In addition, the distance between the second core member 320 and third core member 321 lowers toward the first core member 310. In this optical branching device, the first core member 310 is a first multimode waveguide 310, while the second core member 320 is a first single mode waveguide 320, and the third core member 321 is a second single mode waveguide 321. The first core member 310 comprises a tapered waveguide 311.

Since both the second core member 320 and third core member 321 are tapered, if the space between the second core member 320 and third core member 321 is constant, the optical axis of the second core member 320 at the second edge face 320c, and the optical axis of the third core member 321 at the third edge face 321c may be situated closely.

Accordingly, at the second edge face 320c of the second core member 320, the light transmitted in this second core member 320 has an electric field distribution in the radial direction of the core 320. The peak position of the electric field distribution (the first peak position) corresponds to the position of the axis of the second core member 320. At the third edge face 321c of the third core member 321, the light transmitted in this third core member 321c has an electric field distribution in the radial direction of the core 321. The peak position of the electric field distribution (the second peak position) corresponds to the position of the axis of the third core member 321. With the first peak and the second peak situated closely, improvements are obtained in the coupling efficiency of the light transmitted between the first core member 310 and second core member 320 as well as in the coupling efficiency of the light transmitted between the first core member 310 and third core member 321. As a result, according to the present invention, it is possible to input guided light which has been branched or coupled, with a minimum loss at the branching section.

The second core member 320 comprises a second edge face 320c, third perpendicular section (320e) and second horizontal section 320f.

The second edge face 320c opposes the first edge face 311c of the first core member (first tapered waveguide) 310. The third perpendicular section 320e is defined by intersection with a fourth plane (E—E plane) perpendicular to the first surface 302a. The second horizontal section 320f is defined by intersection with the third plane (H—H plane). Here, since the second core member 320 tapers, the area of the second edge face 320c is smaller than the area of the third perpendicular section 320e. The second core member 320 comprises a section 320h which is defined by intersection with the plane (G—G plane) parallel to the fourth plane. The third perpendicular section 320e is situated between the interface 320c and the section 320h. The area of the section 320h is larger than the area of the third perpendicular section 320e.

The third core member 321 is embedded in the cladding member 302. The third core member 321 comprises a third edge face 321c, fourth perpendicular section 321e and third horizontal section 321f. The third edge face (interface) 321c opposes the first edge face 311c of the first core member 310. The fourth perpendicular section 321e is defined by intersection of the third core member 321 with a fourth plane (E—E plane). The third horizontal section 321f is defined by intersection of the third core member 321 with the third plate (H—H). As the third core member 321 tapers, the area of the third edge face 321c is smaller than the area of the fourth perpendicular section 321e. The third core member 321 comprises a section 321h which is defined by intersection with the plane (G—G plane) parallel to the fourth plane (E—E). The fourth perpendicular section 321e is situated between the interface 321c and the section 321h. The area of the section 321h is larger than the area of the fourth perpendicular section 321e.

The substrate 301 has a substrate surface 301a.

The first tapered waveguide 310 is formed on the substrate surface 301a, and has a first edge face 311c.

The second waveguide 320 is formed on the substrate surface 301a. The second waveguide 320 has an interface 320c with the first edge face 311c, a first side 320a including a plane crossing the substrate surface 301a, and a second side 320b facing the first side 320a.

The third waveguide 321 is formed on the substrate surface 301a. The third waveguide 321 has an interface 321c with the first edge face 311c, a third side 321a including the place crossing the substrate surface 301a, and a fourth side 321b facing the third side 321a. The fourth side 321b is located between the first side 320a and the third side 321a. The first side 320a is located between the second side 320b and the fourth side 321b.

The width of the first edge face 311c is identical to the length of the first edge face 311c along the direction (direction of the width) perpendicular to both the direction of the normal to the substrate surface 301a (direction of the thickness), and the direction of the normal to the first edge face 311c (direction of the optical axis). The width (Wt) of the first edge face 311c is greater than the distance between the second side 320c and the third side 321c.

The first core member 310 is located so that the light input into the first core member 310 through the interface 312c is propagated in the direction along the first horizontal section 310a across the first perpendicular section 312d and second perpendicular section 312e, and output from the first edge face 311c.

The second core member is located so that the light output from the first edge face 311c is input into the second core member 320 through the second interface 320c, and is propagated in the direction along the second horizontal section 320f across the third perpendicular section 320e, and output at the second edge face 320d of the second core member 320.

The third core member 321 is located so that the light output from the first edge face 311c is input into the third core member 321 through the third edge face 321c, and is propagated in the direction along the third horizontal section 321f across the fourth perpendicular section 321e, and output from the third core member 321.

In this connection, the area of the first edge face 311c is larger than the area of the first perpendicular section 312d. This is because the first core member 310 has a tapered section 311 which diverges toward the direction of the second and third core members 320, 321. The tapered section 311 has sides 311a, 311b which forms given angles with the optical axis OP 310 (center line) of the first core member 310.

In other words, the intersections 311a, 311b between the two sides perpendicular to the first surface 302a of the tapered section (tapered waveguide) 311, and the third plane (H—H plane) form given angles with the optical axis OP310 (center line) of the first core member 310 in the third plane.

As the first core member 310 comprises the tapered section 311, the density of the energy (power) of the optical signal input into the first core member 310 at the edge face (fourth edge face) 312c decreases gradually as the light travels passing through the first perpendicular section 312d toward the first edge face 311c.

The light output from the edge face 311c of the first core member 310 is input into the second core member 320 at the interface 320c, and into the third core member 321 at the third edge face 321c.

The first edge face 311c of the optical branching device according to the present embodiment is perpendicular to the direction of movement of the light passing through the first edge face. Accordingly, the second edge face 320c is perpendicular to the direction of movement of the incident light to the second edge face 320c. The third edge face 321c is perpendicular to the direction of movement of the incident light to the third edge face 321c. As a result, the first edge face 311c is opposite to the second edge face 320c, whereas the first edge face 311c is parallel to the second edge face 320c. The first edge face 311c is opposite to the third edge face 321c, whereas the first edge face 311c is parallel to the third edge face 321c.

The second core member 320 has sides 320a, 320b perpendicular to the first surface 302a. The side 320a and side 320b are parallel to the direction of movement of the light propagated in the second core member 320. In this connection, the side 320a and side 320b faces each other, while the side 320a and side 320b runs in parallel with each other. Accordingly, the sides 320a and side 320b are perpendicular to both the first surface 320a and the second edge face 320b.

Similarly, the third core member 321 has sides 321a, 321b which are perpendicular to the first surface 302a. The side 321a and side 321b are parallel to the direction of movement of the light propagated in the third core member 321. In turn, the side 321a and side 321b are opposite to each other, whereas the side 321a and side 321b are parallel to each other. Thus, the side 321a and side 321b are perpendicular to both the first surface 302a and third edge face 321c.

The second waveguide 320 comprises a waveguide of constant width 320x which have a given width and a waveguide of variable width 320y which is contiguous with this waveguide of constant width 320x. The waveguide of variable width 320y tapers toward the first edge face 311c. The width of the waveguide of variable width 320y preferably ranges from ½ to ⅘ the width of the waveguide of constant width.

The third waveguide 321 comprises a waveguide of constant width 321x which have a given width and a waveguide of variable width 321y which is contiguous with this waveguide of constant width 321x. The waveguide of variable width 321y tapers toward the first edge face 311c. The width of the waveguide of variable width 321y preferably ranges from ½ to ⅘ the width of the waveguide of constant width.

An intersection (cross line) 320i is an intersection of the second edge face 320c and second side face 320b. An intersection (cross line) 321i is an intersection of the third edge face 321c and third side face 321a.

An intersection (cross line) 320j is an intersection of the second edge face 320c and first side face 320a. An intersection (cross line) 321j is an intersection of the third edge face 321c and fourth side face 321b. An intersection (cross line) 311i is an intersection of the first edge face 311c and the side face 311b. An intersection (cross line) 311j is an intersection of the first edge face 311c and the side face 311a. The distance between the line 311i and line 311j is Wt (μm), the distance between the line 320i and line 321j is (2W+A) (μm), distance Wt is greater than (2W+A). The distance (A) is defined by the space between the second core member 320 and third core member 321. More precisely, the distance (A) is defined by the distance between the line 320j and line 321j.

The distance between the second core member 320 and the third core member 321 increases with distance from the first core member 310 does. This is because the second core member 320 comprises bent sides 330a, 330b bending apart from the third core member 321. The bent side 330a is contiguous with the plane 320a, whereas the bent side 330b with the plane 320b. The curvature radius of the bent side 330a is R, and also the curvature radius of the bent side 330b approximates R. The third core member 321 has bent sides 331a, 331b bending apart from the second core member 320. The bent side 331a is adjacent to the plane 321a, whereas the bent side 331b to the plane 321b. The curvature radius of the bent side 331a is R, and also the curvature radius of the bent side 331b approximates R. The second core member 320 and the third core member 321 are S-shaped waveguides.

The light output from the second edge face 320c and input into the second core member 320 is then output through the edge face 320d of the second core member 320. The light output from the third edge face 321c and input into the third core member 321 is then output through the edge face 321d of the third core member 321. In this connection, the optical distance from the input edge face 320c to the output edge face 320d of the second core member 320 is equal to the optical distance between the input edge face 321c and the output edge face 321d of the third core member 321.

As a result, in cases where light input from the first core member 310 into the core members 320, 321 are output from the core members 320, 321, the beams of the light branched by the core members 320, 321 are in the same phase upon output from the edge faces 320d, 321d. Since the beams of the output light from the edge faces 320d, 321d are in one phase, the phase matching of the respective beams are easy to perform for coupling of the output light, etc.

Figure 25:
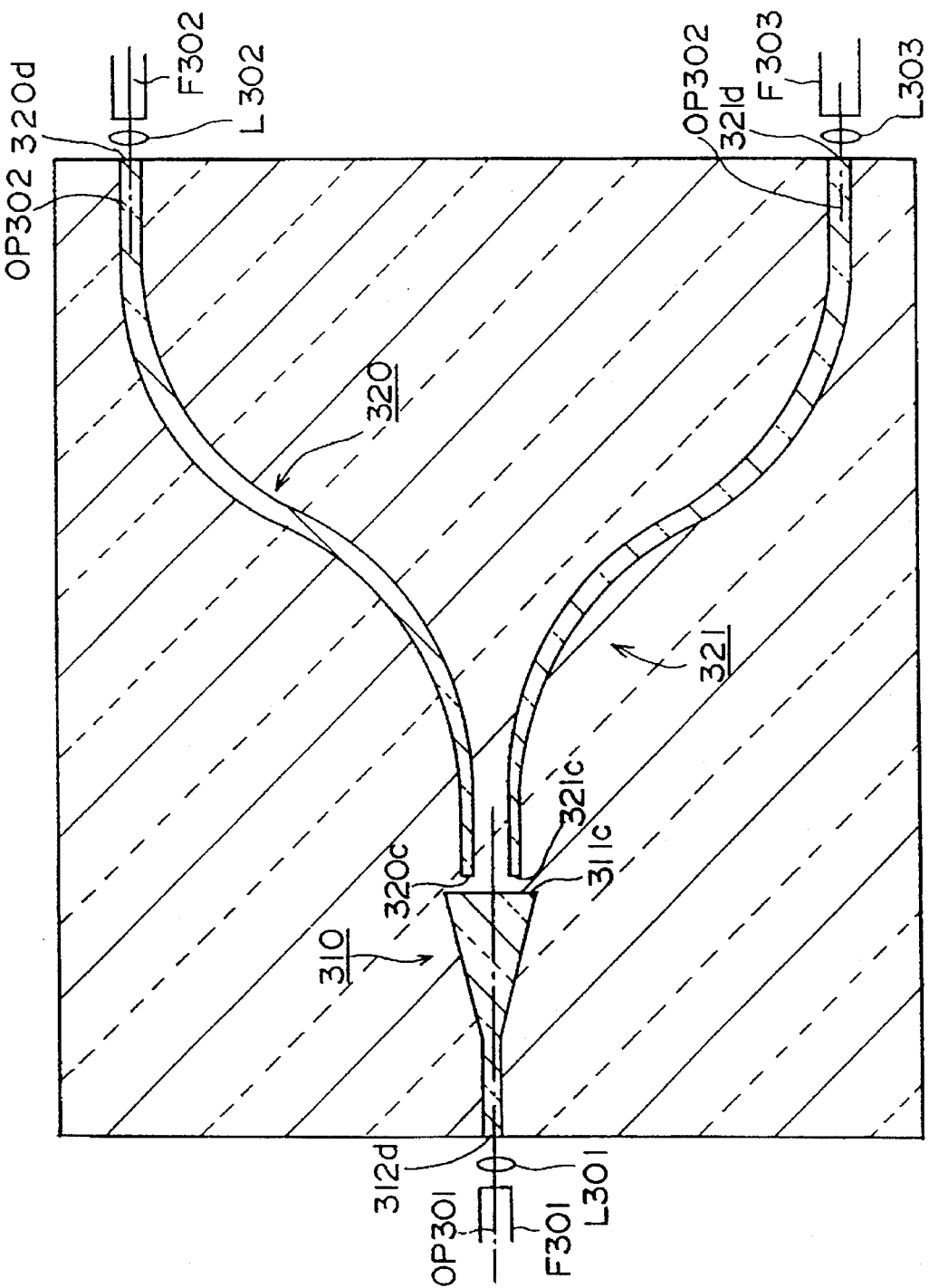
FIG. 25 is a section view of a modification of the optical branching device shown in FIG. 23A with improvements made on the edges 320d, 321d of the second core member 320 and third core member 321.

FIG. 25 shows a modification of the optical branching device shown in FIG. 23A with improvements made on the edge faces 320d, 321d of the second core member 320 and third core member 321. The edge faces 320d, 321d of the optical branching device shown in FIG. 23A is exposed. The direction of the normal to the exposed edge face 320d forms a given angle with the direction of movement of the light (direction of the optical axis) propagated in the third core member 321. Also, the direction of the normal to the exposed edge face 321d forms a given angle with the direction of movement of the light propagated in the third core member 321. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis).

Considering the above-noted fact, as shown in FIG. 25, the optical branching device according to the present embodiment is positioned so that the output edge face 320d of the second core member 320 is perpendicular to the optical axis OP302 (indicated by an alternating long and short dash line) of the second core member 320. Optical fiber F302 is located opposite to the edge face 320d of the second core member 320 via a lens L302. Additionally, the third core member 321 is located so that the output edge face 321d of the third core member 321 is perpendicular to the optical axis OP303 (indicated by an alternating long and short dash line) of the third core member 321. Optical fiber F303 is located opposite to the edge face 321d of the third core member 321 via a lens L303. Additionally, the first core member 310 is located so that the input edge face 312c of the first core member 310 is perpendicular to the optical axis OP301 (indicated by an alternating long and short dash line) of the first core member 321. Optical fiber F301 is located opposite to the edge face 312c of the first core member 310 via a lens L301.

Figure 26:
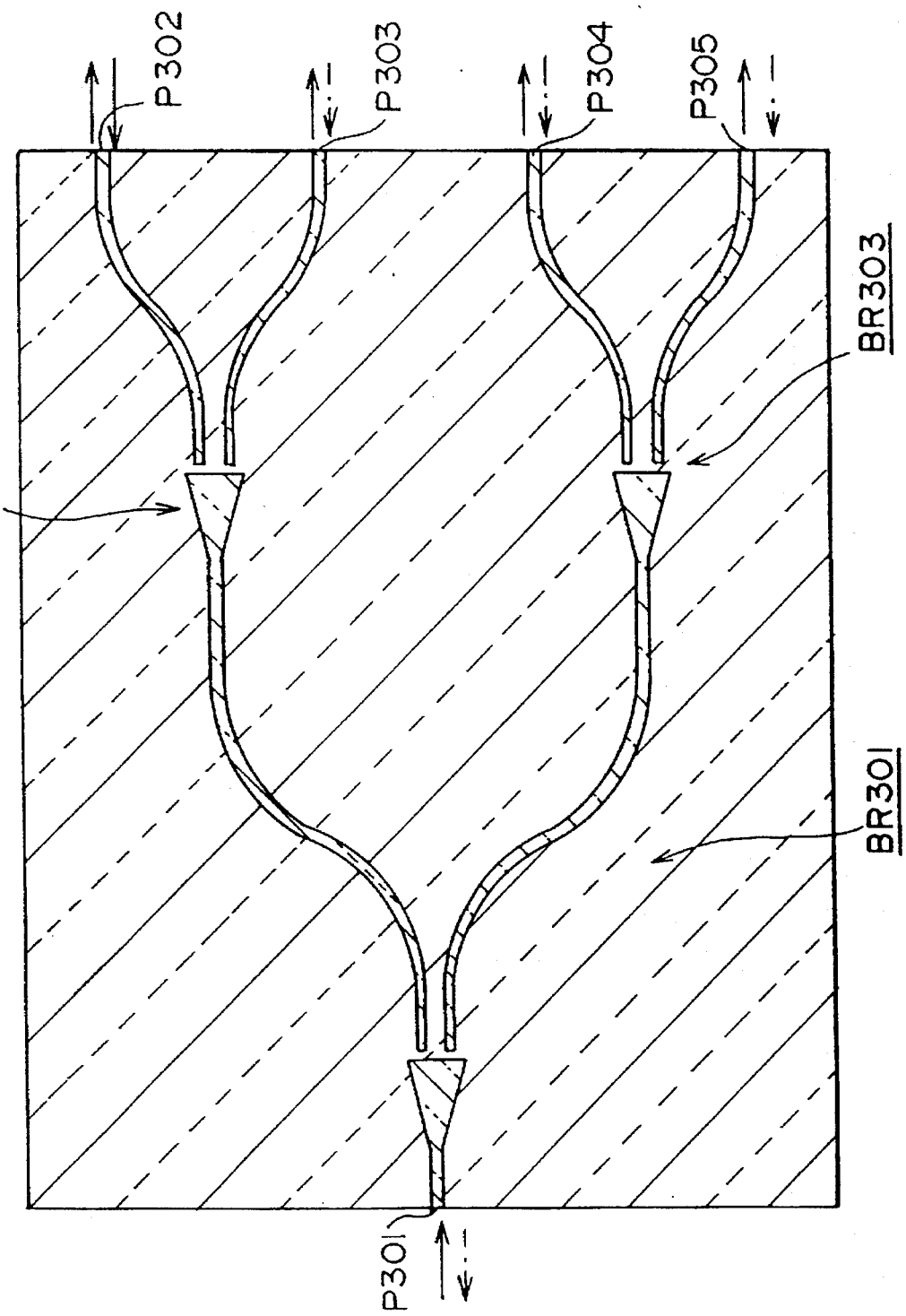
FIG. 26 is a section view of an optical branching device assembly with a 1×4 structure which consists of 3 connected optical branching devices BR301, BR302 and BR303 of the type shown in FIG. 25.

FIG. 26 is an optical branching device assembly with a 1×4 structure which consists of 3 connected optical branching devices BR301, BR302 and BR303 of the type shown in FIG. 25. This optical branching device assembly comprises the first optical branching device BR301, the second optical branching device BR302 whose input edge face 312c is connected to the output edge face 320d of the first optical branching device BR301, and the third optical branching device BR303 whose input edge face 312c is connected to the output edge face 321d of the first optical branching device BR301. Thus, an end of the S-shaped waveguide comprises the tapered waveguide.

The optical signal (indicated by a solid arrow in the drawing) input into the first optical branching device BR301 through the edge face P301 is divided with this optical branching device, and output through the edge faces P302, P303 of the second optical branching device BR302, and through the edge faces P304, P305 of the third optical branching device BR303. Conversely, the respective optical signals (indicated by alternating long and short dash arrows) input at the edge faces P302-P305 are coupled with the optical branching device, and output from the edge face P301.

Figure 27:
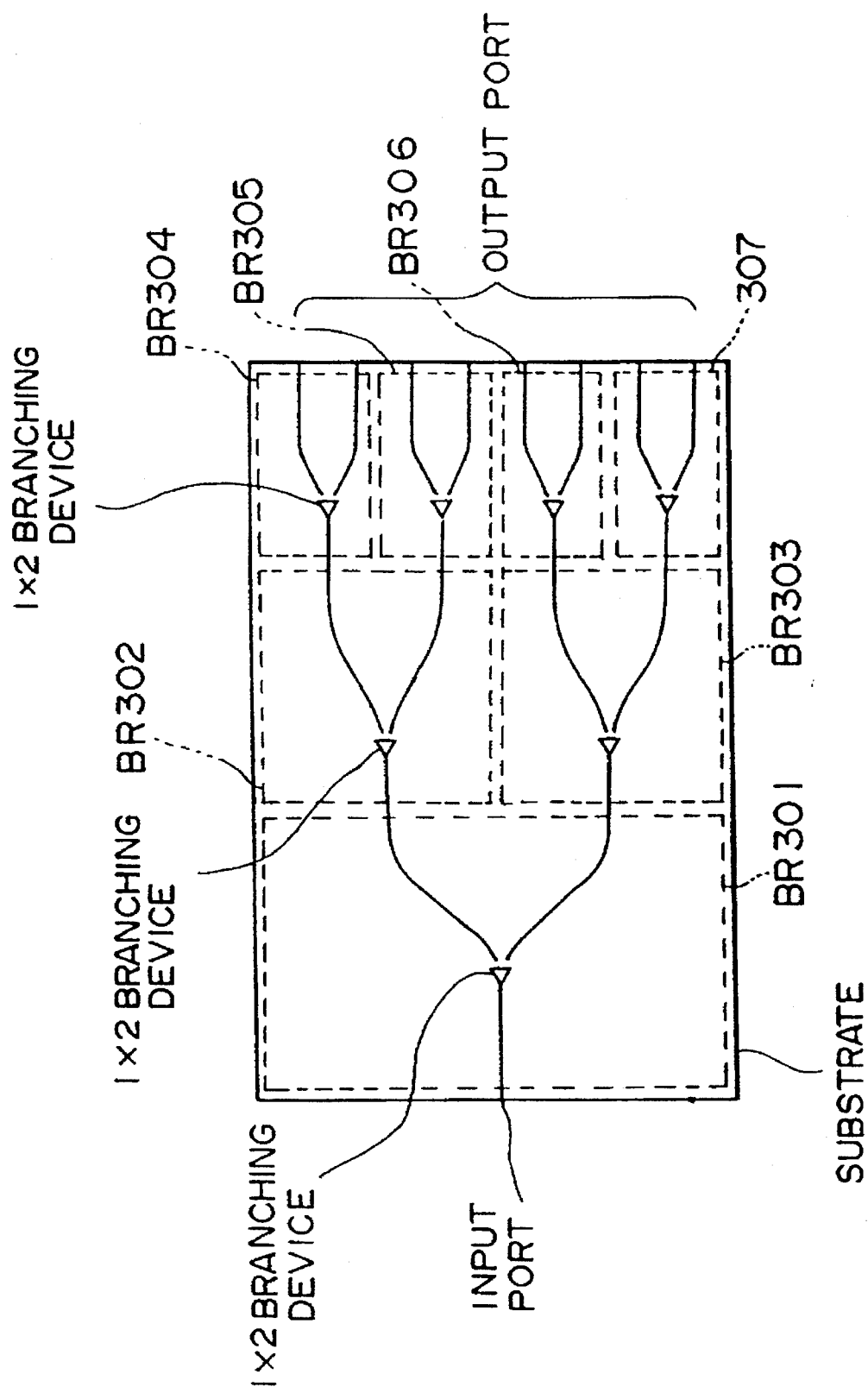
FIG. 27 is a section view of an optical branching assembly with a 1×8 structure which consists of 7 connected optical branching devices BR301, BR302, BR303, BR304, BR305, BR306 and BR307 of the type shown in FIG. 25.

FIG. 27 is an optical branching device assembly with a 1×8 structure which consists of 7 connected optical branching devices BR301, BR302, BR303, BR304, BR305, BR306 and BR307 of the type shown in FIG. 25. This optical branching device assembly comprises the first optical branching device BR301 with an input edge face (input port), the second optical branching device BR302 whose input edge face 312c is connected to the output edge face 320d of the first optical branching device BR301, and the third optical branching device BR303 whose input edge face 312c is connected to the output edge face 321d of the first optical branching device BR301.

In addition, this optical branching device assembly comprises the fourth optical branching device BR304 whose input edge face 312c is connected to the output edge face 320d of the second optical branching device BR302, the fifth optical branching device BR305 whose input edge face 312c is connected to the output edge face 321d of the second optical branching device BR302, the sixth optical branching device BR306 whose input edge face 312c is connected to the output edge face 320d of the third optical branching device BR303, and the seventh optical branching device BR307 whose input edge face 312c is connected to the output edge face 321d of the third optical branching device BR303.

Accordingly, this optical branching device assembly may branch single light beam input into the assembly, into eight beams, and reversely may couple eight beams input into this assembly, into single beam. In this connection, all the optical branching devices BR301, BR302, BR303, BR304, BR305, BR306, and BR307 are formed on the same substrate 1.

The Y-shaped device of the present embodiment differs from the Y-shaped device of FIG. 9 in that the former has a branching structure where the tapered waveguide 311 is separated from the branch waveguides 320, 321. With this aspect, need for the sharp gap section 80 shown in FIG. 9 is eliminated, and this elimination facilitates the processing of the branching section. As a result, the optical branching device of the present embodiment may be prepared in high yields on a large scale for the construction of a large scale communication system, etc.

The branch waveguide 20, 21 of the device of FIG. 11 has a constant width (=W), whereas the device of the present embodiment comprises the branch waveguides 320, 321 having smaller terminal widths than the widths of the proximal ends 320, 321x.

For the foregoing reasons, at the branching section of the device of the present embodiment, the electric field distribution of the terminals 320c, 321c of the branch waveguides 320, 321 match the electric field distribution of the terminal 311c of the multimode waveguide 311.

For a detailed explanation, at such points as the branching section of the optical branching device of the present embodiment which is susceptible to undergo drastic changes in the shape of the waveguide, with a greater coupling efficiency of the electric field distribution of guided light, at the terminal 311c of the multimode waveguide 311, and the terminals 320c, 321c of the branch waveguides 320, 321, the loss of guide light due to branching or coupling becomes less.

Figure 28A:
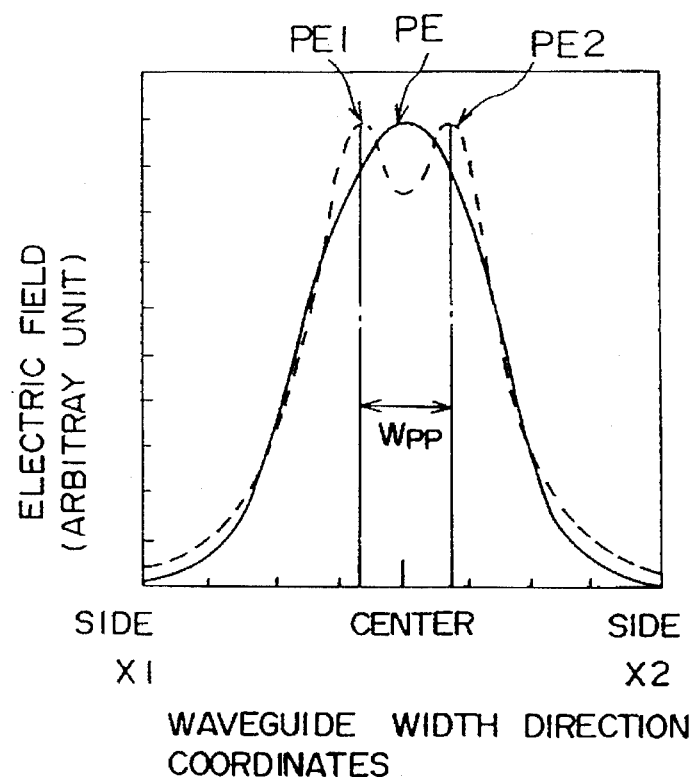
FIG. 28A is a graph showing the electric field distribution of guided light at the terminal of the first core member 310 or at the coordinate Y1 and the electric field distribution of guided light at the terminals of the second and third core members 320, 321 or at the coordinate Y2, shown in FIG. 28B.
Figure 28B:
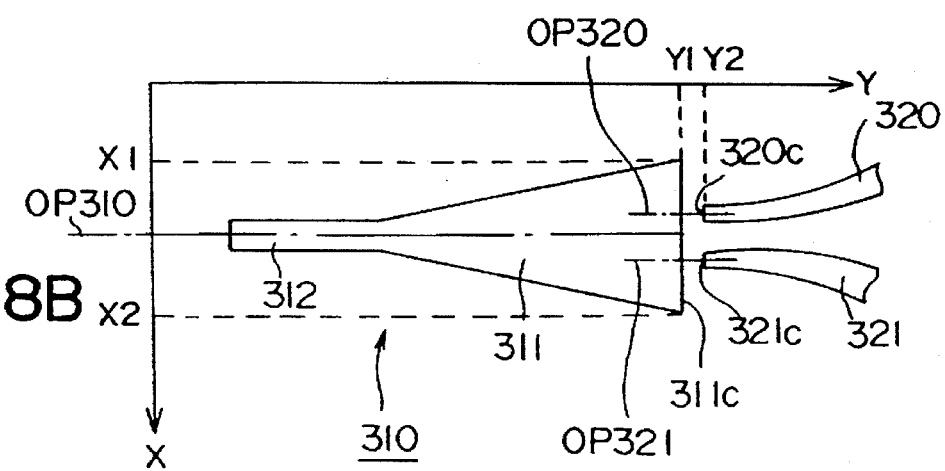
FIG. 28B is an extractive illustration of FIGS. 22–24, with coordinate axes, which shows only the first core member 310, second core member 320 and third core member 321 of the optical branching device shown in FIGS. 22–24.

FIG. 28B is an extractive illustration of FIGS. 22–24, which shows only the first core member 310, second core member 320 and third core member 321 of the optical branching device assembly shown in FIGS. 22–24. FIG. 28B includes coordinate axes. FIG. 28A is a graph showing the electric field distribution of guided light at the terminal of the first core member 310 or at the coordinate Y1, and the electric field distribution of guided light at the terminals of the second and third core members 320, 321 or at the coordinate Y2, shown in FIG. 28B. In FIG. 28A, the electric field distribution of guided light at the coordinate Y1 is shown by a solid line, whereas the electric field distribution of guided light at the coordinate Y2, by a dotted line. The coordinates X1 and X2 shown in FIG. 28A correspond to the position coordinates X1 and X2 of FIG. 28B. Here "guided light" means light propagated through the core members 310, 320 and 321 of the optical branching device in question. Here, the widths of the terminals 320c, 321c of the second and third core members 320, 321 are half the widths of the terminals 20c, 21c of the second and third core members 20, 21 shown in FIG. 11, respectively.

Each electric field distribution shown in FIG. 28A is normalized for power with the optical power carried over each guided mode set at 1. Here, it is assumed that excitation is effected only in the lowest mode in either of the non-branch waveguide 310 and branch waveguides 320, 321. The electric field distribution after optical branching is determined by synthesis of the electric field distributions for the respective branch waveguides 320, 321. On the other hand, the electric field distribution related to the comparison device illustrated in FIG. 11 is shown in FIG. 10A.

Apparently form FIG. 28A, with the second core member 320 tapering toward the first edge face 311c and the third core member 321 tapering toward the first edge face 311c, the electric field distribution at the terminals 320c, 321c of the second core material 320 and third core material 321 overlaps the electric field distribution at the terminal 311c of the tapered waveguide 311 to a higher degree than with the optical branching device shown in FIG. 11. In short, the overlapping area of the electric fields before and after the optical branching increases. For the foregoing reasons, the coupling efficiency defined by the overlap integral of electric field distributions increases. Thus, the radiation of guided light through the branch waveguides 320, 321 is suppressed, and the loss of light upon optical branching lowers as compared with the case of using the comparison waveguide type optical branching device.

As is apparent form FIG. 28A, with smaller widths of the terminals 320c, 321c of the branch waveguides 320, 321 than the widths of the proximal ends 320x, 321x, the distance between the centers of the branch waveguides 320, 321 (between the optical axes) is shortened, and the two peaks PE1, PE2 of the electric field distributions (dotted line) at the side of the branch waveguides 320, 321 come close, and match the electric field distribution at the side of the multimode waveguide 311 to a satisfactory extent.

Thus, the area of the overlapping portions of the electric fields increases, and the coupling efficiency defined by the overlap integral of the electric field distribution at the side of the branch waveguides 320, 321 and at the side of the multimode waveguide 311 is improved. Consequently, output of guided light after branching or coupling may be performed with a minimum coupling loss at the branching section.

In other words, at the second edge face 320c of the second core member 320, the light transmitted in this second core member has an electric field distribution in the radial direction of the core 320. The peak position of the electric field distribution (position of first peak PE1) corresponds to the position of the axis OP320 of the second core member 320. At the third edge face 321c of the third core member 321, the light transmitted in this third core member 321c has an electric field distribution in the radial direction of the core 321. The peak position of the electric field distribution (position of second peak PE2) corresponds to the position of the axis OP321 of the third core member 321. With the first peak and the second peak situated closely, improvements are obtained in the coupling efficiency of the light transmitted between the first core member 310 and second core member 320 as well as in the coupling efficiency of the light transmitted between the first core member 310 and third core member 321. As a result, according to the present invention, it is possible to input guided light which has been branched or coupled, with a minimum loss at the branching section.

To achieve prevention of reduction in yields while ensuring satisfactory processing stability and lower loss, preferably the distance between the second waveguide 320 and the third waveguide 321 is 2–4 μm.

In contrast to the comparison, the Y-shaped device of the embodiment of the invention is constructed in such a manner that the widths of the terminals 320c, 321c of the branch waveguides 320, 321 are smaller than the widths of the proximal ends 320x, 321x. Accordingly, it is possible to reduce the distance between the centers of the waveguides 320, 321 (between the centers of the cores of the device), without shortening the distance between the branch waveguides 320, 321. The distance between the second waveguide 320 and the third waveguide 321, as short as 2–4 μm, facilitates the processing.

As compared with the optical branching device shown in FIG. 11, the optical branching device of the present embodiment, provides a lower loss of guide light when branched or coupled.

Next, an explanation will be made of an optical branching device according to an embodiment of the present invention.

Figure 29:
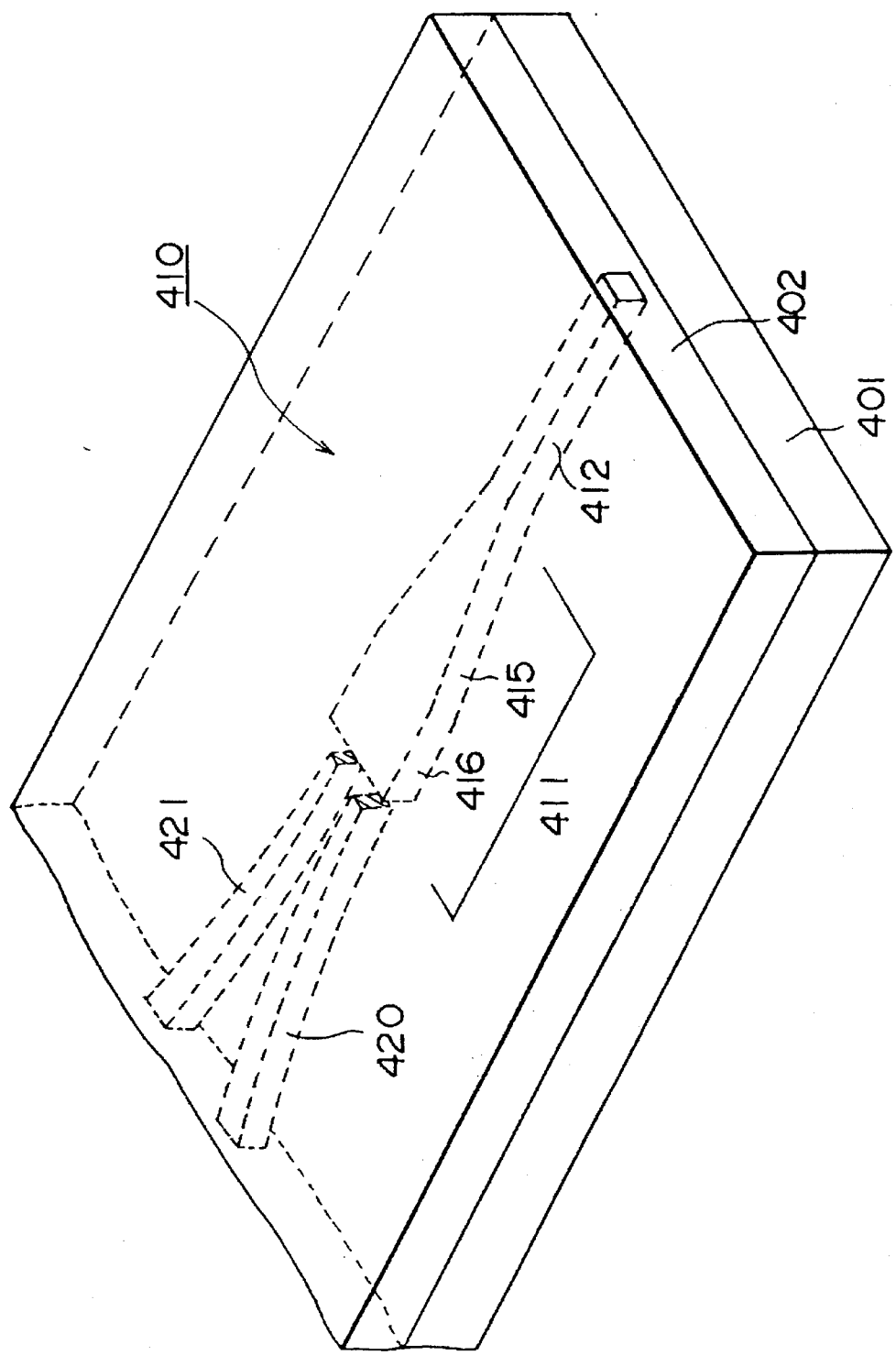
FIG. 29 is a perspective view of an optical branching device according to another embodiment of the present invention.
Figure 31:
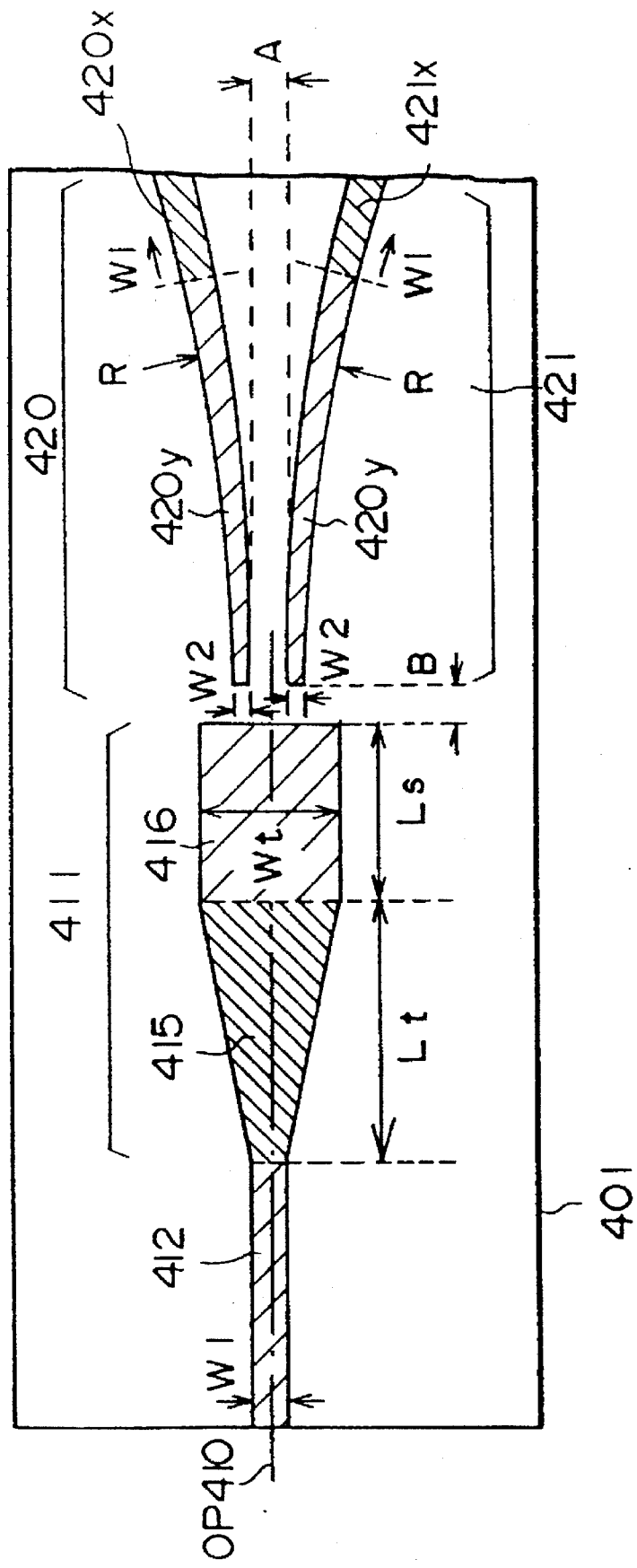
FIG. 31 is an illustration of the optical branching device shown in FIG. 30A.

FIG. 29 is a perspective view of an optical branching device according to an embodiment of the present invention. FIG. 30A is a section view of this device, taken along the plane indicated by the arrows H—H in FIG. 29. FIG. 30B is a section view of the device shown in FIG. 30A, taken along the plane indicated by the arrows B—B in the drawing. FIG. 30C is a section view of the device shown in FIG. 30A, taken along the plane indicated by the arrows C—C in the drawing. FIG. 30D is a section view of the device shown in FIG. 30A, taken along the plane indicated by the arrows D—D in the drawing. FIG. 30E is a section view of the device shown in FIG. 30A, taken along the plane indicated by the arrows E—E in the drawing. FIG. 30F is a section view of the device shown in FIG. 30A, taken along the plane indicated by the arrows F—F in the drawing. FIG. 30G is a section view of the device shown in FIG. 30A, taken along the plane indicated by the arrows G—G in the drawing. FIG. 31 is a section view of the device shown in FIG. 30A.

As shown in FIGS. 29–31, this Y-shaped device comprises a tapered section of a terminal width Wt to which a straight section 416 with a width Wt and a length Ls is connected. With this configuration, in the case where guided light is transmitted from the tapered waveguide 411 to the branch waveguides, the guided light may be input into the branch waveguides 420, 421, after the wave front which has spread radially through the tapered section 415, is restored to a plane.

This restoration contributes to a further reduction of the loss upon optical branching, by suppressing the radiation of the guided light at the site which has no opposing edge faces of the waveguides due to the reduced terminal widths of the branch waveguides 420, 421; this site is produced because now the edge face of the tapered waveguide 412 is wider than the total of the terminal widths of the branch waveguides 420, 421, and the space between the branch waveguides 420, 421.

This waveguide type optical branching device is constructed with such a structure that to the terminal 411c of the tapered waveguide 411 (first tapered waveguide) is added a straight section 411 of roughly the same width as of the terminal 311c of the tapered section 411.

With this structure, the guided light whose wave front has spread radially in the tapered section 115 may be input into branch waveguides 120, 121 after being restored to a plane.

Figure 37:
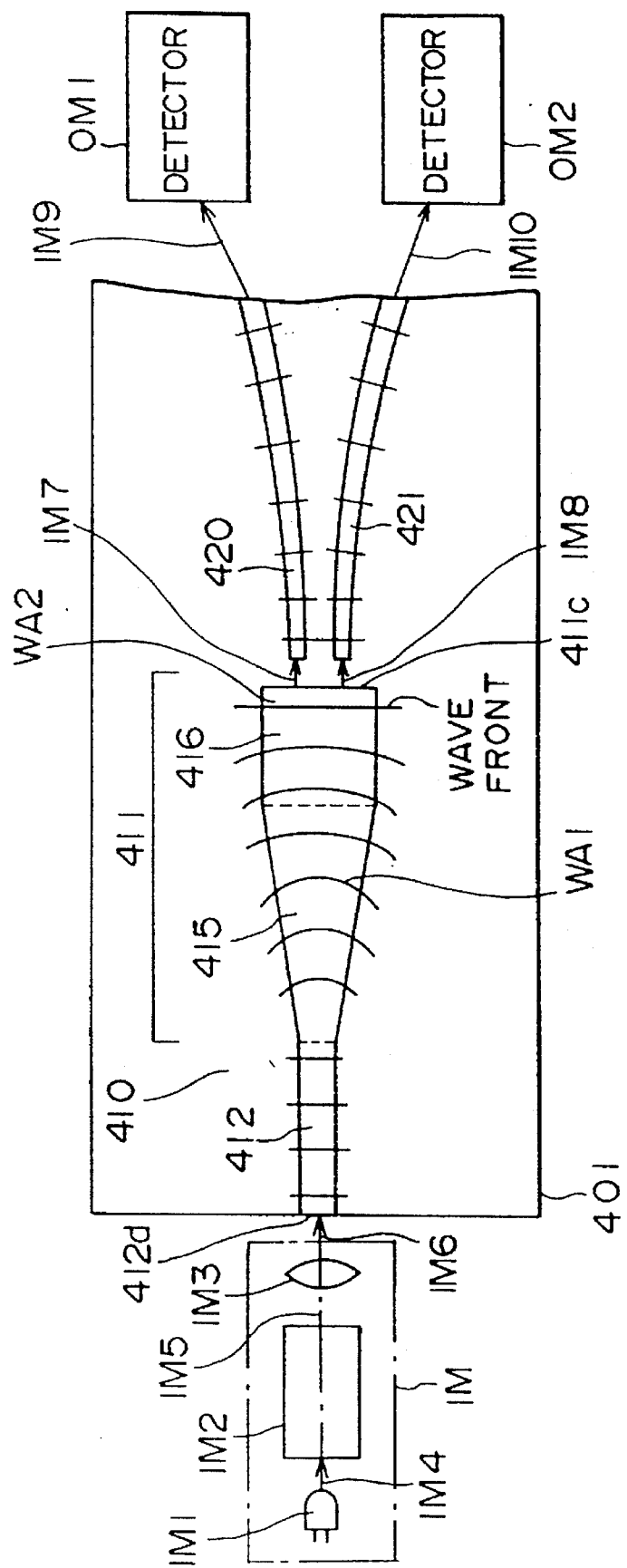
FIG. 37 illustrates the manner of travelling of a wave front.

FIG. 37 illustrates the manner of travelling of the wave front. The above-noted restoration contributes to suppression of the radiation (reflection, diffraction) of guided light at the section of the edge face of the tapered waveguide 411 near the branching section which is provided for increasing the terminal width (the section having a width larger than the total of the terminal widths of the branch waveguides 420, 421, and the distance between the branch waveguides 420, 421), thereby enabling a further reduction in the radiation loss at the branching section.

An input means IM shown in FIG. 31, comprises: a light source IM1, an optical fiber IM2 so arranged that a light beam IM4 output from the light source IM1 enters thereto, and a lens IM3 so arranged that a light IM5 output from the optical fiber IM2 enters thereto. A light IM6 output from the lens IM3 enters into the first core member 410 through the fourth edge face 412d of the first core member 410. The light IM6 travels through the first core member 410, and outputs from the first edge face 411c. A light IM7 output from the first edge face 411c inputs into the second core member 420 through the second edge face 420c. A light IM8 output from the first edge face 411c inputs into the third core member 421 through the third edge face 421c. A light IM9 output from the second core member 420 inputs into a first optical detector OM1, and is detected with the first detector OM1. A light IM10 output from the third core member 421 inputs into a second optical detector, and is detected with the second optical detector.

A more detailed explanation will be made regarding the optical branching device according to the present embodiment.

As FIGS. 29–31 shows, the optical branching device according to the present embodiment comprises a silicon substrate 401, a cladding member 402 formed on the supporting substrate 401, a first core member 410, a second core member 420, and a third core member 421.

The first core member 410 is embedded in the cladding member 402. The second core member 420 is embedded in the cladding member 402 as well. Also, the second core member 420 has a second edge face 420c facing the edge face 411c of the first core member 410 at a first space B. The third core member 421 is also embedded in the cladding member 402. The third core member 421 has a third edge face 421c facing the edge face 411c of the first core member 410 at a second space B. Here, the first space B and the second space B are designed to be identical. The space B(1) between the edge faces 411c and 420c, and the space B(2) between the edge faces 411c and 421c have a following equation.

$$B(2)-\lambda < B(1) < B(2)+\lambda,$$

where $\lambda$ is wavelength of the guided light traveling through the core member 410. Then the space B(1) is substantially equal to B(2). The wavelength $\lambda$ of the guided light using in present embodiment is 1.55 μm. In other words, the first space B(1) is not greater than the total of the space of said second space B(2) and the wavelength ($\lambda$) of the light propagated in said second core member 420, and not smaller than the difference between said second space B(2) and the wavelength ($\lambda$) of the light propagated in said second core member 420.

The cladding member 402 (cladding 402, cladding layer 402) has a first surface 402a. The first surface 402a is parallel to the main surface 401a of the substrate 401. The main surface 401a is defined by the interface between the cladding member 402 and substrate 401. "Direction of the width" is defined to be the direction perpendicular to both the direction perpendicular to the first surface 402a, and to the direction of light propagation. "Direction of the thickness" is defined to be the direction perpendicular to the first surface 402a. The first core member 410 has a light transmission path 412 of given width and thickness, a core section 415, which is contiguous with the light transmission path 412, of a tapered type whose width increases as the distance from the light transmission path 112 does, and a second core section 416 adjacent to the core section 415.

The width 412 of the light transmission path 412 is defined by the distance between the side 412a and side 412b in FIG. 30A.

The first core member 410 has a fifth perpendicular section 412d which is defined by intersection with a plane (plane indicated by the arrows B—B in FIG. 30A) which is perpendicular to the first surface 402a.

The first core member 410 has a first perpendicular section 412e which is defined by intersection with a first plane (plane indicated by the arrows C—C in FIG. 30A) perpendicular to the first surface 402a.

The first core member 410 has a second perpendicular section 416c which is defined by intersection with a second plane (plane indicated by the arrows G—G in FIG. 30A) perpendicular to the first surface 402a and located between the first edge face 411c and first plane (B—B plane).

The first core member 410 has a first horizontal section (410a in FIG. 30A) which is defined by intersection with a third plane (plane indicated the arrows H—H in FIG. 29) parallel to the first surface 402a.

The second core member 420 has a third perpendicular section 420e which is defined by intersection with a fourth plane (plane indicated by the arrows E—E in FIG. 30A) which is perpendicular to the first surface 402a. The second core member 420 has a second horizontal section (420f in FIG. 30A) which is defined by intersection with the third plane (H—H plane). The third core member 421 has a fourth perpendicular section 421e which is defined by intersection with the fourth plane (E—E plane). The third core member 421 has a third horizontal section 421f which is defined by intersection with the third plane (H—H plane).

The first core member 410 is located so that the light input into the first core member 410 through the edge face 412c is propagated in the direction along the first horizontal section 410a across the first perpendicular section 412e and second perpendicular section 416c, and output from the first edge face 411c.

Here, it is assumed that the sections are parallel to the first edge face 411c, and perpendicular to the direction of movement of guided light.

The second core member 420 is located so that the output light from the first edge face 411c is input into the second core member 420 through the second edge face 420c, and is propagated in the direction along the second horizontal section 120f across the third perpendicular section 420e, and output at the second edge face 420d of the second core member 420. The third core member 421 is located so that the output light from the first edge face is input into the third core member 421 through the third edge face 421c, and is propagated in the direction along the third horizontal section 421f across the fourth perpendicular section 421e, and output from the third core member 421.

In this connection, the area of the first edge face 411c is larger than the area of the first perpendicular section 412e. This is because the first core member 410 has a tapered section 415 which diverges toward the direction of the second and third core members 420, 421. The tapered section 415 has sides 415a, 415b which form given angles with the optical axis OP410 (center line) of the first core member 410.

In other words, the intersections 415a, 415b between the two sides 415a, 415b perpendicular to the first surface 402a of the section (liner waveguide) 415, and the third plane (H—H plane) form given angles with the optical axis OP410 (center line) of the first core member 410 in the third plane.

In other words, this branch waveguide comprises a substrate 401 with a substrate surface 401a, a first tapered waveguide 410, a second waveguide 420 and a third waveguide 421.

The first tapered waveguide 410 comprises a fourth waveguide 416, and a second tapered waveguide 415 which is contiguous therewith. The first tapered waveguide 410 is formed on the substrate surface 401a.

The fourth waveguide 416 has a first edge face 411c including a plane which crosses the substrate surface 401a, a fifth side 416a including a plane which crosses the substrate surface 401a, and a sixth side 111c parallel to the fifth side 416a.

The second tapered waveguide 415 is contiguous with the fourth waveguide (straight waveguide) 416. The second tapered waveguide 415 diverges toward the fourth waveguide 416. The second waveguide 420 is formed on the substrate surface 401a. The second waveguide 420 has a second edge face 420c facing the first edge face 411c at a given space.

The third waveguide 421 is formed on the substrate surface 401a. The third waveguide 421 has a third edge face 421c facing the first edge face 411c at a given space. As the first core member comprises the tapered section 415, the density of the energy (power) of the optical signal input into the first core member 410 at the edge face 412c decreases gradually as the light travels passing through the first perpendicular section 412d toward the first edge face 411c.

The output light from the edge face 411c of the first core member 410 is input into the second core member 420 through the second edge face 420c, and into the third core member 421 through the third edge face 421c. The present inventors have found, based on their previous research, that for the improvement in coupling efficiency of light propagated between two optical components it is effective to make the opposing edge faces of the respective optical components perpendicular to the direction of light propagation. The first edge face 411c of the optical branching device according to the present embodiment is perpendicular to the direction of movement of the light passing through the first edge face 411c. Also, the second edge face 420c is perpendicular to the direction of movement of the incident light to the second edge face 420c. The third edge face 121c is perpendicular to the direction of movement of the incident light to the third edge face 421c.

As a result, the first edge face 411c is opposite to the second edge face 420c, whereas the first edge face 411c is parallel to the second edge face 420c. The first edge face 411c is opposite to the third edge face 421c, whereas the first edge face 411c is parallel to the third edge face 421c.

For a further improvement in the optical coupling efficiency of the optical branching device, the area of the second perpendicular section 416c is made identical to the area of the first edge face 411c for the optical branching device according to the present embodiment. In other words, the width of the second perpendicular section 416c is identical to the width (Wt) of the first section 111c.

More particularly, as shown in FIG. 30A, the light input into the first core member 410 gradually loses its optical power density (energy density) as it travels from the first perpendicular section 412e to the first edge face 411c, while the wave front of the light fans out in the first horizontal section 410a. In the case where the area of this second perpendicular section 116c is equal to the area of the first edge face 411c, the wave front becomes parallel to the first edge face during its propagation from the second perpendicular section 416c to the first edge face 411c.

As a result, the directivity of the light output from the first edge face 411c is increased, which results in an increased coupling efficiency of the light entering the second core member 420 and third core member 421.

In addition, as the second edge face 420c and third edge face 421c are parallel to the wave front WA2 leaving the first edge face 411c, the optical coupling efficiency is increased.

In summary, the first core member 410 has the first edge face 411c which aids in lowering the energy density of the input light, and is in the form which makes the wave front WA1 of the light parallel to the first edge face 411c for its exit through the first edge face 411c. The second core member 420 has the second edge face 420c facing the first edge face 411c at a given space, and the third core member 421c has a third edge face 421c facing the first edge face 411c at a given space (B).

The light travels through the light transmission path (core) 412 of a given width (core size). The light transmission path 412c is a part of the first core member 410 which is adjacent to the tapered waveguide 415, and has the same sectional area as the minimum sectional area of the first perpendicular section 412e.

The second core member 420 has sides 420a, 420b perpendicular to the first surface 402a. The side 420a and side 420b are parallel to the direction of movement of the light propagated in the second core member 420. In this connection, the side 420a and side 420b faces each other, while the side 420a and side 420b run in parallel with each other. Accordingly, the sides 420a and side 420b are perpendicular to both the first surface 420a and the second edge face 420b.

Similarly, the third core member 421 has sides 421a, 421b which are perpendicular to the first surface 402a. The side 421a and side 421b are parallel to the direction of movement of the light propagated in the third core member 421. In turn, the side 421a and side 421b are opposite to each other, whereas the side 421a and side 421b are parallel to each other. Thus, the side 421a and side 421b are perpendicular to both the first surface 402a and third edge face 421c.

The space between the second core member 420 and the third core member 421 increases as their distance from the first core member 410 does. This is because the second core member 420 comprises bent sides 430a, 430b bending apart from the third core member 421. The bent side 430a is contiguous with the plane 120a, whereas the bent side 130b to the plane 420b. The curvature radius of the bent side 430a is R, and also the curvature radius of the bent side 430b is almost R. The third core member 421 has bent sides 431a, 431b bending apart from the second core member 420. The bent side 131a is adjacent to the plane 421a, whereas the bent side 431b to the plane 421b. The curvature radius of the bent side 431a is R, and also the curvature radius of the bent side 431b is almost R.

The light output from the second edge face 420c and input into the second core member 420 is then output through the edge face 420d of the second core member 420. The light output from the third edge face 421c and input into the third core member 421 is then output through the edge face 421d of the third core member 421. In this connection, the optical distance from the input edge face 420c to the output edge face 420d of the second core member 420 is equal to the optical distance between the input edge face 421c and the output edge face 421d of the third core member 421. As a result, in cases where beams of the light input from the first core member 410 into the core members 420, 421 are output from the core members 420, 421, the beams of the light branched by the core members 420, 421 are in the same phase upon output from the edge faces 420d, 421d. Since the beams of the output light from the edge faces 420d, 421d are in one phase, the phase matching of the respective beams are easy to perform for coupling of the output light, etc.

An intersection (cross line) 420i is an intersection of the second edge face 420c and second side face 420b. An intersection (cross line) 421i is an intersection of the third edge face 421c and third side face 421a.

An intersection (cross line) 420j is an intersection of the second edge face 420c and first side face 420a. An intersection (cross line) 421j is an intersection of the third edge face 421c and fourth side face 421b. An intersection (cross line) 411i is an intersection of the first edge face 411c and the side face 416b. An intersection (cross line) 411j is an intersection of the first edge face 411c and the side face 416a. The distance between the line 411i and line 411j is Wt (μm), the distance between the line 420i and line 421j is (2W+A) (μm), distance Wt is greater than (2W+A). The distance (A) is defined by the space between the second core memer 420 and third core member 421. More precisely, the distance (A) is defined by the distance between the line 420j and line 421j.

Figure 32:
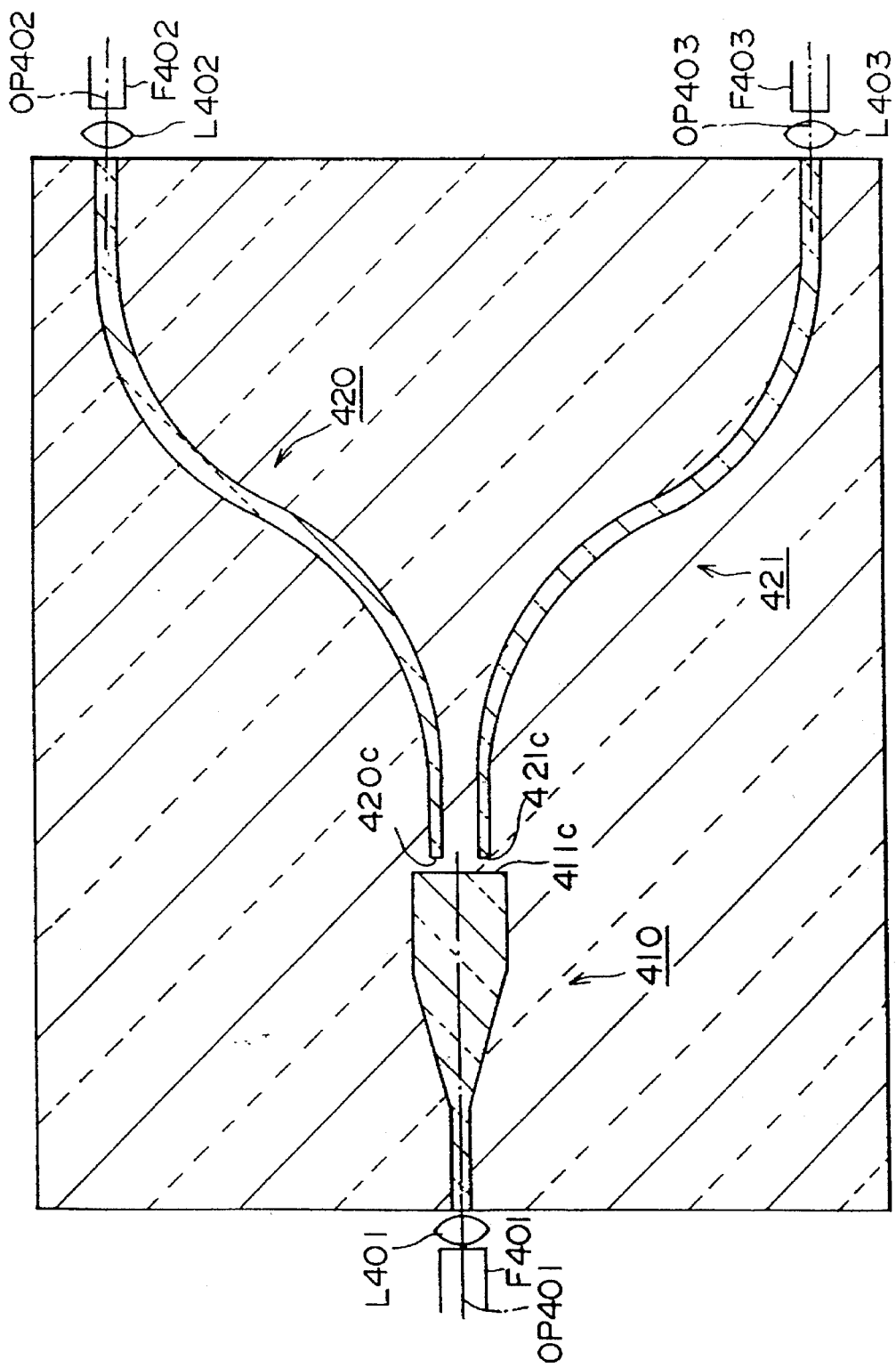
FIG. 32 is a section view of a modification of the optical branching device shown in FIG. 30A with improvements made on the edges 420$d$, 421$d$ of the second core member 420 and third core member 421.

FIG. 32 shows a modification of the optical branching device shown in FIG. 30A with improvements made on the edge faces 420d, 421d of the second core member 420 and third core member 421. The edge faces 420d, 421d of the optical branching device shown in FIG. 30A is exposed. The direction of the normal to the exposed edge face 120d forms a given angle with the direction of movement of the light (direction of the optical axis) propagated in the third core member 421. Also, the direction of the normal to the exposed edge face 421d forms a given angle with the direction of movement of the light propagated in the third core member 421. More particularly, the second core member 120 and the third core member 121 are S-shaped waveguides. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis). For this finding, as shown in FIG. 32, the optical branching device according to the present embodiment is positioned so that the output edge face 420d of the second core member 420 is perpendicular to the optical axis OP402 (indicated by an alternating long and short dash line) of the second core member 420. Optical fiber F402 is located opposite to the edge face 420d of the second core member 420 via a lens L402. Additionally, the third core member 421 is located so that the output edge face 421d of the third core member 421 is perpendicular to the optical axis OP3 (indicated by an alternating long and short dash line) of the third core member 421. Optical fiber F403 is located opposite to the edge face 121d of the third core member 121 via a lens L103. Additionally, the first core member 110 is located so that the input edge face 112c of the first core member 110 is perpendicular to the optical axis OP401 (indicated by an alternating long and short dash line) of the first core member 121. Optical fiber F101 is located opposite to the edge face 112c of the first core member 110 via a lens L101.

Figure 33:
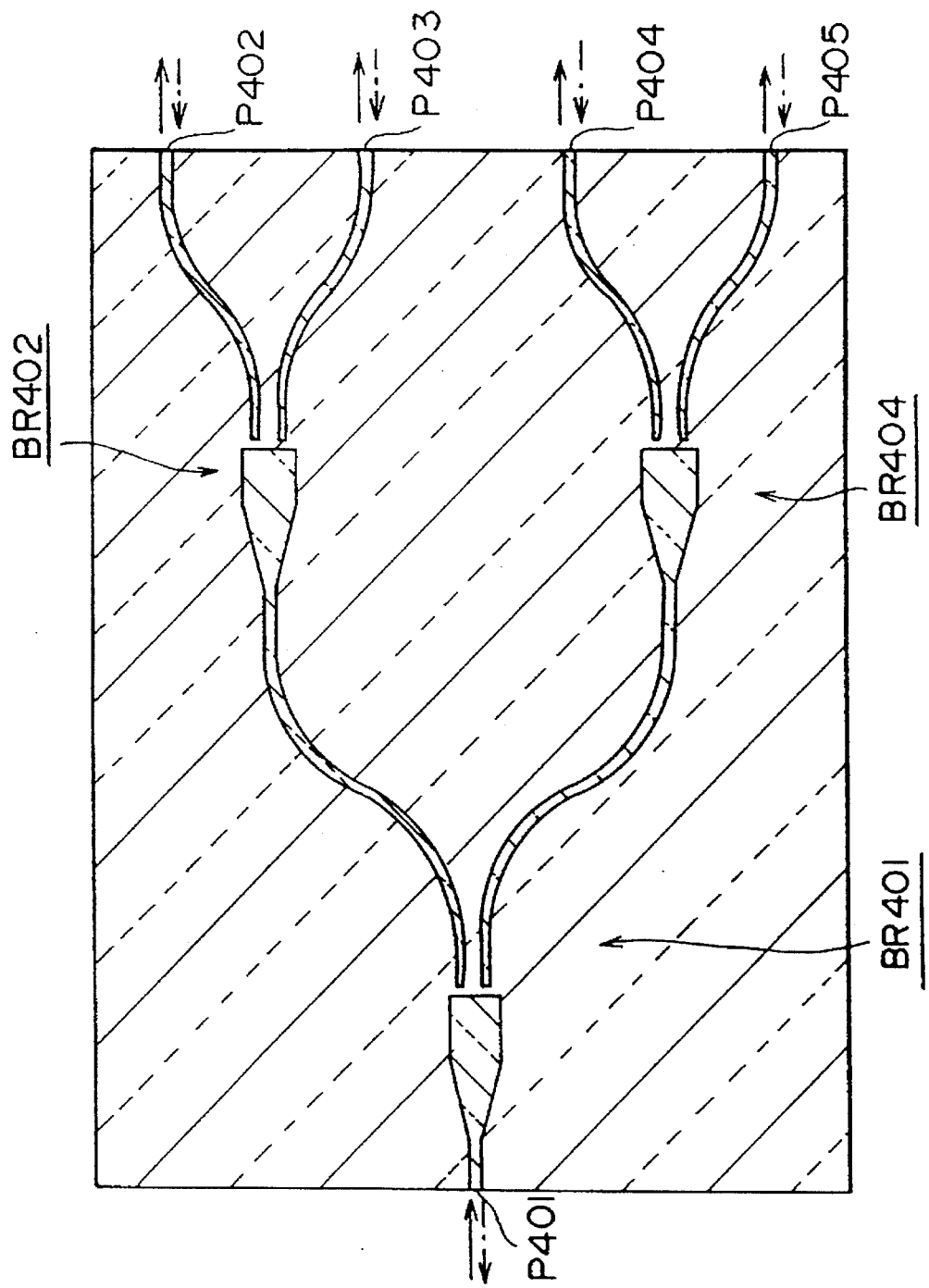
FIG. 33 is a section view of an optical branching device assembly with a 1×4 structure which consists of 3 connected optical branching devices BR401, BR402 and BR403 of the type shown in FIG. 32.

FIG. 33 is an optical branching device assembly with a 1×4 structure which consists of 3 connected optical branching devices BR101, BR102 and BR103 of the type shown in FIG. 32. This optical branching device assembly comprises the first optical branching device BR401, the second optical branching device BR402 whose input edge face 412c is connected to the output edge face 420d of the first optical branching device BR401, and the third optical branching device BR403 whose input edge face 412c is connected to the output edge face 421d of the first optical branching device BR401. The optical signal (indicated by a solid arrow in the drawing) input into the first optical branching device BR401 through the edge face P401 is divided with this optical branching device, and output through the edge faces P402, P403 of the second optical branching device BR402, and through the edge faces P404, P405 of the third optical branching device BR403. Conversely, the respective optical signals (indicated by alternating long and short dash arrows) input at the edge faces P402–P405 are coupled with the optical branching device, and output from the edge face P401.

Figure 35:
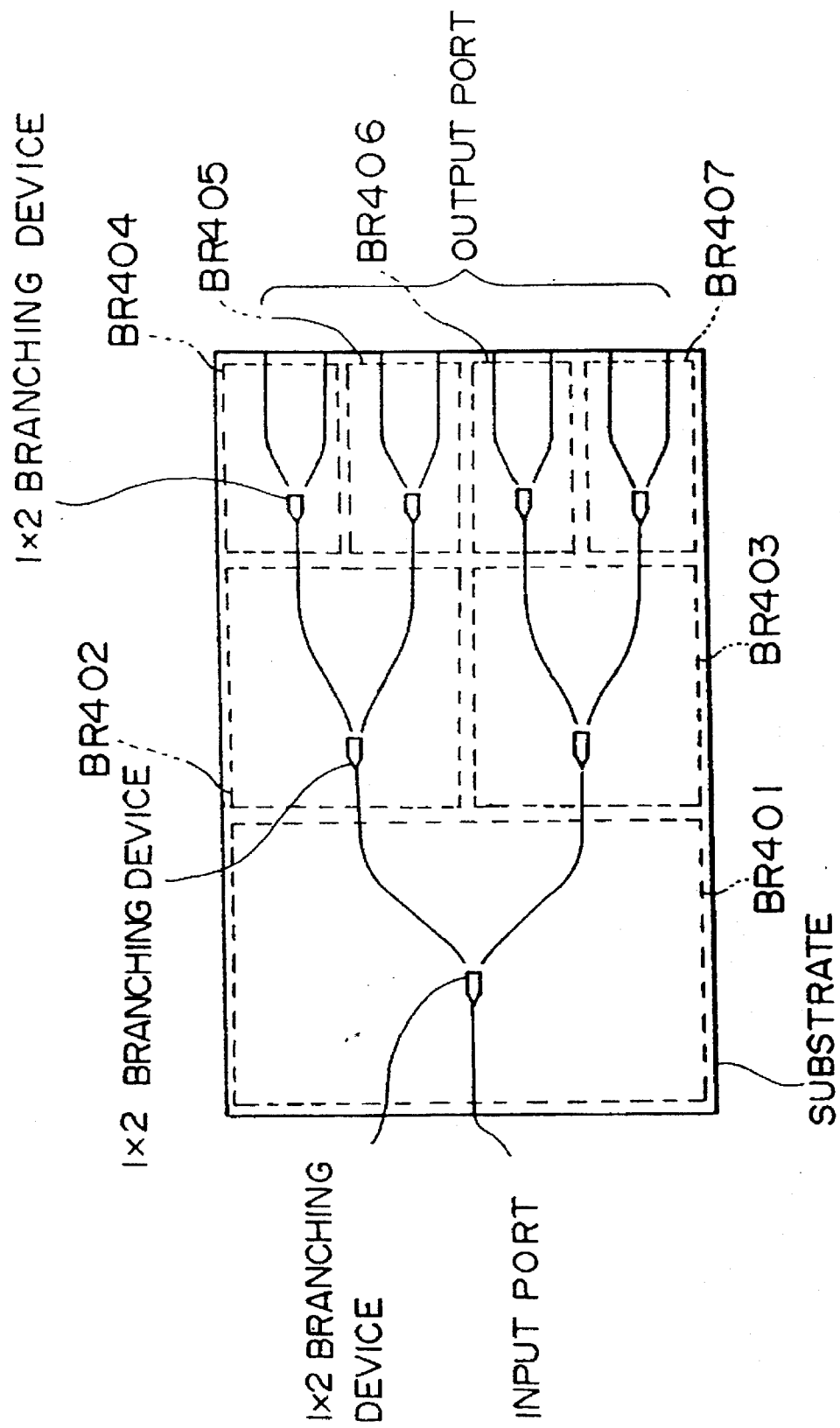
FIG. 35 shows an optical branching device assembly with a 1×8 structure which consists of 7 connected optical branching devices BR401, BR402, BR403, BR404, BR405, BR406 and BR407 of the type shown in FIG. 32.

FIG. 35 is an optical branching device assembly with a 1×8 structure which consists of 7 connected optical branching devices BR401, BR402, BR403, BR404, BR405, BR406 and BR407 of the type shown in FIG. 32. This optical branching device assembly comprises the first optical branching device BR401 with an input edge face (input port), the second optical branching device BR402 whose input edge face 412c is connected to the output edge face 420d of the first optical branching device BR401, and the third optical branching device BR403 whose input edge face 412c is connected to the output edge face 421d of the first optical branching device BR401. In addition, this optical branching device assembly comprises a fourth optical branching device BR404 whose input edge face 412c is connected to the output edge face 420d of the second optical branching device BR402, the fifth optical branching device BR405 whose input edge face 412c is connected to the output edge face 421d of the second optical branching device BR401, the sixth optical branching device BR406 whose input edge face 412c is connected to the output edge face 420d of the third optical branching device BR403, and the seventh optical branching device BR407 whose input edge face 412c is connected to the output edge face 421d of the third optical branching device BR403.

Accordingly, this optical branching device assembly may branch single light beam input into the assembly, into eight beams, and reversely may couple eight beams input into this assembly into single beam. In this connection, all the optical branching devices BR401, BR402, BR403, BR404, BR405, BR406, and BR407 are formed on the same substrate.

Figure 34:
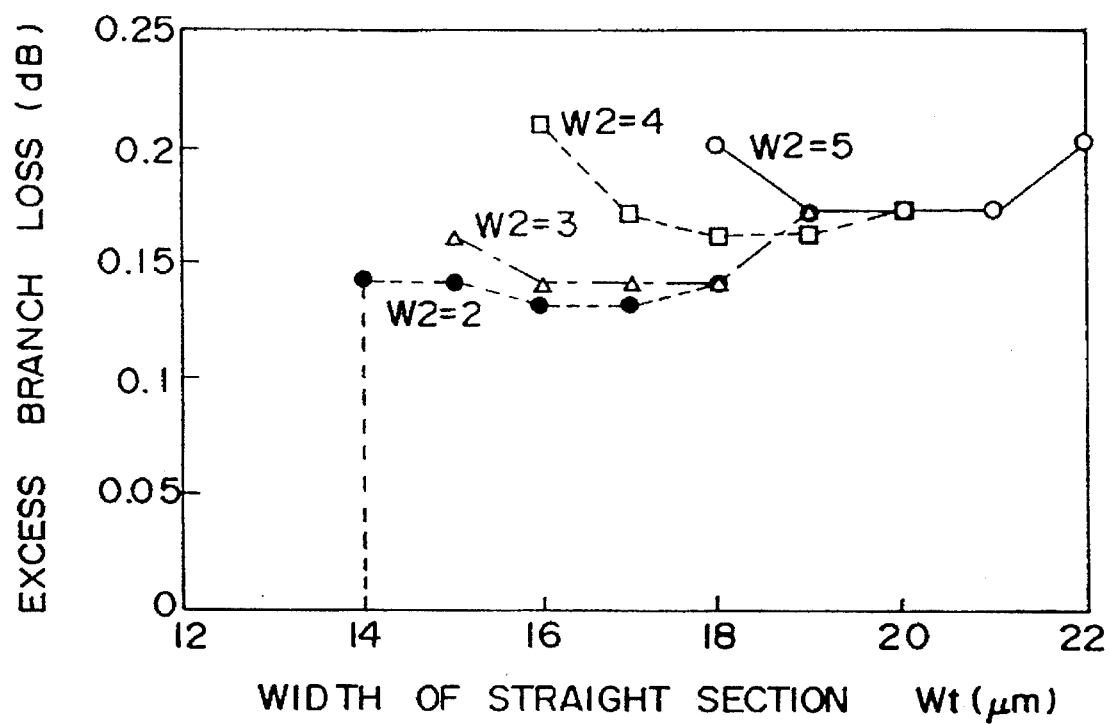
FIG. 34 is a graph showing the results of calculation of the excess branch loss of guided light at a wavelength of 1.55 μm, for the Y-shaped device according to the embodiment shown in FIGS. 29–31, using as the parameters the width (=Wt) of the straight section 416, and the terminal widths (=W2) of the branch waveguides 420, 421.

FIG. 34 is a graph showing the results of calculation of excess branch loss for guided light at a wavelength of 1.55 μm, using as the parameters the width of the straight section 416, and the terminal widths of the branch waveguides 420, 421 (=W2), with a Y-shaped device of the present embodiment shown in FIGS. 29–31. The calculation of the excess branch loss was conducted by the beam propagation method. For this calculation, the dimensions of the respective parts shown in FIG. 31 were set as A=4 μm, B=4 μm, W1=8 μm, Lt=1200 μm, and R=50 mm, and the specific refractive index difference between the core and cladding at 0.3%. Data at the respective values of the terminal width was obtained for five samples each of the devices which had different widths (=Wt) in 1 μm intervals.

From the graph of FIG. 34, it is recognized that the smaller the terminal widths (=W2) of the branch waveguides 420, 421, the smaller the width (=Wt) of the straight section 416 which provides a minimum excess branch loss, with a tendency of the minimum value itself to lower.

However, the excessively shortened terminal widths causes a lower level of function of confining the electric fields, thereby spreading the electric fields, increasing the radiation loss, and lowering the processability. According to the findings of the present inventors, in order to produce significant effects due to the reduction in the terminal widths which exceeds an increased radiation loss and to ensure satisfactory processing stability, desirably the widths of the terminals 420c, 421c of the branch waveguides 420, 421 are ½–⅘ the widths of the proximal ends 420x, 421x. Here, it is assumed that the wavelength of the guided light is about 1.3–1.55 μm.

For confirmation of the effects of the Y-shaped device of the embodiment, the present inventors prepared branch waveguides with a 1×8 structure as shown in FIG. 35. The device shown in FIG. 35 is an optical component prepared by three-stepped combination of the Y-shaped device shown in FIG. 32. The transmission characteristics of the optical component shown in FIG. 35 were measured. Further, for comparison, a 1×8 device assembly comprising a three-stepped combination of the Y-shaped device shown in FIG. 11 (Comparison) was also prepared for measurement of transmission characteristics.

The 1×8 device assembly was prepared by forming a $SiO_2$ layer (cladding) on a silicon substrate 401 by the flame hydrogen deposition (FED), depositing a layer of doped, highly refractive $SiO_2$ glass thereon, etching the core, and depositing a $SiO_2$ layer as the upper cladding.

The dimensions of the respective parts of the Y-shaped device constructing the 1×8 device assembly follow, using the reference characters in FIG. 31 and FIG. 11.
A=4 μm;
B=4 μm;
W1=8 μm;
Lt=1200 μm; and
R=50 mm.

The terminal widths of the branch waveguides 420, 421 (=W2), the terminal width Wt of the straight section 416, and the length Ls of the straight section 416 were as follows: For the device of FIG. 35: W2=4 μm; Wt=18 μm; Ls=150 μm For the device of FIG. 11 (Comparison): W2=W1=8 μm; Wt=20 μm; Ls=0 μm For all the devices, the specific refractive index difference between the core and cladding was 0.3%, while the thickness of the waveguide was 8 μm. The above-noted dimensions were selected on the basis of the data shown in FIG. 34. More specifically, they were selected on the fact that the optical branching device of the above-noted dimensions provided a relatively small excess branch loss among the data at W2=4 μm shown in FIG. 34.

Laser diode light at a wavelength of 1.55 μm was input into and output from the Y-shaped devices shown in FIGS. 35, 11 for measurement of the excess branch loss (the value calculated by subtracting the total of the essential loss with a 1×8 branching structure of 9 dB, the coupling loss with the input, output fiber, and the transmission loss of the waveguide from the entire loss with the device).

The outputs from the 8 output ports of the 1×8 device assembly were averaged to determine the mean excess branch loss. As a result, the value was 1.53 dB for the 1×8 device assembly of the type shown in FIG. 11 (Comparison), whereas a mean excess branch loss of 0.80 dB was observed with the 1×8 device assembly shown in FIG. 35 (comprising the device of FIG. 29), and thus the device of the present invention demonstrated exceptionally excellent properties as compared with the comparison device. This effect is believed to have resulted from the use of the structure of branch waveguides 420, 421 with reduced terminal widths.

Figure 36:
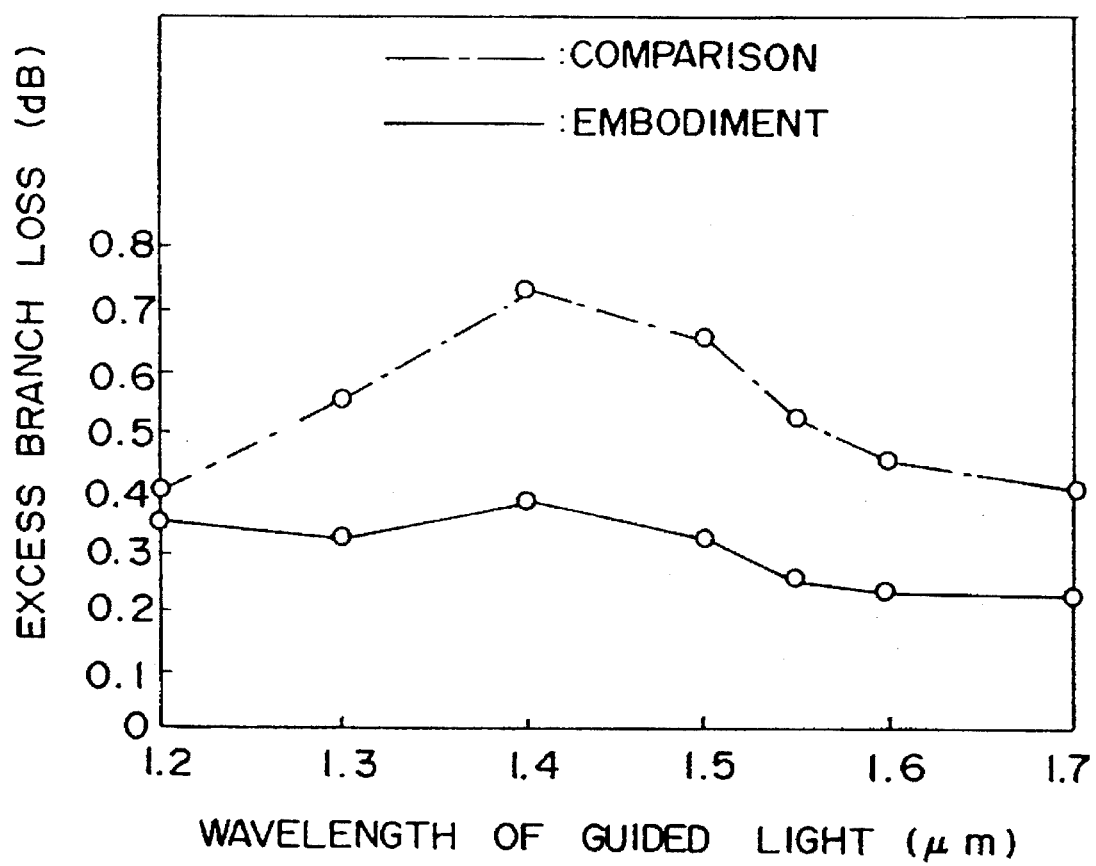
FIG. 36 is a graph showing the results of measurement of wavelength-dependency of the excess branch loss with the 1×8 device assembly shown in FIG. 35 (Embodiment), and the 1×8 device assembly using a device shown in FIG. 11 (Comparison).

FIG. 36 is a graph showing the results of measurement of wavelength-dependency of the excess branch loss with the 1×8 device assembly of FIG. 35 (Embodiment), and another 1×8 device assembly of FIG. 11 (Comparison). Here, the excess branch loss is per branching step, and actually calculated by dividing the excess branch loss of the entire 1×8 assembly by 3.

From FIG. 36, it is apparent that the device shown in FIG. 29 (Embodiment) provides a lower loss over the full range of wavelengths, and particularly in the range of long wavelengths, the loss of light is roughly half that caused with the comparison device shown in FIG. 11. It is understood that the device of the embodiment is more excellent than the comparison device over a rather wide range of wavelengths of guided light. In addition, the device of the embodiment is less susceptible to variance of the level of loss depending on the change in wavelengths of guided light. In conclusion, as compared with the comparison type, the waveguide type optical branching device according to the present invention has an additional advantage in that it may be used satisfactorily even for optical measurement systems which sweep light over a rather wide wavelength range.

Next, an explanation will be made regarding a directional coupler according to one embodiment of the present invention.

Figure 38:
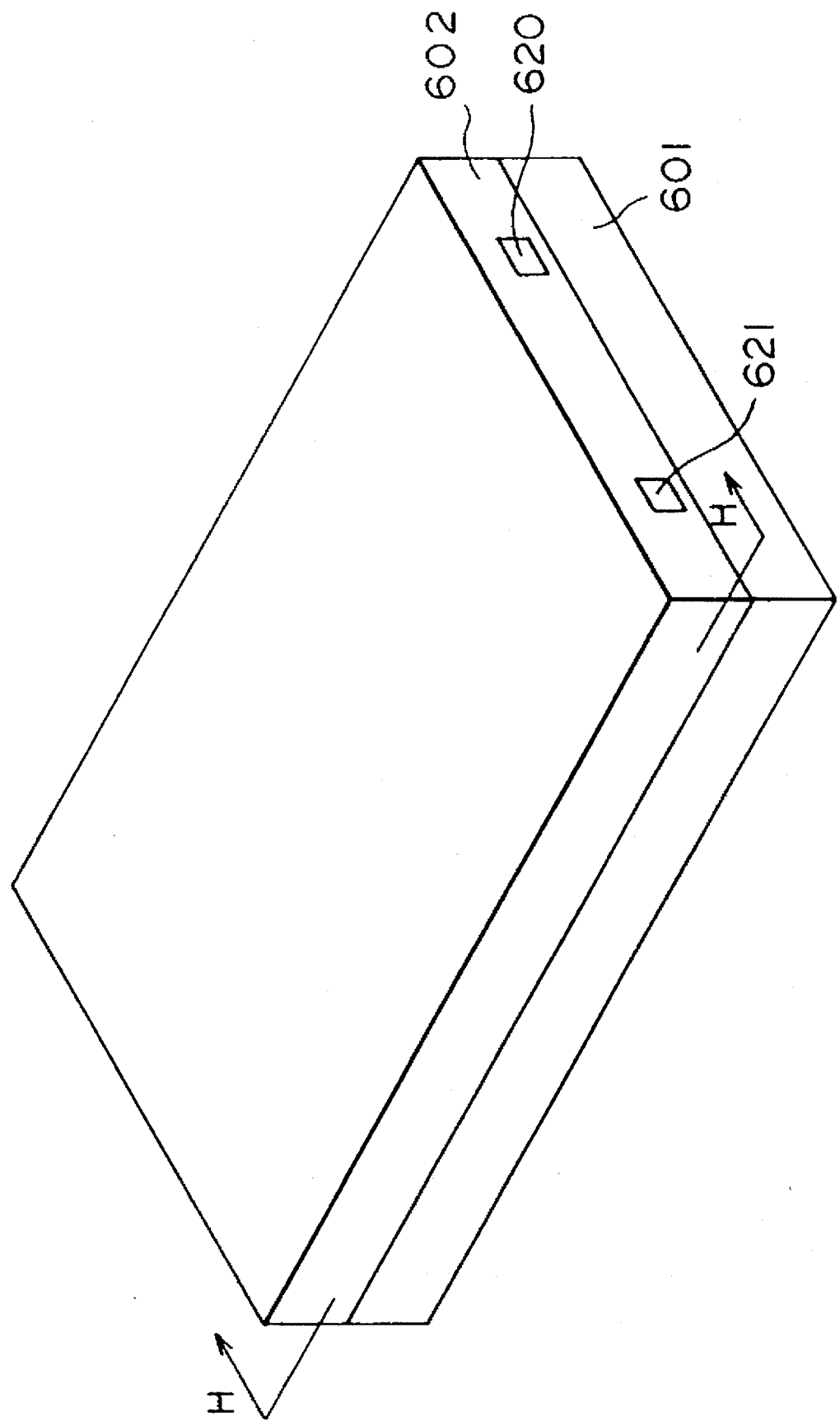
FIG. 38 is a perspective view of an directional coupler.

FIG. 38 is a perspective view of this directional coupler. FIG. 33 is a section view of the device shown in FIG. 38, taken along the plane indicated by the arrows H—H in FIG. 38. FIG. 40A is a section view of the device shown in FIG. 39, taken along the plane indicated by the arrows A—A in the drawing. FIG. 40B is a section view of the device shown in FIG. 39, taken along the plane indicated by the arrows B—B in the drawing. FIG. 40C is a section view of the device shown in FIG. 39, taken along the plane indicated by the arrows C—C in the drawing. FIG. 40D is a section view of the device shown in FIG. 39, taken along the plane indicated by the arrows D—D in the drawing. FIG. 40E is a section view of the device shown in FIG. 39, taken along the plane indicated by the arrows E—E in the drawing.

The directional coupler according to the present embodiment comprises a silicon substrate 601, a cladding member 602 formed on the supporting substrate 601, a first core member 660, a second core member (second waveguide) 620, and a third core member (third waveguide) 621.

The first core member 660 is embedded in the cladding member 602. The second core member 620 is embedded in the cladding member 602. The second core member 620 comprises a second edge face 620c which faces the first edge face 611c of the first core member 660 at a given space (B). The third core member 621 is also embedded in the cladding member 602. The third core member 621 comprises a third edge face 621c which faces the first edge face 611c of the first core member 660.

The first core member 660 comprises a fourth edge face 611d facing the first edge face 611c.

The fourth core member 640 is embedded in the cladding member 602. The fourth core member 640 comprises a fifth edge face facing the fourth edge face 611c of the first core member 660 at a given space.

Also the fifth core member 641 is embedded in the cladding member 602. The fifth core member 641 comprises a sixth edge face facing the fourth edge face 611d of the first core member 660 at a given space (B).

The cladding member 602 (cladding 602, cladding layer 602) has a first surface 602a. The first surface 602a is parallel to the main surface 601a of the substrate 601. "Direction of the width" is defined to be the direction perpendicular to both the direction perpendicular to the first surface 602a, and to the direction of light propagation. "Direction of the thickness" is defined to be the direction perpendicular to the first surface 602a. The first core member 660 has given width and thickness.

The first core member 660 has a first perpendicular section 612d which is defined by intersection with a first plane (plane indicated by the arrows C—C in FIG. 39) which is perpendicular to the first surface 602a. The width of the first perpendicular section 612d is constant.

The first core member 660 has a first horizontal section (660a in FIG. 39) which is defined by intersection with a third plane (plane indicated the arrows H—H in FIG. 38) parallel to the first surface 602a.

The second core member 620 has a third perpendicular section 620e which is defined by intersection with a fourth plane (plane indicated by the arrows E—E in FIG. 39) which is perpendicular to the first surface 602a. The second core member 620 has a second horizontal section (620f in FIG. 39) which is defined by intersection with the third plane (H—H plane).

The third core member 621 has a fourth perpendicular section 621e which is defined by intersection with the fourth plane (E—E plane). The third core member 621 has a third horizontal section 621f which is defined by intersection with the third plane (H—H plane).

The fourth core member 640 has a fifth perpendicular section 640e which is defined by intersection with a fifth plane (plane indicated by the arrows A—A in FIG. 39) which is perpendicular to the first surface 602a. The fourth core member 640 has a fourth horizontal section (640f in FIG. 39) which is defined by intersection with the third plane (H—H plane).

The fifth core member 641 has a sixth perpendicular section 641e which is defined by intersection with the fifth plane (A—A plane). The fifth core member 641 has a fifth horizontal section 641f which is defined by intersection with the third plane (H—H plane).

In other words, the branch waveguide shown in FIGS. 38–32–34E comprises a substrate 601, straight waveguide (mixer) 660, second waveguide 620, third waveguide 621, fourth waveguide 640, and fifth waveguide 641.

The width of the first edge face 611c is the length of the first edge face 611c along the direction (direction of the width) perpendicular to both the direction of the normal to the substrate surface 601a (direction of the thickness), and the direction of the normal to the first edge face 611c (direction of the optical axis). The width of the first edge face 611c is greater than the distance between the second side 620c and the third side 521c. The width of the first edge face 611c is greater than the distance between the second side 620b and the third side 621a.

The width of the second waveguide 620 lowers toward the mixer 660. Accordingly, the area of the section 620e is smaller than the area of the second edge face 620c.

The width of the third waveguide 621 lowers toward the mixer 660. Accordingly, the area of the section 621e is greater than the area of the third edge face 621c.

The width of the fourth waveguide 640 lowers toward the mixer 660. Accordingly, the area of the section 640e is greater than the area of the fifth edge face 640c.

The width of the fifth waveguide 641 lowers toward the mixer 660. Accordingly, the area of the section 641e is greater than the area of the sixth edge face 641c.

The first core member 660 is positioned so that the light input into the first core member 660 via the fourth waveguide 640 and fifth waveguide 641, is output from the optical branching device through the second waveguide 620 and third waveguide 621.

Figure 39:
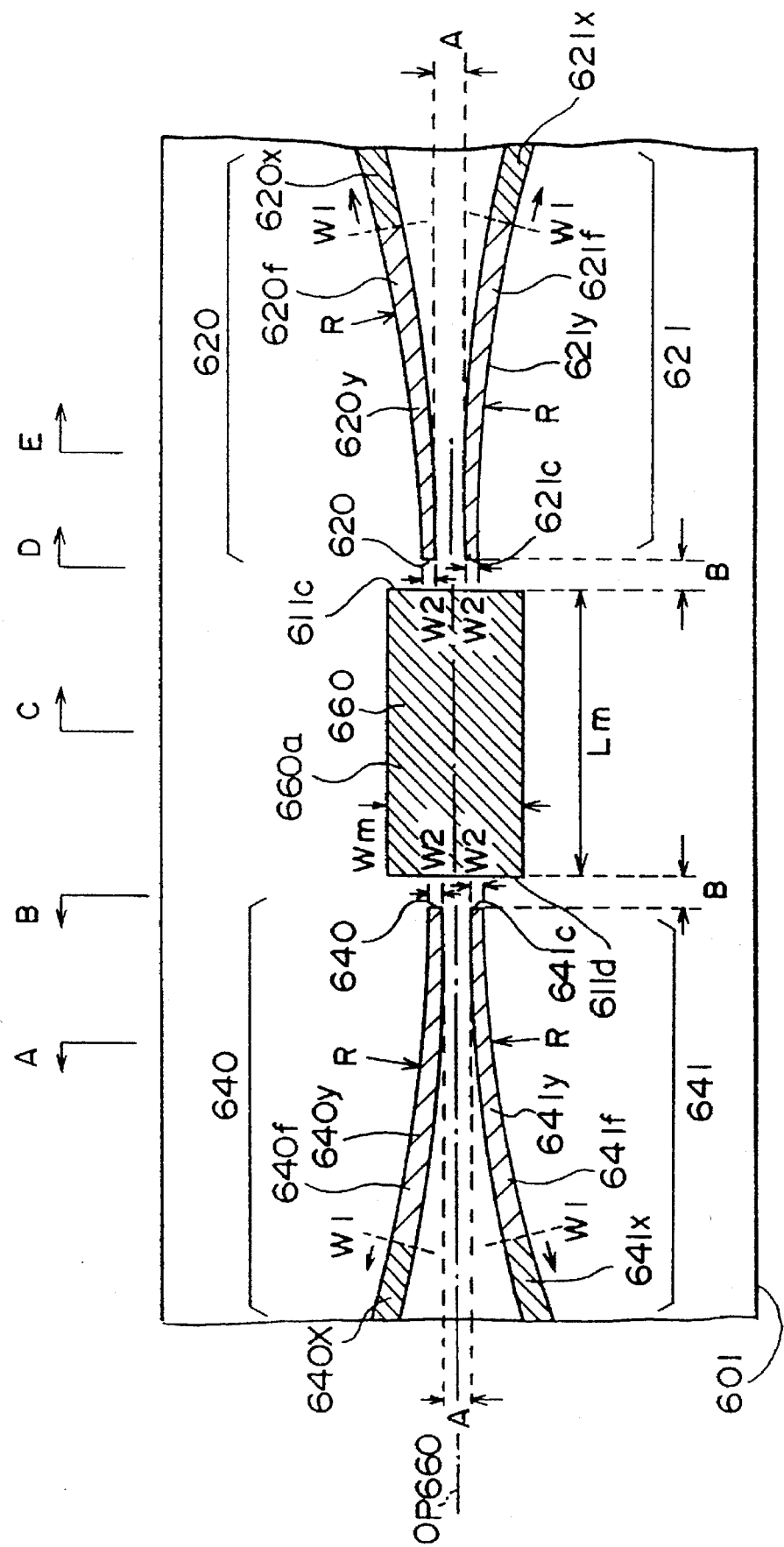
FIG. 39 is a section view of the device shown in FIG. 38, taken along the plane indicated by the arrows H—H in FIG. 38.
Figure 40A:
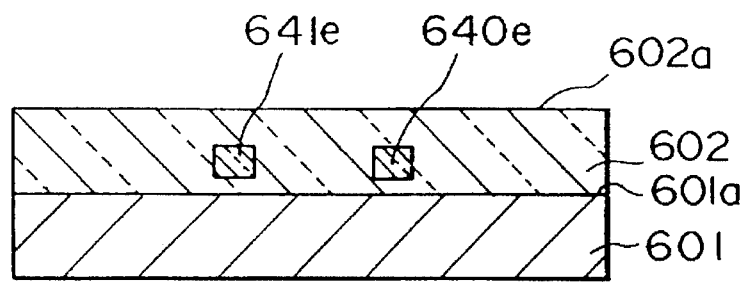
FIG. 40A is a section view of the device shown in FIG. 39, taken along the plane indicated by the arrows A—A in the drawing.
Figure 40B:
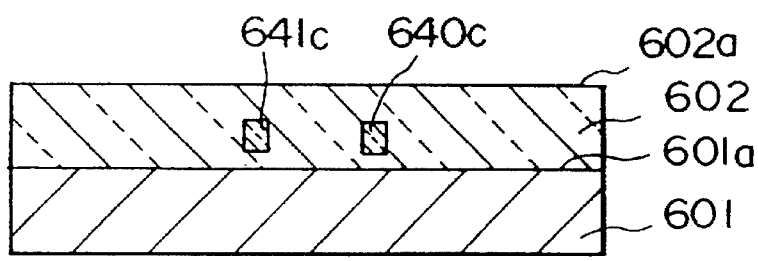
FIG. 40B is a section view of the device shown in FIG. 39, taken along the plane indicated by the arrows B—B in the drawing.
Figure 40C:
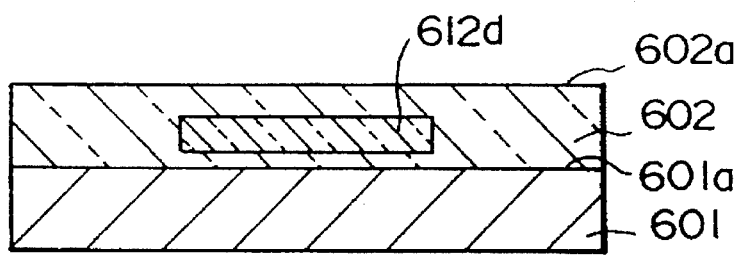
FIG. 40C is a section view of the device shown in FIG. 39, taken along the plane indicated by the arrows C—C in the drawing.
Figure 40D:
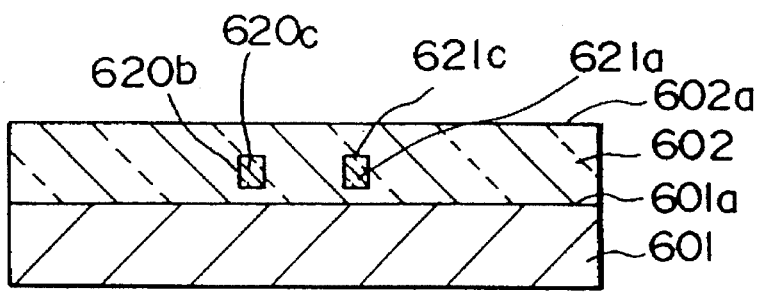
FIG. 40D is a section view of the device shown in FIG. 39, taken along the plane indicated by the arrows D—D in the drawing.
Figure 40E:
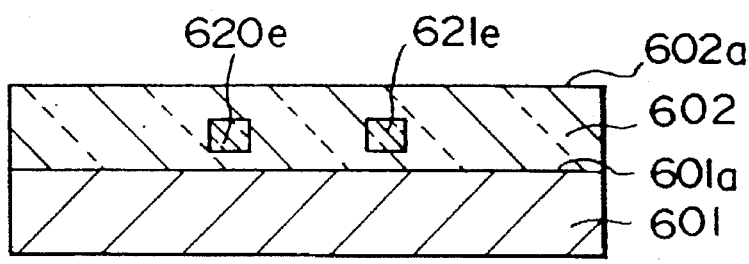
FIG. 40E is a section view of the device shown in FIG. 49, taken along the plane indicated by the arrows E—E in the drawing.

The directional coupler shown in FIG. 39 comprises, in the same manner as the Y-shaped device of the present embodiment, a core formed on a silicon substrate 601-that is, single mode waveguides 620, 621, 640, 641, and a multimode waveguide 660, and a cladding 602 with the core embedded therein.

To either terminal 611c of the multimode waveguide 660 there are connected the single mode waveguides 620, 621, while the single mode waveguides 640, 641 are connected to the other terminal 611d. The single mode waveguides 620, 621, 640, and 641 are located close at a space A, and are positioned symmetrically with respect to the center line (optical axis OP660) of the multimode waveguide 660. The space between the single mode waveguides 620, 621 increases with distance from the first core member 660. The space between the single mode waveguides 640, 641 increases with distance from the first core member 660.

For a more detailed explanation about the structure shown in FIG. 39, the edge faces 640c, 641c of the single mode waveguides 640, 641 face the edge face 660d of the multimode waveguide 660 at space B. This spacing is the same for the single mode waveguides 620, 621. To acquire excellent processing stability and enough lowered loss, the spaces B between the edge faces 640c, 641c of the single mode waveguides 640, 641, or the edge faces 620c, 621c of the single mode waveguides 620, 621 and the edge face 660d or 660c of the multimode waveguide 660 are all preferred to be on the order of 2–8 μm.

In the branching structure of the directional coupler shown in FIG. 39, the single mode waveguides 620, 621, 640 641 are separate from the multimode waveguide 660. Therefore, this coupler is free from sections susceptible to rounding during the preparation, such as the gap section 30 in the vicinity of the branching section of the optical branching device shown in FIG. 9. Accordingly, the device shown in FIG. 39 has more excellent processing stability than the device shown in FIG. 9, and my be prepared in high yields on a large scale more suitably for the construction of a large scale communication system, etc.

The present invention is not limited to the embodiments described above, and may be modified in various ways. For example, so long as the structure where the terminal width of the single mode branch waveguide is smaller than the proximal width, is maintained, the composition of the waveguide type optical branching device, forms and dimensions of the respective parts thereof, etc. are not limited to those of the above-noted embodiments. In addition, the configuration of the waveguide type optical branching device is not limited to the embedded configuration of the present embodiments, and any other configuration including hard-ridge type, loading type, etc. may be used.

Furthermore, the single mode branch waveguides need not be placed symmetrically with respect to the center line of the multimode waveguide. The present inventors believe that the same excellent processing stability and loss reduction as noted above may be accomplished even with asymmetrical optical branching devices.

Y-shaped devices and directional couplers were referred to as examples of optical coupling devices which further include star couplers, and all these devices are within the scope of the present invention so long as they have the branching structure characteristic of the present invention.

Furthermore, a plurality of the optical branching devices of the present invention may be combined to form a waveguide type device assembly by situating the output terminal of each waveguide so as to connect to the input terminal of the waveguide positioned directly downstream therefrom. With the resulting waveguide type device assembly, the respective constituent devices produce satisfactory effects in a cumulative manner, thereby allowing drastic suppression of the loss while keeping excellent processing stability, for the output of guided light which has been subjected to branching or coupling.

Another characteristic aspect of the present invention is in the reduced space between the centers of two single mode waveguides which is a fruit of provision of single mode waveguides with terminals less wide than the proximal ends, at the side of the multimode waveguide, and waveguide type devices with this characteristic structure fall within the scope of the present invention.

FIG. 41 is an optical component comprising 3 connected optical branching devices of the type shown in FIG. 39. The optical branching devices are designated as BR601, BR602 and BR603, respectively.

This optical component is provided with a first optical mixer 660, an S-shaped waveguide 621 with a first end 621c and a second end 621p, an S-shaped waveguide 620 with a first end 620c and a second end 620p, a second optical mixer 1660, and a third optical mixer 2660.

The first end 621c faces the first mixer 660. The second end 621p faces the third mixer 2660. The first end 620c faces the first mixer 660. The second end 620p faces the second mixer 1660.

The beams of light input through the ports P1–P4 are coupled and output via ports P5–P8.

Needless to say, the present invention is not limited to the embodiments described above, and may be modified in various ways. For example, so long as the terminal width of the tapered waveguide is enlarged, the construction of the waveguide type optical branching device, forms and dimensions of the respective parts thereof, etc. are not limited to the above-noted embodiments. In addition, the configuration of the waveguide type optical branching device is not limited to the embedded configuration of the present embodiments, and any other configuration including ridge type, loading type, etc. may be used. Furthermore, the two paired waveguides are not limited to those according to the present embodiments which are placed symmetrically with respect to the center line of the non-branch waveguide; it is expected that the same effect of loss reduction as noted above may be accomplished with asymmetrical optical branching devices.

As detailed above, the waveguide type optical branching device according to the present invention has a branching section with a structure wherein the non-branch waveguide is separated from the branch waveguides, and thus the guided light may be branched without provision of a hard-to-process wedge section. With this structure, the device with an excellent processing stability may be prepared repeatedly, particularly on large scales in goods yields for the construction of a large scale optical communication system.

In addition to the above-mentioned effect, the waveguide type optical branching device according to the present invention has effects noted below. First, since the terminal width of the tapered waveguide is greater than the total of the subtotal of the respective widths of the terminals of the two paired branch waveguides near the branching section, and the distance between the two branch waveguides, guided light may be branched with a greater overlapping of the electric field distributions of guided light before and after optical branching and with an improved coupling efficiency. For this reason, guided light may be branched while drastically reducing the radiation of the guided light between the two branch waveguides, thereby allowing a maximum reduction of the optical branch loss.

Second, since the waveguide type optical branching device according to the present invention of the type wherein the tapered waveguide comprises a tapered section, and a straight section added to the tip of the tapered section and of almost the same width as of the wider terminal of the tapered section, has the straight section added to the wider end of the tapered section, the guided light may be input into the branch waveguides after its wave front has been restored to a plane, for optical branching with a much less branch loss over a wide wavelength range due to suppressed radiation of the guided light at one of the edge faces of the non-branch waveguide near the branching section which has a width greater than the total of the respective widths of the two branch waveguides near the branching section, and the space between the two branch waveguides at the branching section.

Third, with the waveguide type optical branching device composed of a multi-stepped combination of the above-noted waveguide type optical branching devices, the foregoing effect is increased in a cumulative manner, allowing the output of branched guided light with an exceptionally lowered optical branch loss over a wide wavelength range.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application Nos. 5-273288 filed on Nov. 1, 1993; and 5-286831 filed on Nov. 16, 1993 are hereby incorporated by reference.

What is claimed is:

1. An optical branching device comprising:

(a) a substrate;

(b) a cladding member disposed on said substrate;

(c) a first core member having an optical axis and an edge face embedded in said cladding member, said edge face being simultaneously perpendicular to the optical axis and an interface between said substrate and said cladding member; and (d) second and third core members embedded in said cladding member, said second and third core members being separated from one another by a minimum distance, and each of said second and third core members being arranged apart from said edge face via a portion of said cladding member, each of said second and third core members having a face which is in contact with said portion of said cladding member, each face having a width, wherein said edge face is wider than the total of said minimum distance and the sum of the widths of said faces of said second and third core members.

2. An optical branching device according to claim 1, wherein said first core member has:

a tapered waveguide including said edge face; and a straight waveguide continued to an end of said tapered waveguide.

3. An optical branching device according to claim 1, wherein said first core member has:

a wide straight waveguide including said edge face;

a tapered waveguide continued to said wide straight waveguide; and a straight waveguide continued to an end of said tapered waveguide, being narrower than said wide straight waveguide.

4. An optical branching device according to claim 1, further comprising a light-shielding member disposed between said second and third core members.

5. An optical branching device according to claim 1 wherein each of said second and third core members tapers toward said first core member.

6. An optical branching device according to claim 1, wherein said first core member has:

a wide straight waveguide including said edge face;

a tapered waveguide continued to said wide straight waveguide; and a straight waveguide continued to an end of said tapered waveguide, being narrower than said wide straight waveguide, wherein each of said second and third core members tapers toward said first core member.

7. An optical branching device according to claim 1, wherein said first core member is a mixer and consists of a straight waveguide.

8. An optical branching device according to claim 7, further comprising fourth and fifth core members embedded in said cladding member.

9. An optical branching device according to claim 1, wherein the width of said edge face is greater than 23 µm and smaller than 29 µm.

10. An optical branching device according to claim 1, wherein the width of said edge face is greater than 25 µm and smaller than 27 µm.

11. An optical branching device according to claim 3, wherein the length of said wide straight waveguide is smaller than 400 µm and greater than 100 µm.

12. An optical branching device according to claim 3, wherein the length of said wide straight waveguide is smaller than 300 µm.

13. An optional branching device according to claim 1, wherein said first core member lowers the energy density of light to be input thereinto and makes the Wave front of said light parallel to said edge face.

14. An optical component comprising said optical branching device of claim 1, and further comprising a fiber in contact with an end of said first core member, wherein light is introduced into said first core member through said fiber.

15. An optical component comprising a plurality of optical branching devices, each optical branching device comprising:

(a) a substrate;

(b) a cladding member disposed on said substrate;

(c) a first core member having an optical axis and an edge face embedded in said cladding member, said edge face being simultaneously perpendicular to the optical axis and an interface between said substrate and said cladding member; and (d) second and third core members embedded in said cladding member, said second and third core members being separated from one another by a minimum distance, and each of said second and third core members being arranged apart from said edge face via a portion of said cladding member, each of said second and third core members having a face which is in contact with said portion of said cladding member, each face having a width, wherein said edge face is wider than the total of said minimum distance and the sum of the widths of said faces of said second and third core members.

16. An optical branching device comprising:

(a) a substrate;

(b) a cladding member disposed on said substrate;

(c) a first core member having an optical axis and an edge face embedded in said cladding member, said edge face being simultaneously perpendicular to the optical axis and an interface between said substrate and said cladding member; and d) second and third core members embedded in said cladding member, said second and third core members being separated from one another by a minimum distance, each of said second and third core members being arranged apart from said edge face via a portion of said cladding member, each of said second and third core members having a face which is in contact with said portion of said cladding member, and each face having a width, wherein the width of said edge face is wider than the total of said minimum distance and the sum of the widths of said faces of said second and third core members, and wherein the width of said edge face satisfies the following expression:

$$Wt < W1 + W2 + A + 10 \mu m,$$

where,

Wt is the width of said edge face,

W1 is the width of the face of said second core member,

W2 is the width of the face of said third core member, and

A is the minimum distance between said second and third core members.

17. An optical component comprising a plurality of optical branching devices, each optical branching device comprising:

(a) a substrate;

(b) a cladding member disposed on said substrate;

(c) a first core member having an optical axis and an edge face embedded in said cladding member, said edge face being simultaneously perpendicular to the optical axis and an interface between said substrate and said cladding member; and d) second and third core members embedded in said cladding member, said second and third core members being separated from one another by a minimum distance, each of said second and third core members being arranged apart from said edge face via a portion of said cladding member, each of said second and third core members having a face which is in contact with said portion of said cladding member, and each face having a width, wherein the width of said edge face is wider than the total of said minimum distance and the sum of the widths of said faces of said second and third core members, and wherein the width of said edge face satisfies the following expression:

$$Wt < W1 + W2 + A + 10 \mu m,$$

where,

Wt is the width of said edge face,

W1 is the width of the face of said second core member,

W2 is the width of the face of said third core member, and

A is the minimum distance between said second and third core members.

* * * * *